(12) United States Patent
Phillips

(10) Patent No.: US 12,443,271 B2
(45) Date of Patent: Oct. 14, 2025

(54) SAME LOCATION VR OVERLAP PLAY SPACE GUARDIAN REMAPPING

(71) Applicant: Adeia Guides Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/668,714

(22) Filed: May 20, 2024

(65) Prior Publication Data
US 2024/0427412 A1 Dec. 26, 2024

Related U.S. Application Data

(63) Continuation of application No. 18/214,411, filed on Jun. 26, 2023, now Pat. No. 12,056,270.

(51) Int. Cl.
G09G 5/00 (2006.01)
A63F 13/21 (2014.01)
G06F 3/01 (2006.01)

(52) U.S. Cl.
CPC .............. *G06F 3/011* (2013.01); *A63F 13/21* (2014.09)

(58) Field of Classification Search
CPC ........... G06F 3/01; G06F 3/011; G02B 27/01; G02B 27/017; A63F 13/21; A63F 2300/8082
See application file for complete search history.

(56) References Cited

U.S. PATENT DOCUMENTS

| | | | |
|---|---|---|---|
| 5,659,691 A | 8/1997 | Durward et al. | |
| 10,691,290 B2 | 6/2020 | Zhou et al. | |
| 11,517,821 B2 | 12/2022 | Lee et al. | |
| 2016/0300395 A1 | 10/2016 | Bretschneider et al. | |
| 2019/0164343 A1 | 5/2019 | Bailey et al. | |
| 2022/0262504 A1 | 8/2022 | Bratty et al. | |
| 2022/0308654 A1 | 9/2022 | Chen | |
| 2023/0097571 A1 | 3/2023 | Mccain et al. | |
| 2023/0196681 A1* | 6/2023 | Madden ................. | G08B 21/02 345/419 |

(Continued)

FOREIGN PATENT DOCUMENTS

| | | |
|---|---|---|
| CN | 114694172 A | 7/2022 |
| WO | 2017218972 A1 | 12/2017 |

OTHER PUBLICATIONS

Analytic Geometry, Wikipedia, printed on Aug. 11, 2023.
(Continued)

*Primary Examiner* — Joe H Cheng
(74) *Attorney, Agent, or Firm* — HALEY GUILIANO LLP

(57) ABSTRACT

If an overlap of two or more extended reality (XR) safe play areas, associated with active XR devices (e.g., VR devices) operating in a physical space is detected, then a combined safe area is determined based on the first and second safe areas, and a reconfigured first and second safe areas are generated for the XR devices. A virtual partition may demarcate the separation between the first and second safe areas. The virtual partition may include a buffer zone that separates the reconfigured first safe area from the reconfigured second safe area. An errant XR device may be guided back to its safe area. If a XR device is deactivated, the entire combined area may be allotted to the remaining XR device.

20 Claims, 43 Drawing Sheets

(56) References Cited

U.S. PATENT DOCUMENTS

2023/0196692 A1  6/2023  Madden et al.
2025/0032905 A1  1/2025  Dasher et al.

OTHER PUBLICATIONS

Dividing A Polygon In Any Given Number Of Equal Areas, Sumit Khetarpal, Dec. 14, 2014.
Fair Partitions of Polygons—an introduction, R. Nandakumar1 , N. Ramana Rao, Nov. 21, 2010.
Fusion of the SLAM with Wi-Fi Based Positioning Methods for Mobile Robot-Based Learning Data Collection, Localization and Tracking in Indoor Spaces, Lee et al, Sep. 11, 2020, https://www.ncbi.nlm.nih.gov/pmc/articles/PMC7570627/.
https://gfycat.com/bittersourkingbird printed on Aug. 28, 2023.
https://www.youtube.com/watch?v=bQ3ySIfc1Gk printed on Aug. 28, 2023.
Map physical spaces with HoloLens, Oct. 13, 2022, Dorrene Brown and Seth Paniagua.
More on cutting a polygon into triangles of equal areas, Yatao Du, Ren Ding, Journal of Applied Mathematics and Computing, Mar. 2005.
The next version of Oculus Quest's system software will enable people to set up VR play spaces stretching up to 15 meters in either direction, https://uploadvr.com/oculus-quest-guardian-size-increasing/ Ian Hamilton, Jun. 9, 2021.
Wifi Positioning Sytem https://en.wikipedia.org/wiki/Wi-Fi_positioning_system Printed on Aug. 11, 2023.

\* cited by examiner

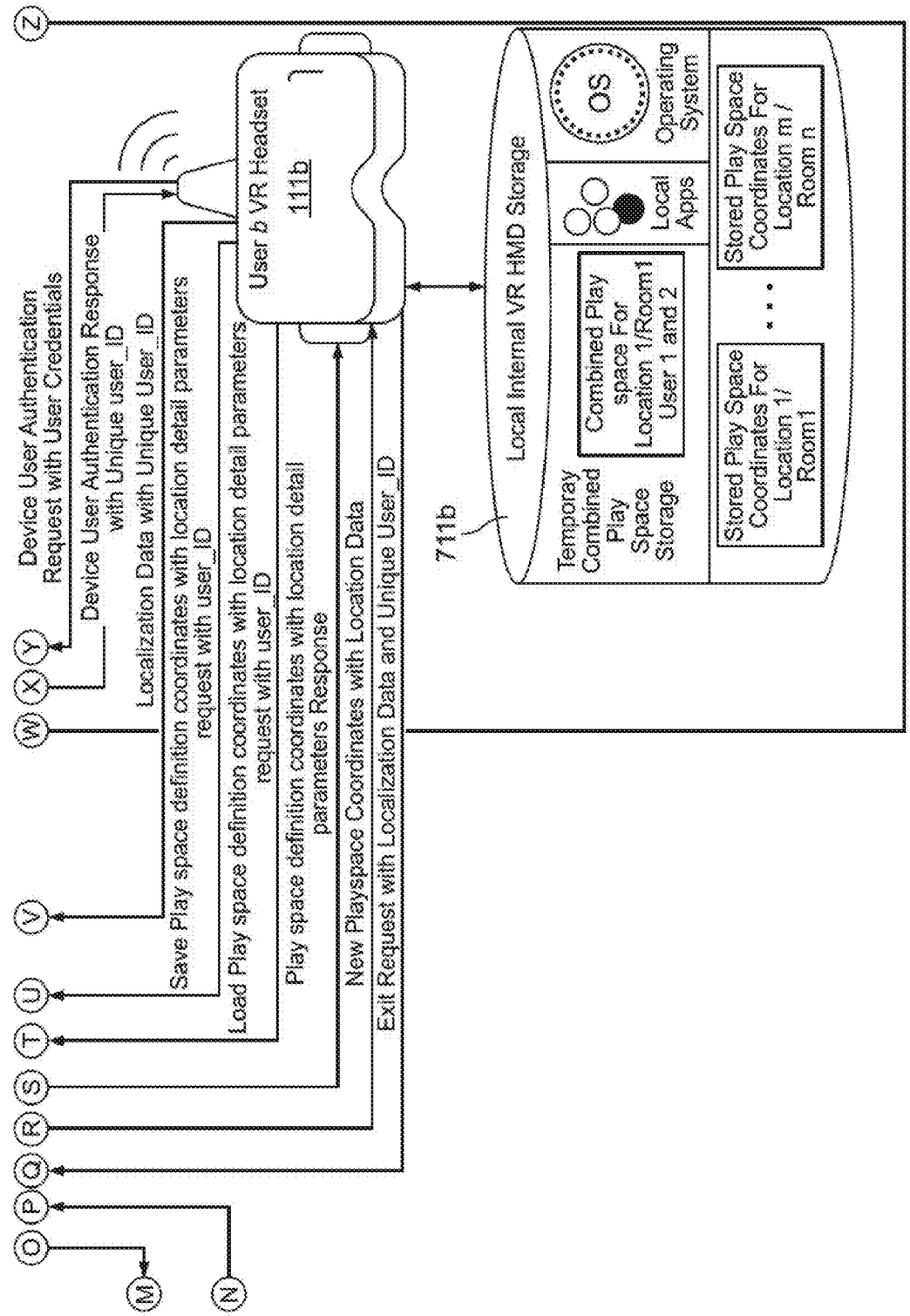

FIG. 15A       FIG. 15B       FIG. 15C       FIG. 15D
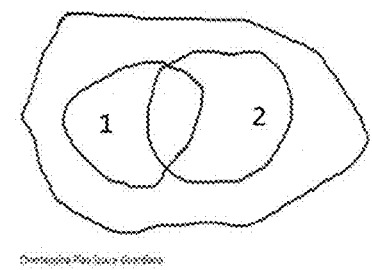 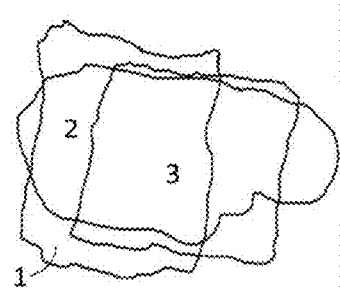 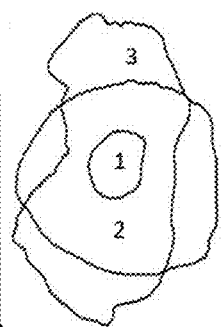 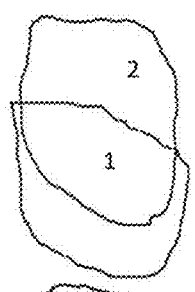
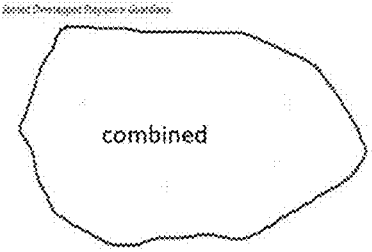 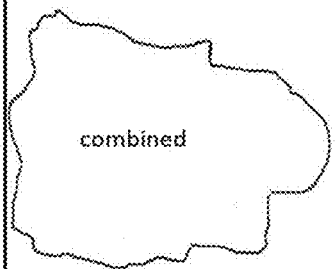 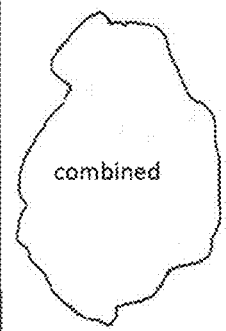 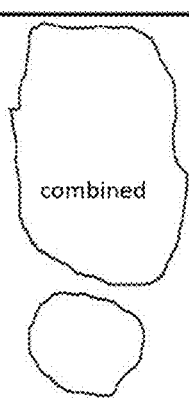
FIG. 15E       FIG. 15F       FIG. 15G       FIG. 15H

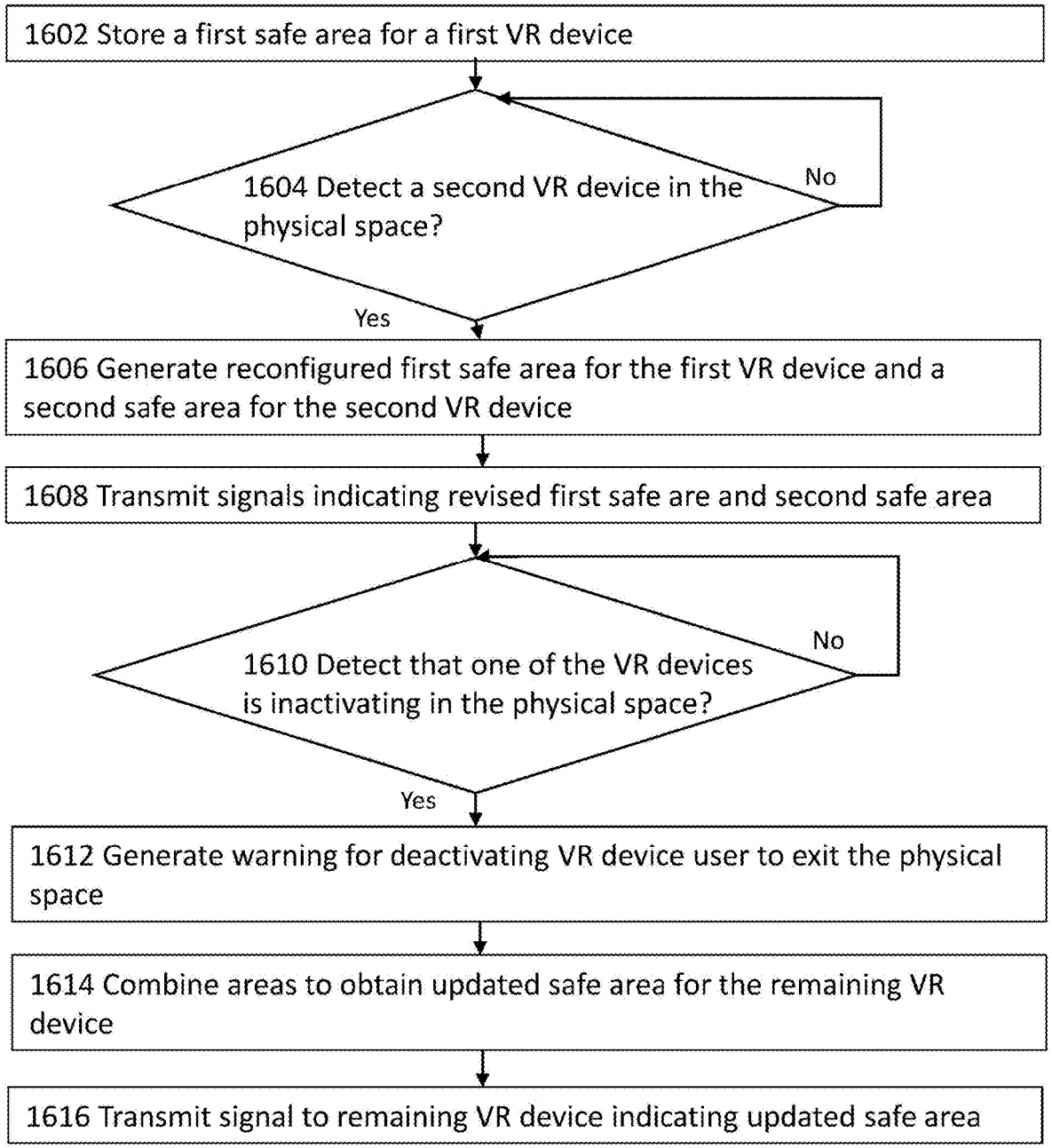

Play Space Merging

1901 — Request received to Merge and Divide Playspaces with Playspace Coordinate Data Map with Unique user_ID Keys to Play Space Merging Function 1903 — Perform Play Space Combining to merge all play spaces into a single irregular shape and determine which playspaces are inside or outside of the irregular shape see *Figure* 8

1912 — For each square in the grid, determine and store the number of corners for the squares in the grid which are inside of the irregular shape see *Figure* 10

Generate outlying polygon for irregular shape see *Figure* 10

Perform algorithm [6] Dividing A Polygon In Any Given Number Of Equal Areas where number of areas $n$ = Coordinate Data Map.size()

Determine intersection coordinates where the equal area polygon division coordinates intersect irregular shape see *Figure* 10

Generate new playspace Coordinate List for each of the new play areas *Figure* 18 return Updated Playspace Coordinate Data Map with Unique user_ID Keys to Play Space Merging Coordinator Function

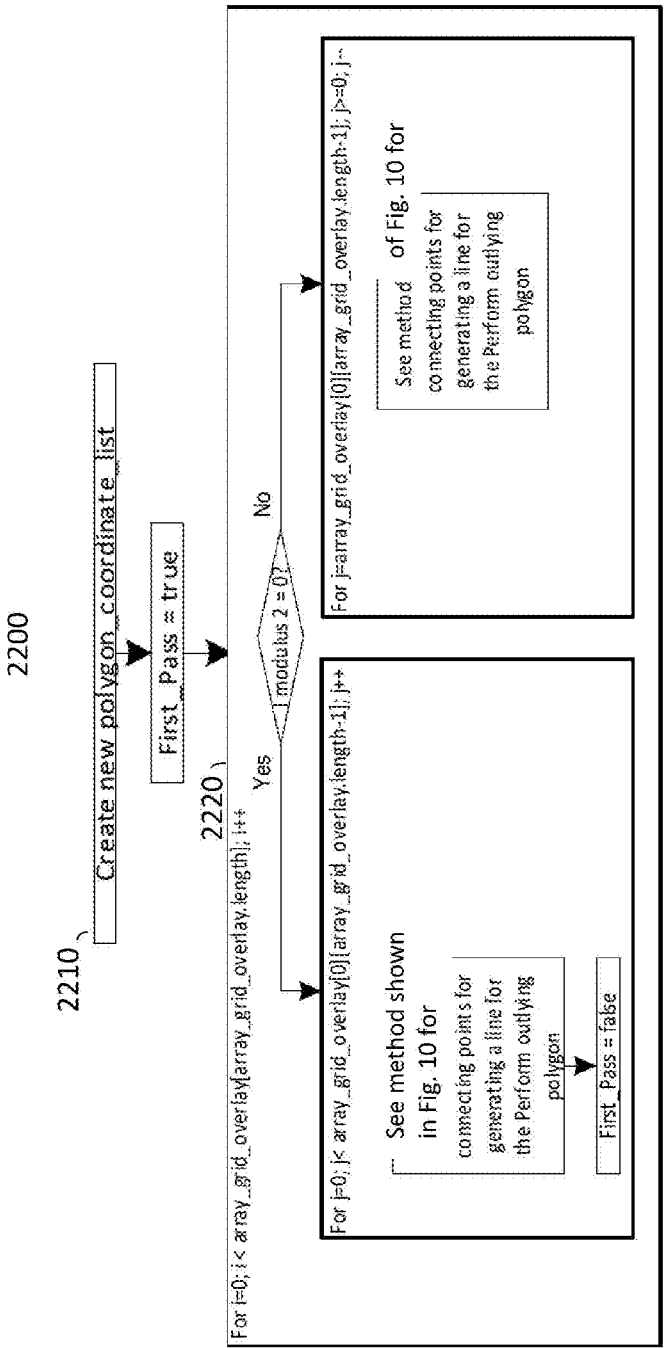

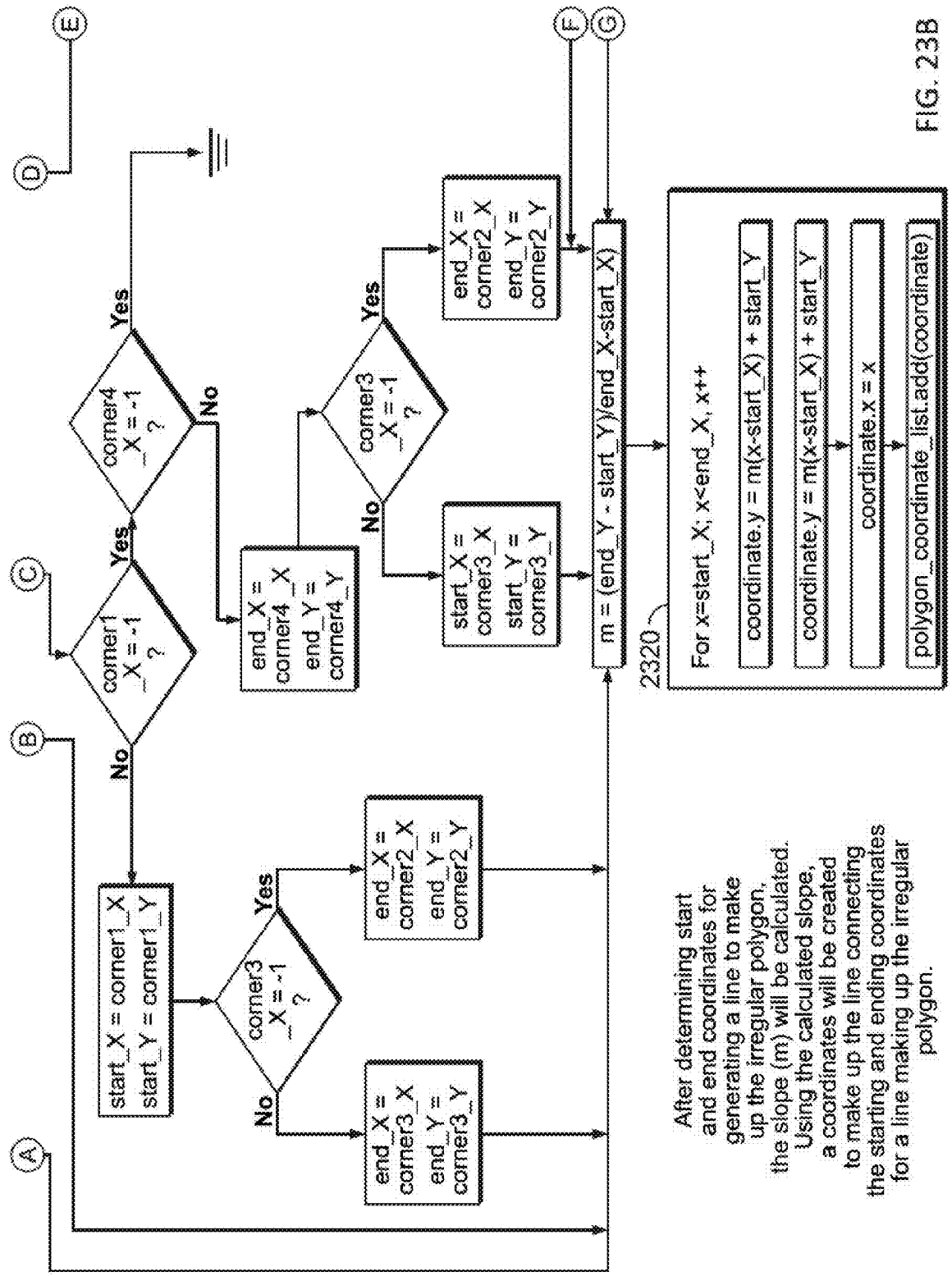

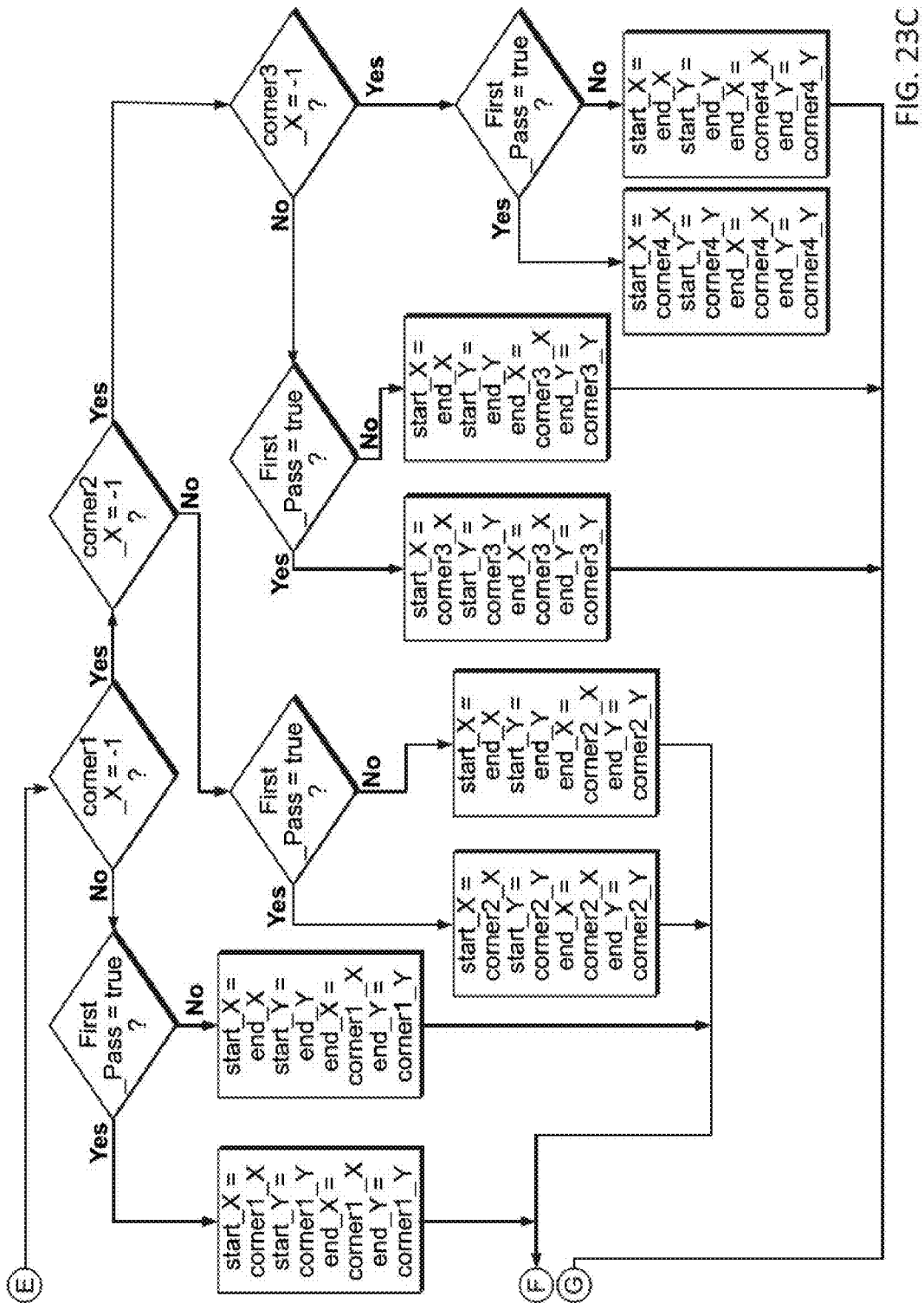

SAME LOCATION VR OVERLAP PLAY SPACE GUARDIAN REMAPPING

CROSS-REFERENCE TO RELATED APPLICATION

This application is a continuation of U.S. patent application Ser. No. 18/214,411, filed Jun. 26, 2023, now U.S. Pat. No. 12,056,270 B2, the contents of which are hereby incorporated by reference herein in their entirety.

BACKGROUND

The present disclosure relates to managing safe play areas for extended reality (XR) devices (e.g., virtual reality devices) and, in particular, to managing safe areas for more than one XR device in a physical space.

SUMMARY

A technological problem that arises from the use of XR applications and, more particularly, VR applications, is accidental collision of users wearing XR devices, such as a head mounted displays (HMDs). For example, when using VR equipment, people are completely immersed in the virtual world simulated by the VR equipment and have the physical sensation of being present in the virtual world. As a result, a VR device user may have no awareness of the physical environment outside of the user's VR headset and may jump into windows or bump into people or other objects in the physical space in which the VR session takes place.

In one approach, a VR device user may define a safe play area within a physical space, with virtual boundaries ("guardians") visible via the VR device, by indicating virtual boundaries having fixed or relatively fixed locations in the physical space. When a VR device user steps outside of the safe area designated for the VR session, a "passthrough" mode may be activated, which enables the user to see the physical area through the VR headset. As a result, the VR user suddenly gains awareness of his/her position and orientation in physical space, thus preventing running into a chair or bumping into other people outside the safe area. Such virtual boundaries may be demarcated manually using local equipment at the VR device.

According to this approach, when, two or more users share a room for VR activity, each user may utilize a controller to "draw" virtual boundaries of s safe area during calibration periods without coordinating with the other user, resulting in a static and fixed boundary area for each user after the calibration period. However, in some instances, nothing prevents these two users from incorrectly defining their own safe areas such that the user-drawn safe areas overlap, resulting in a dangerous situation. In this way, the users may stay completely within their safe areas while engaged in VR sessions, remaining fully immersed in their virtual environments, and they may nevertheless collide. Such an approach may induce a feeling of false safety since each user remains in his/her self-defined safe area. Such collisions may be especially dangerous if the users are playing active games (e.g., VR tennis) involving quick and forceful movements.

In one approach, the two users may manually define their safe areas in a coordinated manner in an effort to prevent overlap of safe areas. However, this coordinated effort to draw non-overlapping boundaries can be tedious and prone to error. For example, while the users may verbally communicate to each other their virtual boundaries, nothing may prevent one user from defining his boundary in a way that conflicts with a verbally agreed upon boundary. Further, in a typical example, one user's VR device may not generate a notification that another user's VR device has an overlapping safe area. Indeed, the VR device may not be notified that any such conflict exists.

Further still, if one user later wants to engage in VR session while the other VR user is not present, the user must again go through the manual and process of redefining a safe area to take advantage of the full physical space. In a related vein, if a VR session is in progress, and a second VR user initiates a VR session in the physical space, the second VR user must interrupt the VR session of the first VR user and negotiate for use of part of the physical space, and then each user must define a respective safe area yet again. Moreover, even if the users are capable of manually defining their virtual boundaries in a coordinated and error-free way, they may fail to reach agreement on how their physical space should be divided between them. However, even if the users can reach agreement on allocation of physical space, and even if they succeed in defining non-overlapping safe areas, the virtual boundaries typically remain fixed and static. Thus, if one user needs less space at a certain time than he originally anticipated, for example, because the user switches to a VR application that typically calls for less movement, or because one of the VR users terminates the VR session and leaves, these manually defined borders fail to account for that. If a first VR user wishes to leave, then the first VR user may interrupt the VR session of the second VR user, advise him/her that second VR user may now take advantage of the full physical space, in which case the second VR user must again go through the tedious process of redefining his safe area. In other words, this manual approach may not account for the dynamic real-time needs of the two or more VR users, resulting in inefficient allocation of physical space into safe areas, and possible injury and damage if safe areas are not properly defined according to the actual current VR use.

In one approach, when two VR devices are part of the same ecosystem or service, a first VR device may detect that a second VR device is in physical proximity to it. In response, one or both users may be forced to redefine their play areas such that they do not overlap. However, because safe areas typically persist across sessions, if one of the users later wants to take advantage of the full physical space, he or she will need to go through the tedious process of manually redefining his/her safe space.

In an embodiment, one or more disclosed techniques enable an XR device to implement a persistent XR safe area, but one that is dynamic and automatically redefines the virtual boundaries of the safe area. The automatic redefinition of the virtual boundaries of the XR safe area may be performed in real time in response to detection of activation of a second XR device in the physical space or in response to the termination of the session/deactivation of the second XR device sharing the same physical space, resulting in efficient and dynamic allocation of the shared physical space. As a result, in an embodiment, a user of a XR device can define his safe area in a physical space a single time, knowing that the XR device or system will automatically expand, shrink, or otherwise manipulate the virtual boundaries of the safe area to account for other XR users that may use the same physical space. For example, if a second user enters the physical area while a first user is already engaged in a XR session, safe areas for each of the first and second users may be automatically allocated dynamically and in fair way to maximize usable XR safe area for each XR device.

Further still, one or more disclosed techniques enable a user to engage in XR activity easily and reliably with the confidence that, by remaining within his safe area, he or she will avoid unexpected collisions and injuries. Also, a XR session provided by a first XR device need not be interrupted to re-draw safe areas when a second XR device is activated in the physical space.

According to an embodiment, when two or more XR devices simultaneously share the same physical space, the safe areas demarcated for each device are combined and a reconfigured first safe area and a reconfigured second safe area are allocated automatically using a virtual partition as a boundary between them. The virtual partition may be visible on each XR device and may include a buffer zone to prevent collision due to movement of the arms or legs of a wearer of the XR device. A collision warning may be provided when the XR device approaches the virtual partition and/or when the XR device passes the virtual partition. When a XR device passes into the safe area of the other XR device, passthrough vision on the XR device may be enabled, warnings may be provided and/or a virtual guide may be displayed by the XR device to guide back the wearer of the XR device to the safe area allocated to the wayward XR device. Similar remedial measures may be provided when a user's XR device nears or passes another boundary of its allocated safe area. According to an embodiment, the first and second safe areas and the virtual partition that divides them may be established for as long as more than one XR device is in the physical space.

The virtual partition may be drawn so as to allocate equal, or approximately equal, safe areas for each of the XR devices. In an embodiment, the safe areas may be allocated depending on the activity level typically generated by the application active for the XR device. For example, a XR device running a game application that often calls for vigorous rapid movement may be allocated a safe area greater in size than one that is running an application that usually calls for more sedate activity. The user profile of the wearer of the XR device may also be consulted to determine the activity intensity level, the area of movement, and/or frequency of vigorous movement associated with the application running on the XR device. The reconfigured safe areas may be calculated to each provide as large as possible of a usable area as possible. The shape or configuration of the usable area may be determined based on the application and may maximize the ratio of the area of the safe area to the perimeter of the safe area. For example, a safe area that is nearly circular or oval may provide more room for movement than a narrow, elongated safe area.

The reconfigured safe areas and the virtual partition for two or more XR devices sharing a physical space may be generated by an off-site server, for example, a SLAM network edge service, and may use Wi-Fi-based localization of the XR devices.

Thus, a technological solution provided according to an aspect of the disclosure is the generation of reconfigured first and second safe areas separated by a virtual partition that may be visible by each XR device. In this way, mutual interference in a XR session, and collision and damage may be avoided. A XR session provided by a first XR device need not be interrupted if a second XR device becomes active in the physical space, or if one of two XR devices that are simultaneously sharing a physical space is turned off. Longer XR sessions may be obtained and the XR equipment may be kept safer.

A method, system, non-transitory computer-readable medium, and means for implementing the method are disclosed for handling overlap of safe areas for two or more XR devices. A method may include: detecting an intersection in a physical space of a first safe area of a first XR device and a second safe area of a second XR device; determining a combined safe area based on the first safe area and the second safe area; generating, by control circuitry, a reconfigured first safe area for the first XR device and a reconfigured second safe area for the second XR device by generating a virtual partition of the determined combined safe area; and generating a signal to at least one of the first XR device and the second XR device marking the virtual partition.

For example, the intersection of the two more safe areas may be detected when the first safe area overlaps the second safe area. The system may detect an intersection when the boundaries of a safe area cross over the boundary of another safe area. For example, the coordinates in the physical space of a part of a boundary of a safe area assigned to a first XR device may be detected to lie on coordinates of the boundary of a safe area assigned to a second XR device. Or the intersection may be detected when the boundary of a safe area is determined to lie less than a threshold distance, for example, 1-2 meters, from that of another.

In such a method, the virtual partition may include a buffer zone that separates the reconfigured first safe area from the reconfigured second safe area. This virtual partition may be generated such that the reconfigured first safe area is approximately equal in size to the reconfigured second safe area, and/or the virtual partition may be generated such that the reconfigured first safe area is located approximately as close as possible to the reconfigured second safe area.

In an embodiment, the virtual partition may be generated such that a size of the reconfigured first safe area relative to the size of the reconfigured second safe area is based on an average activity level generated by a first application active for the first XR device and the average activity level generated by a second application active for the second XR device. The safe areas and virtual partition may be generated such that a size of the reconfigured first safe area relative to the size of the reconfigured second safe area is based on: an average activity level generated by a first application active for the first XR device and the average activity level generated by a second application active for the second XR device, such that the virtual partition remains at a fixed location for an XR session, and also the remaining boundaries of the safe areas may remain fixed for the XR session.

In response to the first XR device entering the reconfigured second safe area, or in response to the first XR device entering a buffer zone separating the reconfigured first safe area from the reconfigured second safe area, the system may generate a display at the first XR device warning that the first XR device is in a forbidden zone, and transmit a signal requesting activation of passthrough display. For example, a display at the first XR device may be generated warning that the first XR device is in a forbidden zone, in response to the first XR device entering the reconfigured second safe area, such that the display at the first XR device indicates a path to the first safe area from a location of the first XR device in the second safe area.

The control circuitry for this method may be provided in a network edge service and the locations of the first safe area and the second safe area, or the coordinates of their boundaries, may be stored in the network edge service. In an embodiment, the control circuitry may be part of a SLAM network edge service and the first and second XR devices may be SLAM-enabled devices controlled by the SLAM-network edge service.

Also contemplated is a method that includes: storing a first safe area of a first XR device in a physical space; detecting a second XR device active in the physical space; in response to the detecting, dynamically updating, by control circuitry, the first safe area of the first XR device to obtain a revised first safe area and generating a second safe area for the second XR device outside of the first safe area; and transmitting a first signal to the first XR device indicating the revised first safe area for exclusive permitted use of the first XR device and transmitting a second signal to the second XR device indicating the second safe area for exclusive permitted use of the second XR device.

Such a method may also include determining that one of the first XR device or the second XR device is deactivated in the physical space and that another of the first XR device or the second XR device is active in the physical space, and dynamically updating the safe area of the other of the first XR device for exclusive permitted use of the other XR device by combining the revised first area with the second safe area. For example, the system may detect deactivation when the XR device is turned off, when the XR application is no longer running on the XR device, when the XR device is out of the physical space, for example, is more than a threshold distance away from its safe area or more than a threshold distance away from all safe areas of the physical space, or when the XR device has not moved for a threshold period of time, for example, 30 seconds, two minutes, or 5 minutes. Such a threshold distance away from the safe area or from all safe areas of the physical space may be 5 meters, 10 meters, or 30 meters.

The system may also provide a warning indicating that the safe area of the other XR device is being enlarged. For example, this may be an audible warning that is provided by the XR device prior to deactivation. In an embodiment, such a warning may be provided by the other XR device—the XR device whose safe area is being enlarged.

On the other hand, if the system detects that one or both of the first XR device or the second XR device is deactivating in the physical space, and subsequently detects that both the first XR device and the second XR device are active in the physical space, then, in response to the subsequent detecting, the system may transmit a first signal to the first XR device indicating the revised first safe area for exclusive permitted use of the first XR device and transmitting a second signal to the second XR device indicating the second safe area for exclusive permitted use of the second XR device.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 15A-D illustrate examples of overlapping safe areas that had been created by multiple VR devices;

FIGS. 15E-H illustrate examples of combined safe areas that are generated as part of a process of allocation of safe areas for each device, according to an aspect of the disclosure;

FIG. 16 illustrates an example of guidance provided via VR device upon detecting an active second VR device in the physical space, according to an aspect of the disclosure;

FIG. 19 illustrates a safe area merging process according to an aspect of the disclosure.

FIG. 22 is a flowchart showing an example of a process for generating the polygon with straight sides based on the combined area with irregular shape.

FIGS. 23A-C are a flowchart providing an example of a process for connecting points to generate of the outlying irregular polygon.

DETAILED DESCRIPTION

Figure 1:
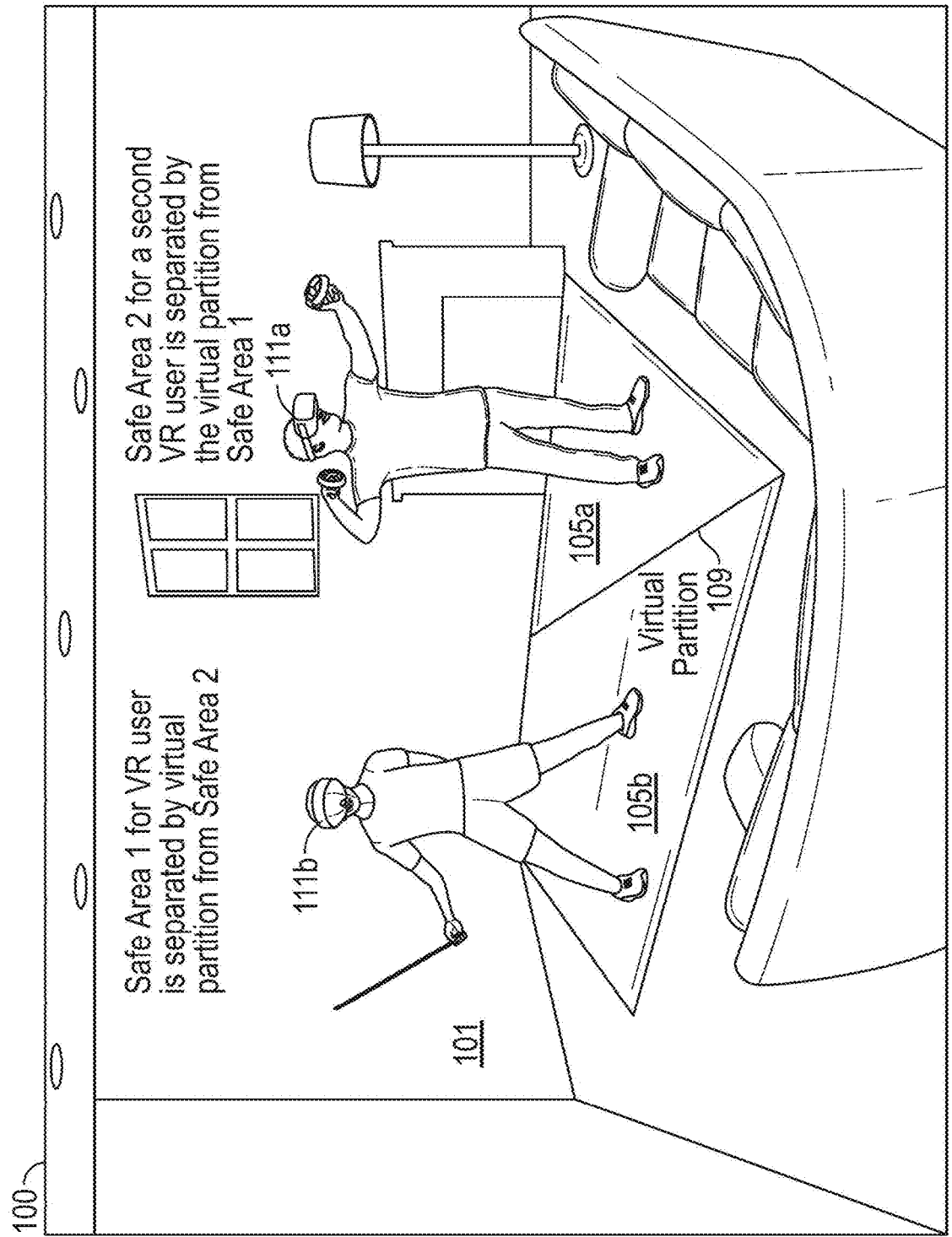
FIG. 1 illustrates an example of two virtual devices sharing a physical space with a first safe area allocated to a first device of the two XR devices separated by a virtual partition and a second safe area allocated to a second device of the two XR devices, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Note, references herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). An XR device may take the form of glasses or a headset in some instances (e.g., a head-mounted display or HMD). While some references are made to a VR device or devices, appreciate that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein.

FIG. 1 illustrates two extended reality devices, shown as head mounted displays (HMDs) 111a, 111b, worn by users. In an embodiment, the HMDs 111a and/or 111b may be VR devices. The system has generated two safe areas, 105a, 105b in the same physical space 101, shown by way of example as a living room, separated by a virtual partition 109, according to an aspect of the disclosure. While sometimes referred to as safe play space or safe area, it will be understood that what is meant is an area in a physical space demarcated by a virtual boundary that is visible via the XR (e.g., VR) device and/or that may provide a warning when crossed or is approached. The virtual partition is a boundary between safe areas. The physical space may be a living room or game room, as illustrated, or may be purpose-built XR or VR recreation room. The XR or VR equipment may include a stereoscopic HMD, which may include eye-tracking sensors to control the display, one or more game controllers used as input/output devices for controlling an XR or VR application, and other XR or VR application-specific equipment, such as movement sensitive rackets and paddles, laser pointers and laser guns, and the like. The XR applications in the HMDs 111a, 111b may be running different XR applications or the same XR application. For example, the XR device users may be playing entirely unrelated XR (e.g., VR) games or they may be playing the same game against/together with each other.

Figure 2:
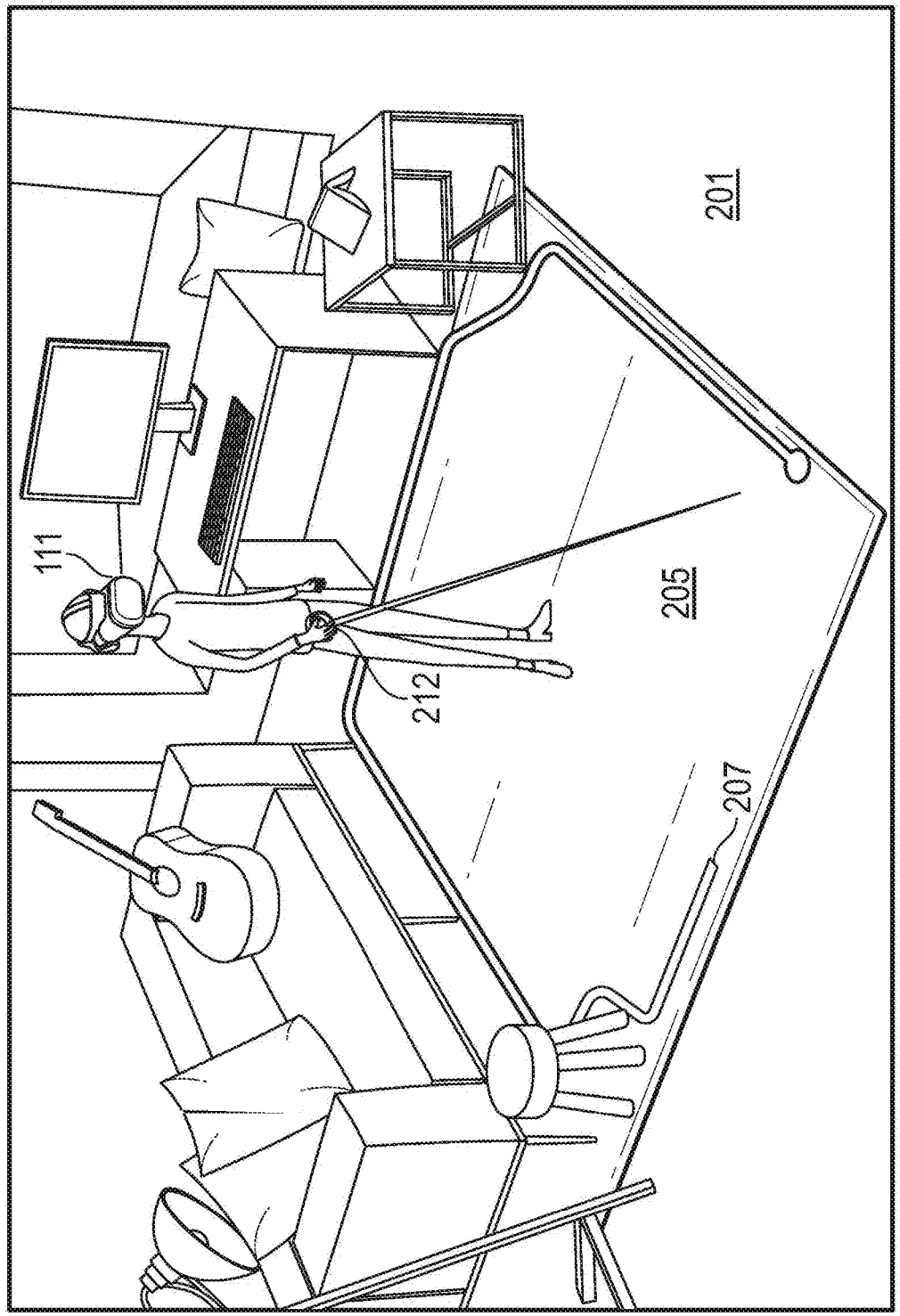
FIG. 2 illustrates an example of an extended reality device user marking out a safe area of a physical space using an XR controller.

FIG. 2 illustrates a user wearing an XR HMD 111 and pointing a handheld device 212, such as a laser pointer or XR/VR controller, to carve out the safe area 205 from the physical space 201 by drawing a virtual boundary 207. Various implements and methods for demarcating a safe area for use with an XR (e.g., VR) device may be used. While shown as having straight lines and neat curves in FIG. 2, it will be understood that often XR users do not draw quite so neat safe area boundaries and may sometimes err in the exact location of the boundaries. Also, while shown in FIG. 2 as being a single safe area with a boundary drawn by a single VR user, it will be understood that a physical space may have more than one safe space drawn at different times by different users, which may be a recipe for collision.

Figure 3A:
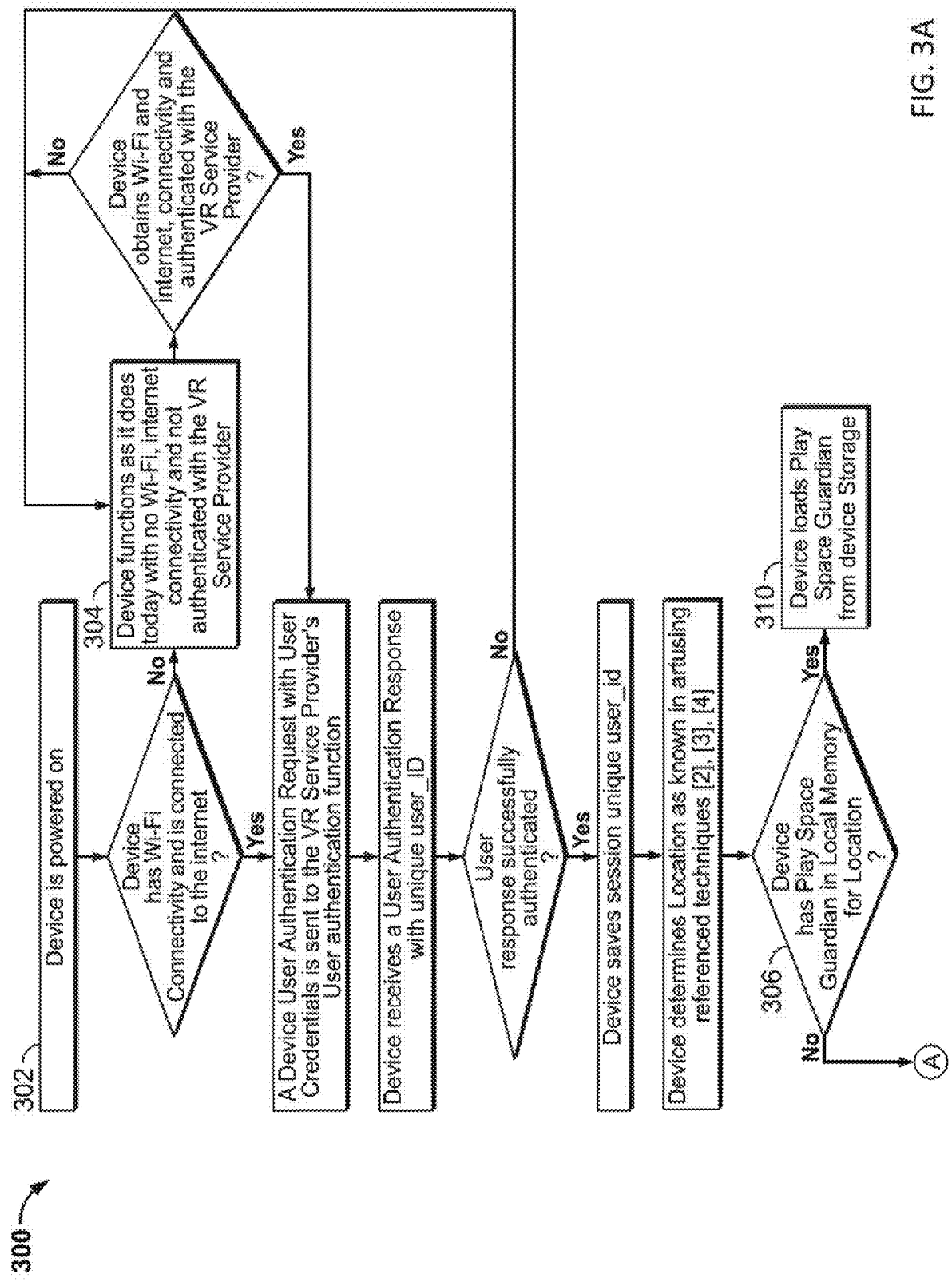
FIGS. 3A-C illustrate an example of a process for managing a safe are for a first extended reality device.
Figure 3B:
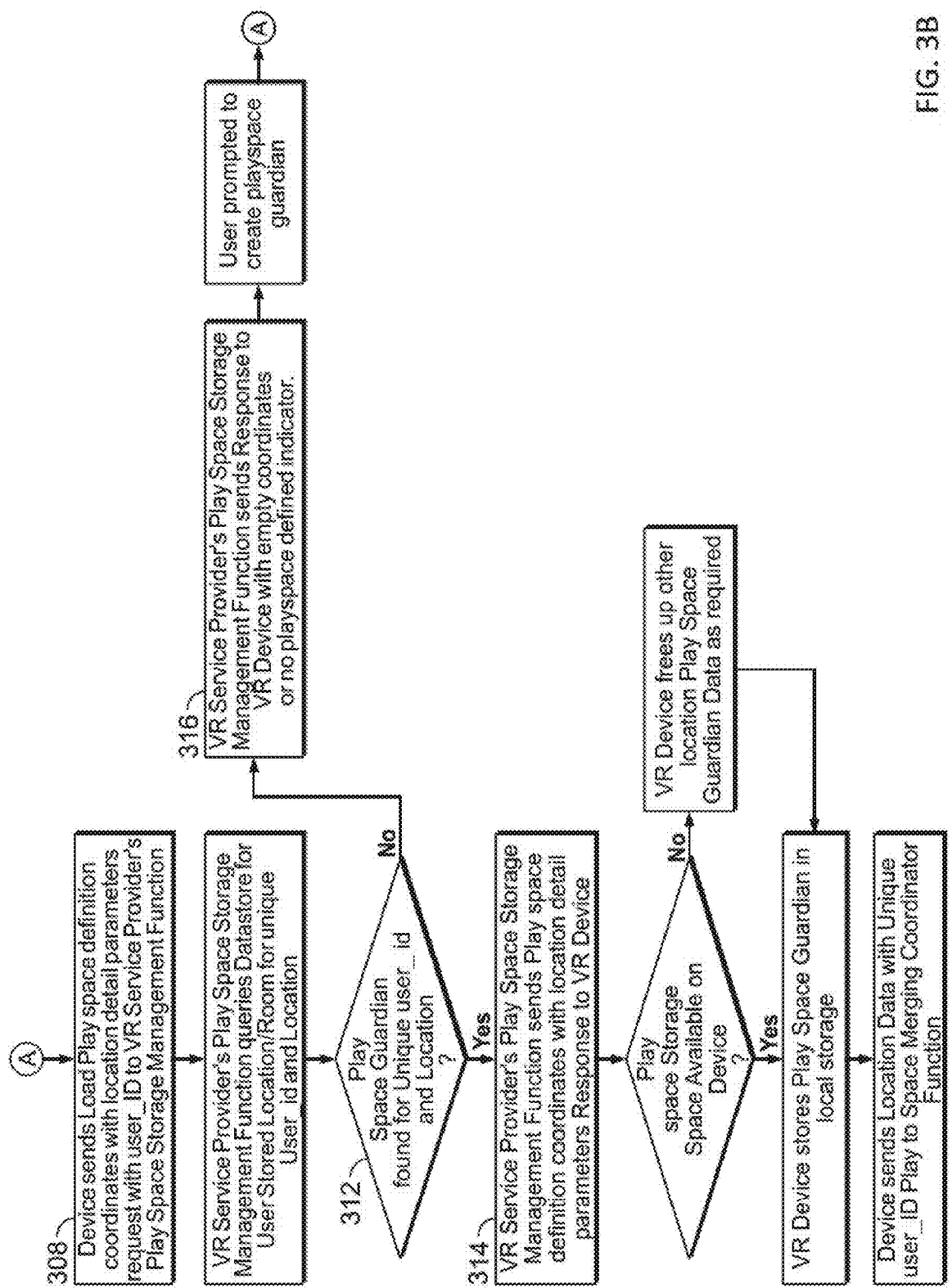
Figure 3C:
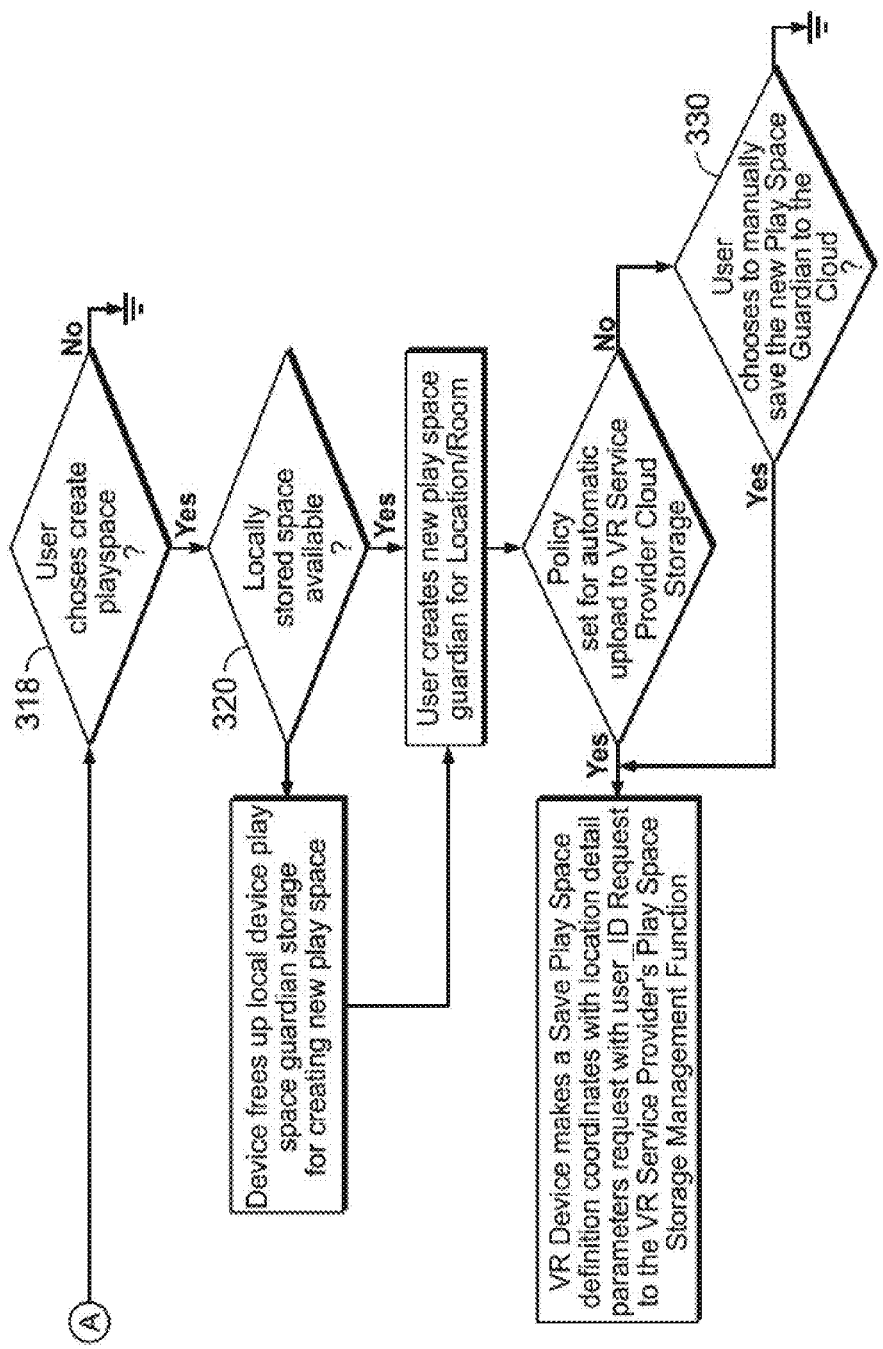

FIGS. 3A-C illustrate a process 300 for establishing an XR or VR device connection and for loading or generating a safe area. Starting at 302 the XR device 111 is powered on and the device user is authenticated using user credentials. The system may also authenticate the device user using biometric data, such as a facial, retinal or finger scan obtained from the user. In some embodiments, the device 111 may be any suitable XR device configured to display virtual objects within a scene including any suitable combination of a real-world environment, a virtual environment, and/or virtual objects. In some embodiments, the described XR or VR devices may include see-through capabilities enabling the display of some or all of a user's real-world environment. For example, the device 111 may include optical see-through (OST) capability in which light passes through the display, providing "through the glass" visibility of an environment. In an embodiment, the device 111 may include video see-through (VST) capability, wherein cameras (e.g., mounted on or within the device 111) capture images or video of the user's environment and render a corresponding video, allowing the user to view, in whole or in part, his or her real-world environment by way of the video.

Starting at 304 it is determined whether the VR device is connected to Wi-Fi and the Internet. If it is not connected to a network, then network connectivity is obtained. In an embodiment, the VR devices are connected using the same Wi-Fi network to facilitate the system recognizing them as being in the same physical space.

At 306 it is determined whether the VR device has a safe area stored in local memory. The safe area may be stored in memory from a previous session of the VR device in this physical space. For example, the safe area may be stored as a series of x and y coordinates defining a location of the boundary in the physical space.

If so ("yes"), then at 310 this safe area is loaded from memory. The system may also determine whether a safe area in memory is associated with this VR device in this physical space with the specific VR application that is running or loaded. For example, a VR device may be associated with more than one safe area in a physical space, and the safe area may be selected depending on the VR application that is being used.

If it is determined that a safe area is not found in local memory then, starting at 308, a remote database, for example, at a network edge service provided by the VR equipment manufacturer or provider, or provided by the VR application provider, is contacted to determine whether a safe area has been stored for this VR device at this location. A safe area may be associated with the physical space, regardless of a VR device or user. For example, a safe area may be stored for another VR device associated with the same user profile, with the same VR device, or with the same household or company.

If at 312 it is determined that a safe area has been stored this VR device at this location then starting at 314 a process for retrieving it begins. A VR device may be associated with more than one safe area in a physical space, and the system may select the safe area for the VR session based on whether one or more other VR devices are detected, or have been detected, as active in the physical space. For example, if previously, a safe area for the VR device was stored in a configuration in which two VR devices simultaneously use the physical space and the system now determines that the two VR devices are active in the physical space then the same safe area as the one previously used may now be retrieved and assigned for the VR device.

If no stored safe area is found then, starting at 316, the XR device is used to create a safe area, for example, as shown in FIG. 2. The system may automatically prompt the user to create a safe area. Or the safe area may be VR application-dependent, and the VR application may prompt the user to create a safe area in accordance with the needs and specifications of the VR application.

At 318, it is determined whether the user wishes to create a safe area. For example, the system may prompt the user using the HMD to indicate whether a safe area for the VR session is to be created.

If the answer is "yes," then at 320, it is determined whether a locally stored safe area is available. It may also be determined whether the safe area was previously allocated to this VR device in the same physical space and with the same other VR devices simultaneously active in the physical space, in which case the previously used safe areas may be automatically reallocated to the VR devices.

At 330, the system may prompt the user via the VR device whether the coordinates of the boundaries of the safe area are to be saved to the cloud. For example, safe area boundaries may be stored online in servers associated with the VR application, the VR equipment, and/or the VR service provider.

Figure 4:
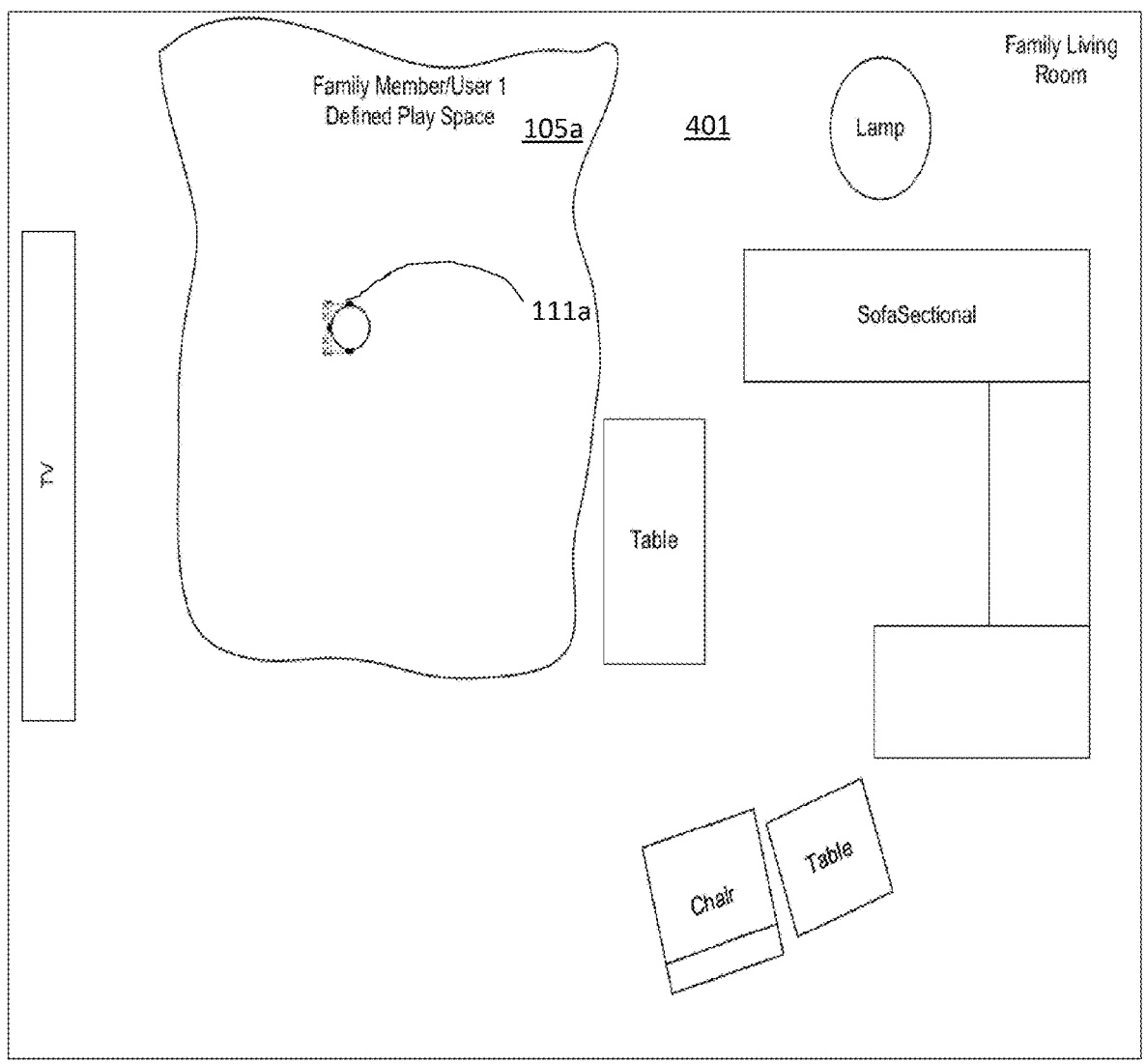
FIG. 4 illustrates an example of a first extended reality device in its safe area of a physical space inside a home together with other objects.
Figure 5:
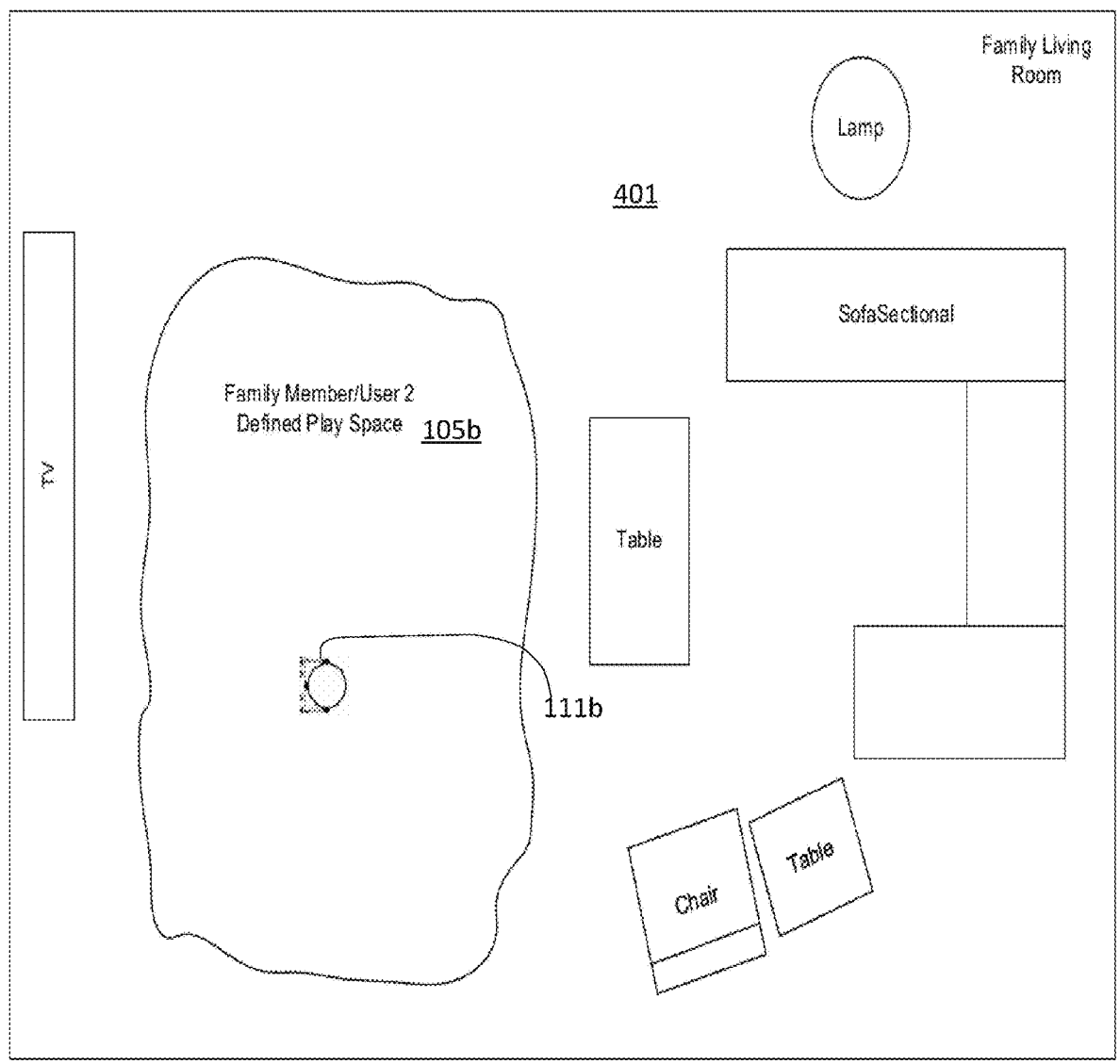
FIG. 5 illustrates an example of a second extended reality device in its safe area of the physical space inside the home together with the other objects.

FIGS. 4 and 5 illustrate two safe spaces 105*a*, 105*b* in a physical space 40. For example, the safe spaces 105*a*, 105*b* may have been created, respectively, for XR devices 111*a*, 111*b* and may be used by different members of a household. Or they may have been created by the same user for different XR or VR applications or using different XR or VR devices. While the safe spaces are both in the same physical space 101, they are not complementary because they overlap each other, which may cause collision between users of the devices 111*a*, 111*b*. Also, the boundaries of the safe areas 105*a*, 105*b* appear to have been created by using a handheld device to draw boundaries. The boundaries lack neat, straight lines because they are ad hoc and are merely user approximations of where the boundary should be. This may account for the overlap, or the safe areas may have been drawn without regard for simultaneous use of the other XR device.

Figure 6:
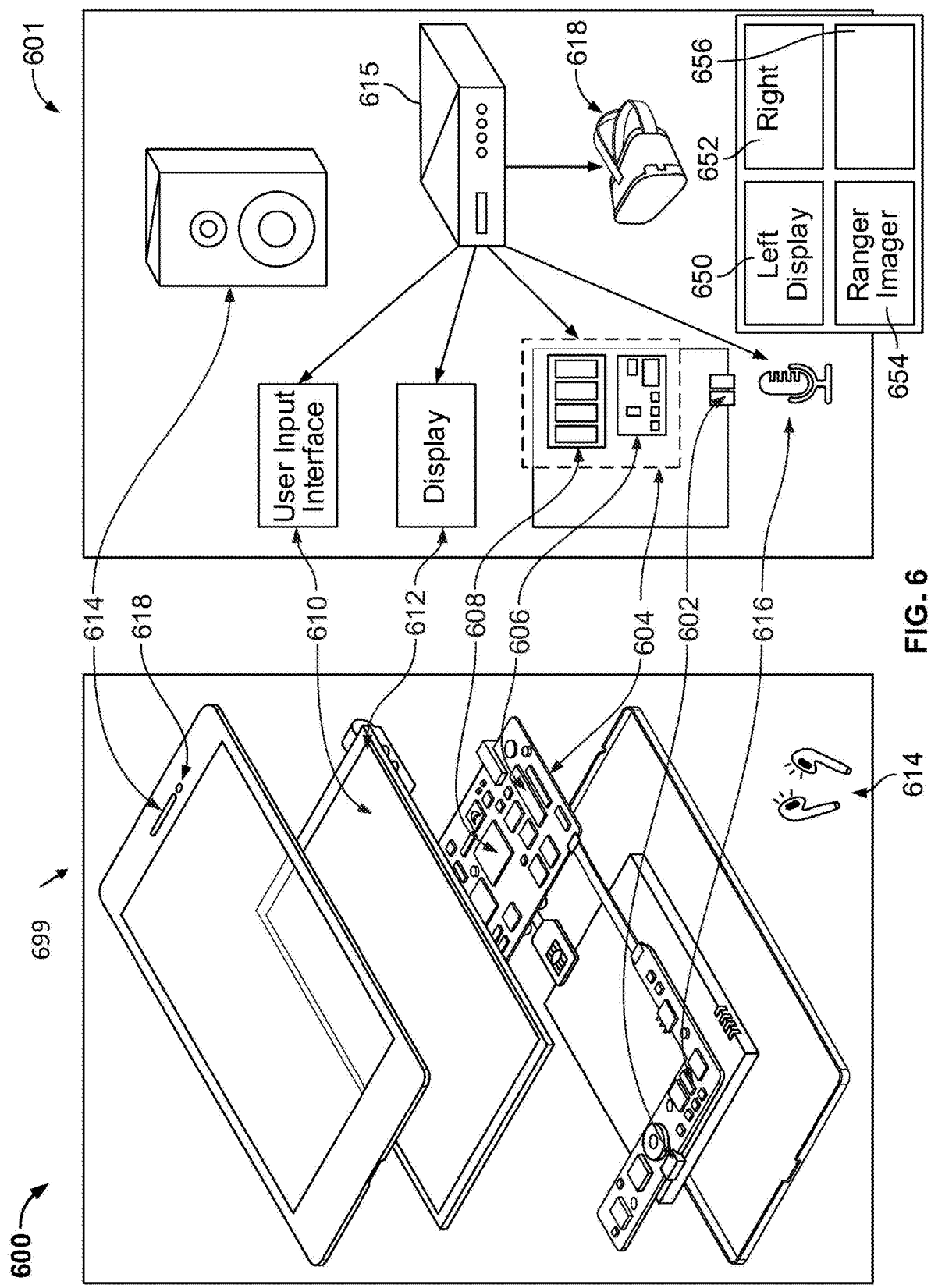
FIG. 6 illustrates an example of is an illustration of a computer with peripheral devices.

FIG. 6 illustrates a computer and related hardware for an XRVR device 701, which may be a VR device in some embodiments. The computer may also be a network edge service devices 751 (illustrated in FIG. 7, below), such as a server, including components used for supporting safe area management. A circuit board may include control circuitry, processing circuitry, and storage (e.g., RAM, ROM, hard disk, removable disk, etc.). In some embodiments, the circuit board may include an input/output path for communicating with the HMD of the XR device and with a remote device, for example, with the network edge service. Each device 600/601 may receive content and data via input/output (I/O) path 602 that may comprise I/O circuitry (e.g., network card, or wireless transceiver). I/O path 602 may communicate over a local area network (LAN) or wide area network (WAN), for example, via Wi-Fi, Bluetooth, cellular or other wireless or wired connection.

Control circuitry 604 may comprise processing circuitry 606 and storage 608 and may comprise I/O circuitry. Control circuitry 604 may be used to send and receive commands, requests, and other suitable data using I/O path 602, which may comprise I/O circuitry, for example, for receiving user demarcations of safe area boundaries 105*a*, 105*b* and for transmitting displays to be provided by the HMD of the XR device, including display of the virtual safe area boundary 105*a*, 105*b* and virtual partition 109. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 604 executes instructions for the VR application stored in memory (e.g., storage 608). Specifically, control circuitry 604 may be instructed by the VR application to perform the functions discussed above and below. In some implementations, processing or actions performed by control circuitry 604 may be based on instructions received from the VR application.

In client/server-based embodiments, control circuitry 604 may include communications circuitry suitable for communicating with other networks. The VR application may be implemented as software or as a set of executable instructions. The instructions for performing any of the embodiments discussed herein of the VR application may be encoded on non-transitory computer-readable media (e.g., a hard drive, random-access memory on a DRAM integrated circuit, read-only memory etc.). For example, in FIG. 6, the instructions may be stored in storage 608, and executed by control circuitry 604 of a device 600.

In some embodiments, the VR application may be a client/server application where only the client application resides on device 600 (e.g., device 104), and a server application resides on an external device or edge service network. Control circuitry 604 may include communications circuitry suitable for communicating with a server, edge service computing systems and devices, a table or database server, or other networks or servers Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 608 may be used to store various types of content described herein as well as VR application data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry. Control circuitry 604 may also include scaler circuitry for upconverting and down converting content into the preferred output format of equipment 600. Control circuitry 604 may also include digital-to-analog converter circuitry and analog-to-digital converter circuitry for converting between digital and analog signals. In some embodiments all elements of system 600 may be inside housing of the VR display device 618. In some embodiments, VR display device 618 comprises a camera (or a camera array) 656. Video cameras 656 may be integrated with the equipment or externally connected. One or more of cameras 656 may be a digital camera comprising a charge-coupled device (CCD) and/or a complementary metal-oxide semiconductor (CMOS) image sensor. In some embodiments, one or more of cameras 656 may be dirtied at outside physical environment (e.g., two cameras may be pointed out to capture to parallax views of the physical environment). In some embodiments, VR display device 618 may comprise other biometric sensor or sensors to measure eye rotation (e.g., electrodes to measure eye muscle contractions). VR display device 618 may also comprise range image 654 (e.g., LASER or LIDAR) for computing distance of devices by bouncing the light of the objects and measuring delay in return (e.g., using cameras 656). In some embodiments, VR display device 618 comprises left display 650, right display 650 (or both) for generating VST images, or see-through VR images in accordance with embodiments in FIGS. 1-6.

The VR application may be implemented using any suitable architecture. For example, it may be a stand-alone application wholly-implemented on each one of user equipment device 600 and user equipment device 601. In such an approach, instructions of the application may be stored locally (e.g., in storage 608), and data for use by the application is downloaded on a periodic basis (e.g., from the edge service network, from an out-of-band feed, from an Internet resource, or using another suitable approach). Control circuitry 604 may retrieve instructions of the application from storage 608 and process the instructions to provide VR generation functionality and perform any of the actions discussed herein. Based on the processed instructions, control circuitry 604 may determine what action to perform when input is received from user input interface 610. For example, head movement or movement of a hand or handheld device via user input interface 610. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the VR application may be downloaded and interpreted or otherwise run by an interpreter or virtual machine (run by control circuitry 604). In some embodiments, the VR application may be encoded in the ETV Binary Interchange Format (EBIF), received by control circuitry 604 as part of a suitable feed, and interpreted by a user agent running on control circuitry 604. For example, the VR application may be an EBIF application. In some embodiments, the VR application may be defined by a series of JAVA-based files that are received and run by a local virtual machine or other suitable middleware executed by control circuitry 604. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 602-11x, etc.), or other short-range communication via wired or wireless paths. The user equipment devices may also communicate with each other directly through an indirect path via communication network.

While sometimes described as a "VR" network or system by way of example, it will be understood that implementations that include SLAM (Simultaneous Location And Mapping) technology, are also contemplated. SLAM technology allows a variety of devices, including XR equipment, HMDs, wearable devices, industrial robots, autonomous household devices, drones, self-driving vehicles, etc., to create a map of its surroundings and to locate and assist in autonomous and/or user-assisted navigation based on the map in real time. Example XR devices include VR devices, AR devices, MR devices. The field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). For example, in an embodiment, the system may provide virtual boundaries of the safe area, and possibly other virtual elements of a scene for display, while the actual or real-world environment may also be displayed or be visible. In addition, equipment sold for or typically usable for MR or AR may be compatible with a system as herein discussed by displaying virtual elements of a scene, such as virtual boundaries. A map of an area may be generated based on sensor data captured by sensors onboard the SLAM-enabled device, and the location of the SLAM-enabled device on the map may be determined based on data generated by the device. One or more sensors may be positioned in, on, or at the SLAM-enabled device, or may be positioned elsewhere and capture a field of view of the SLAM-enabled device. For example, one or more stationary cameras in the vicinity of the SLAM-enabled device may provide image data, in addition to or instead of, cameras onboard the SLAM-enabled device. The device's sensors, such as one or more charge coupled devices and/or cameras and/or RADAR/LIDAR and the like, or a combination of the foregoing, collect visual data from the physical world in terms of reference points. In addition, or instead, a SLAM-enabled device may also use one or more of GPS data, satellite data, wireless network and/or Wi-Fi signal strength detection, acoustic signals, or any suitable visual positioning system (VPS) methods, e.g., using other previously scanned objects as anchors, or using any other suitable technique, or any combination thereof for determining location, movement and/or orientation. For example, a Wi-Fi positioning system (WPS or WiPS) may use Wi-Fi hotspots or other wireless access points to locate a device. An SSID (Service Set Identifier) and MAC (Media Access Control) address assigned to a NIC (Network Access Controller) may be used as parameters for locating the device in a WPS. A SLAM-enabled device may be equipped with IMU (inertial measurement unit). IMU data may be used for location/orientation/movement determination.

Figure 7A:
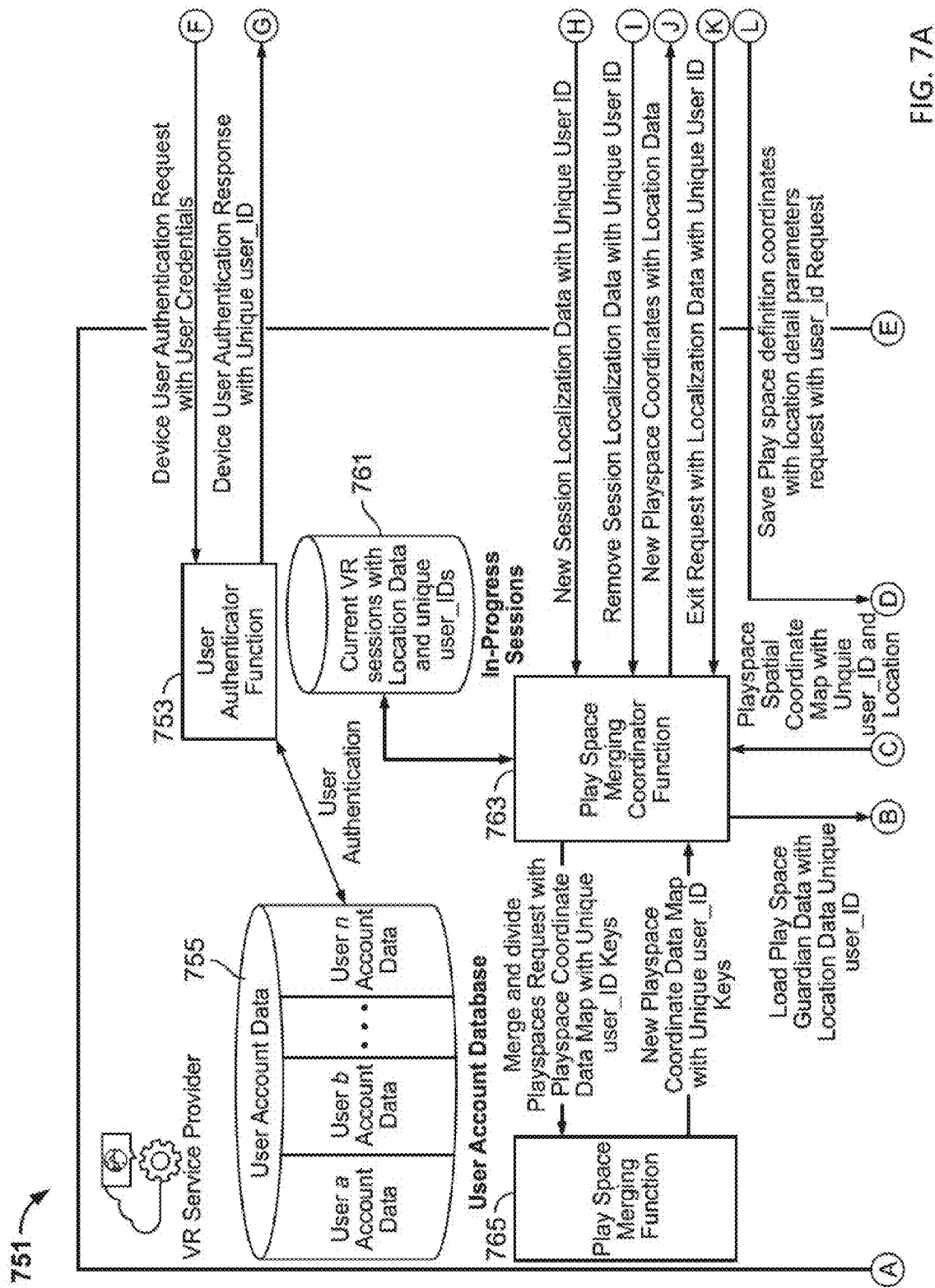
FIGS. 7A-B illustrate, respectively, a VR network edge provider and two collocated VR devices communicating via a data network, according to an aspect of the disclosure.
Figure 7A:
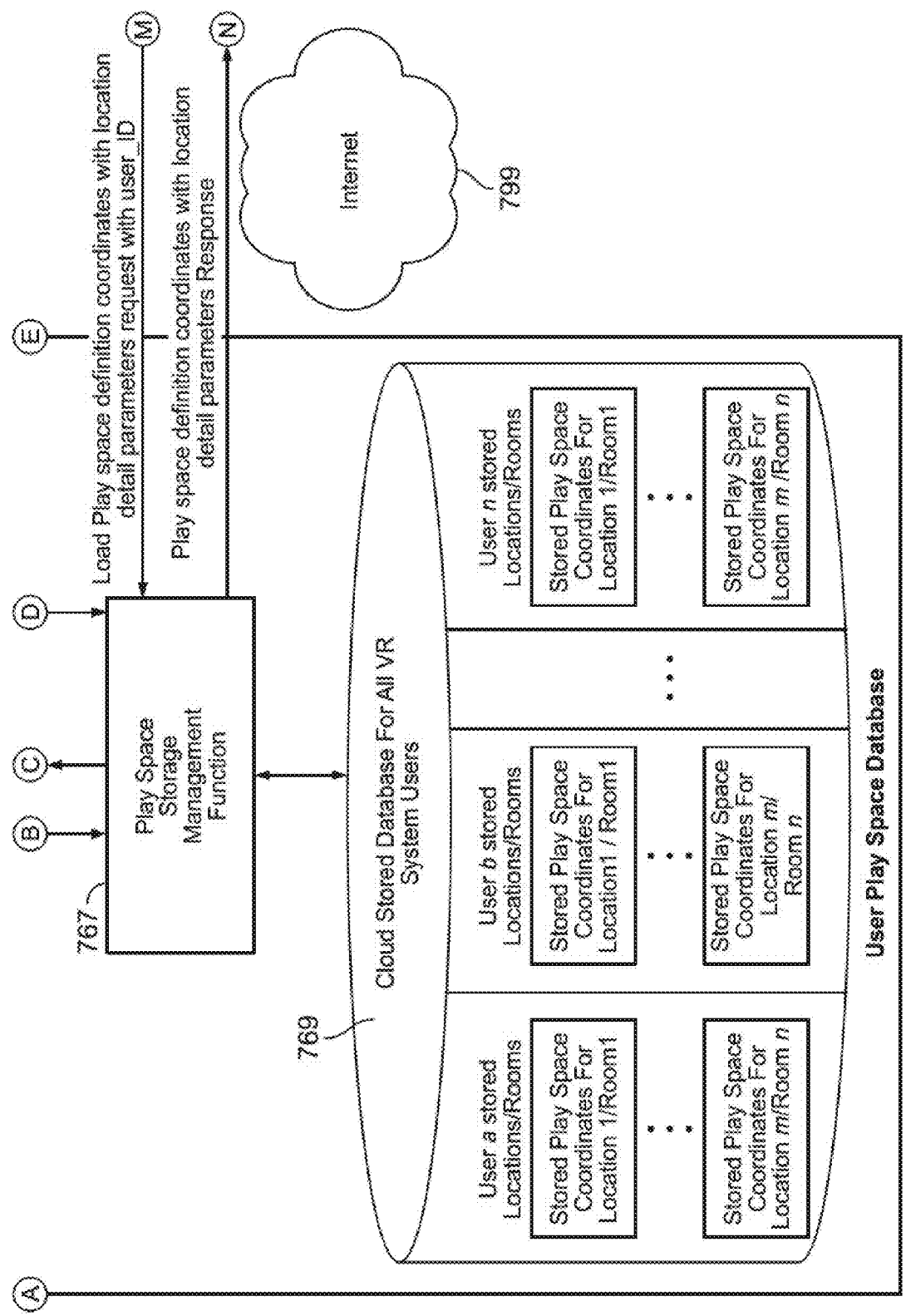
Figure 7B:
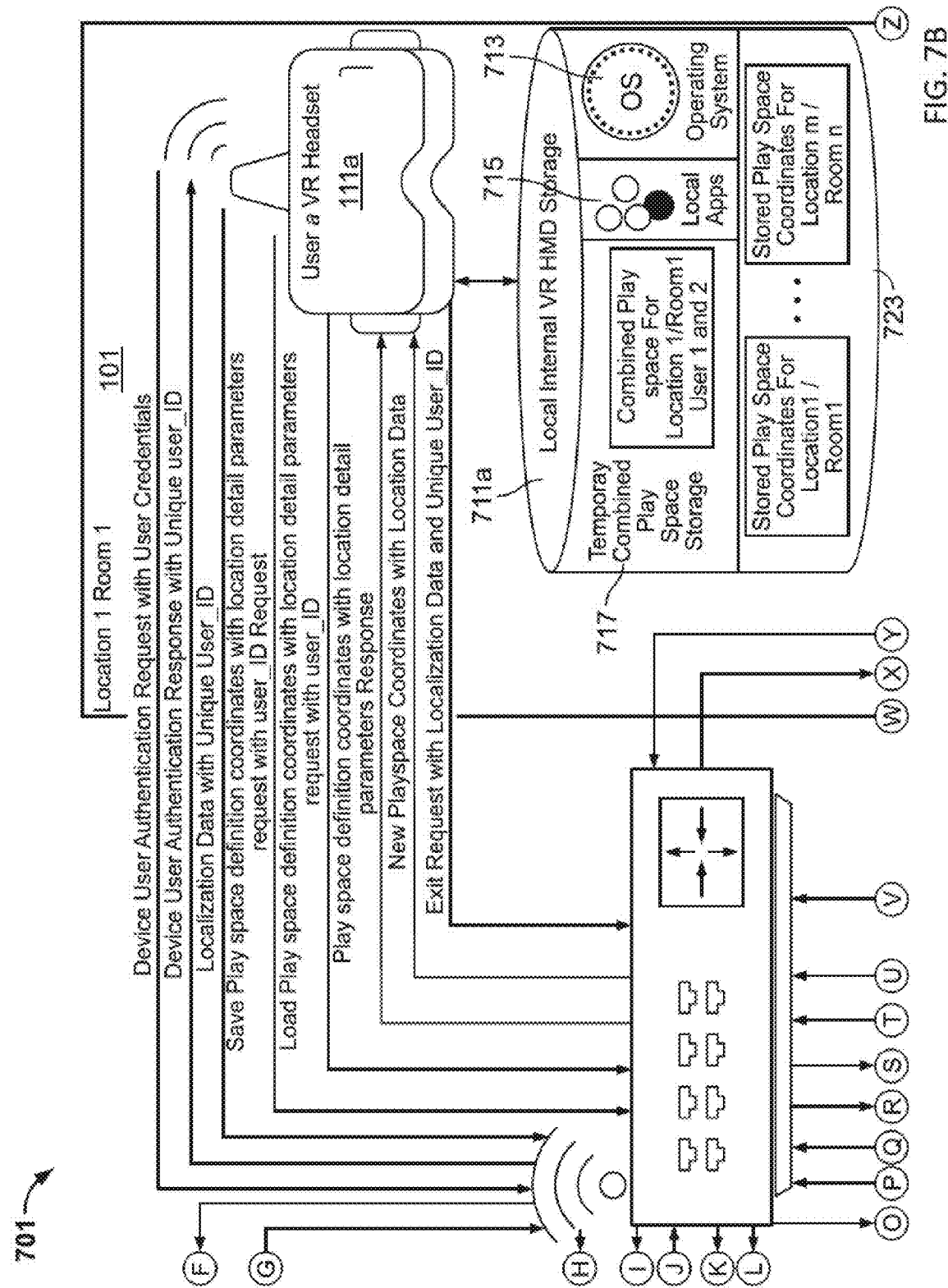

FIG. 7 is a conceptual illustration of XR devices 111a, 111b, illustrated by way of example, as HMDs, and their local memories 711a, 711b. Local internal storage 711a, 711b may include an operating system 713 and local applications, including those providing virtual games, virtual conferencing, virtual worlds, or other virtual experiences, applications that handle communication with remote network device 751 via network 799, and applications that control video and audio functions of the HMD, facilitate wireless communication via Wi-Fi, cellular, satellite or other wired or wireless connection, create and manage safe areas, monitor the encroachment of safe area boundaries, combine or consolidate safe areas, generate virtual partitions, and provide various background processes for supporting these applications and the HMD functionality. Local internal storage 711a, 711b may also have a storage area 717 that stores temporary and non-temporary combined safe areas, a storage for storing safe area coordinates 723 for various physical spaces.

FIG. 7 also illustrates remote network device 751 that may communicate via the Internet with XR equipment 111a, 111b. In an embodiment, many of the safe area management functions, including generation of combined safe areas and virtual partitions, and/or storage of coordinates of boundaries of safe areas, generation of guides in response to violations of the safe area boundaries, detection of a second XR device and/or an XR safe area that overlaps with or that approaches an existing safe area, and the like are handled by the remote network device 751. This may provide for a more coordinated approach to safe area management when more than one VR device is active in the same or nearly the same physical space.

FIG. 7 illustrates that remote network device 751 may include a user authenticator function 753 that may act as a gatekeeper for accessing remote network device 751 by the XR device 111a, 111b. For example, a login process may use user interface features of the VR equipment or biometric sensor data obtained from the user of the XR device 111a, 11b.

The authenticator function 753 may access a user account database 755 to perform the authentication. The same VR equipment may be used by more than one user. The system may automatically authenticate VR equipment that the system recognizes as previously registered and associated with an account, or may do so only if the VR device is detected to be in the same physical space, or using the same Wi-Fi network, as the account previously registered.

Current VR session storage 761, also shown in FIG. 7, may store current safe areas of users. More than one safe area may be associated with a VR device. For example, the system may retrieve a first stored safe area for a first VR application and may retrieve a second safe area for a second VR application. By way of illustration, a VR application that typically calls for frequent or violent movement, such as a multiplayer shooting game, may have an associated stored safe area that is larger than a VR application that calls for more cerebral activities.

Safe area merging coordinator 763 may manage data stored in current VR session storage 761 to determine safe area overlap in a physical space, and the like. A safe area intersection, such an overlap, may be detected as discussed previously herein. Safe area merging coordinator 763 may also determine that a merge of two or more safe areas is necessary.

Safe area merging function 765 may be a process invoked by safe area merging coordinator 763 when a merge of two or more safe areas is needed to arrive at a combined area. Safe area merging function 765 may determine a combined area for two or more safe spaces and then determine reconfigured safe spaces and the location of a virtual partition between them also generate a virtual partition 107.

Safe area management 767 may control safe areas for VR devices, and may modify or reconfigure safe spaces in response to activation of one or more additional VR devices in a physical space or location, deactivation of one or more VR devices in a physical space or location, overlap of safe areas, and the like. Safe area database 769 may store coordinates for various safe areas and their virtual boundaries and virtual partitions: both currently configured areas spaces in various physical spaces and as recallable safe areas that may be used later, as well. The safe areas may be recallable by the system according to the VR device, according to the VR device user, according to the VR application, according to the physical space, which may be recognized by the system, for example, according to the Wi-Fi network ID.

Figure 8:
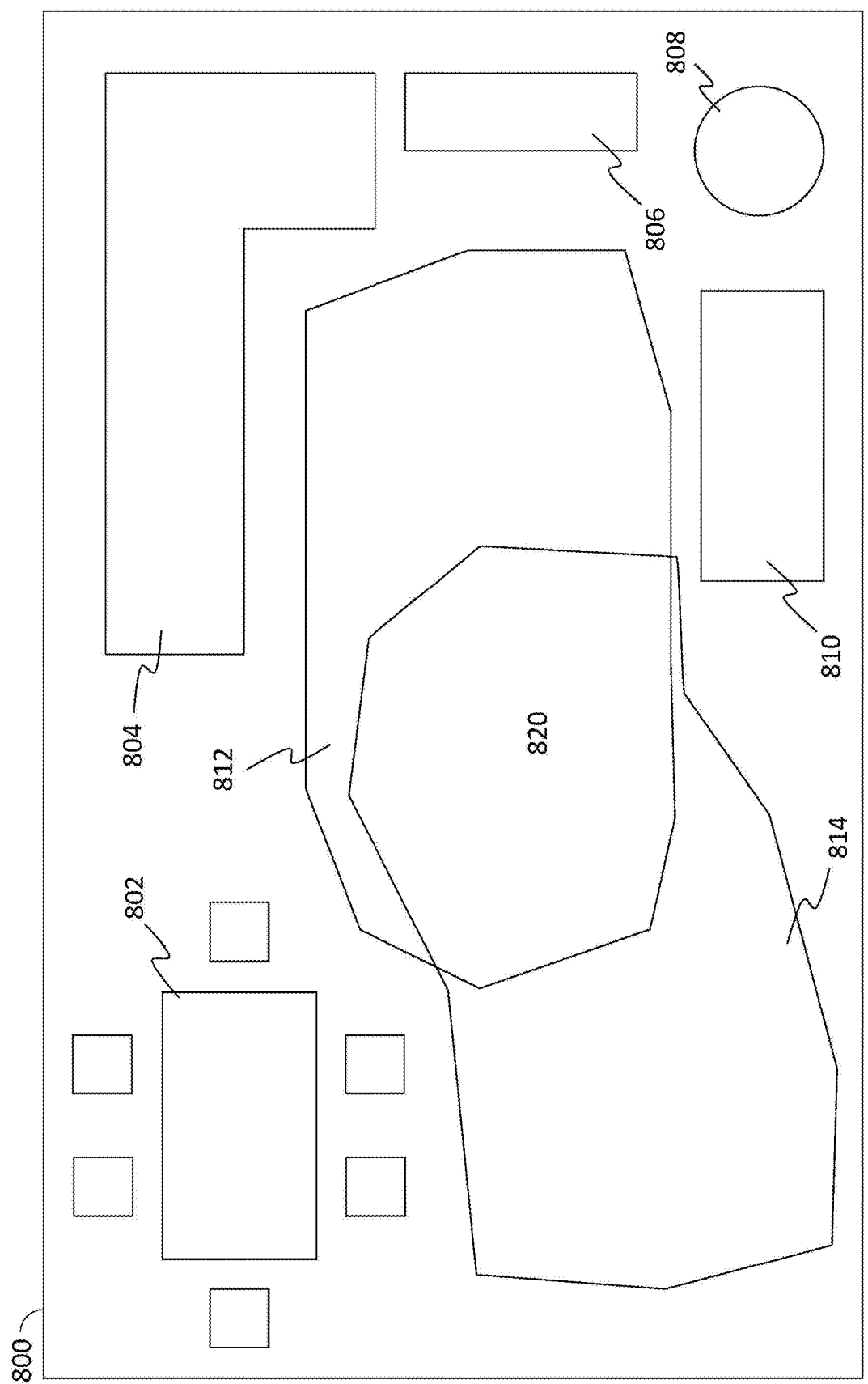
FIG. 8 illustrates an example of the first and second extended reality devices having overlapping safe areas in a physical space inside a home together with the other objects.

FIG. 8 illustrates a first safe area 812 intersecting in overlap area 820 with a second safe area 814 in room 800, rendering unsafe both safe areas 812, 814. Various pieces of furniture in room 800, including 802, 804, 806, 808 and 810, create dangerous obstacles for users of the VR equipment that are invisible to them while using the VR headsets, except in passthrough mode. While the safe areas 812, 814 are illustrated in FIG. 8 as being roughly equal in size in their original configurations, one safe area may be substantially larger than the other. In an embodiment, the system generates a combined area and allocates the reconfigured safe areas to the VR devices to reflect the size of the original safe areas. Thus, using this approach, a first VR device will be assigned a larger reconfigured safe area than the reconfigured safe area assigned to a second VR if the original safe area of the first VR device was larger than that of the second VR device. According to another approach, the size of the original safe areas is irrelevant to the size of the reconfigured safe areas.

Figure 9:
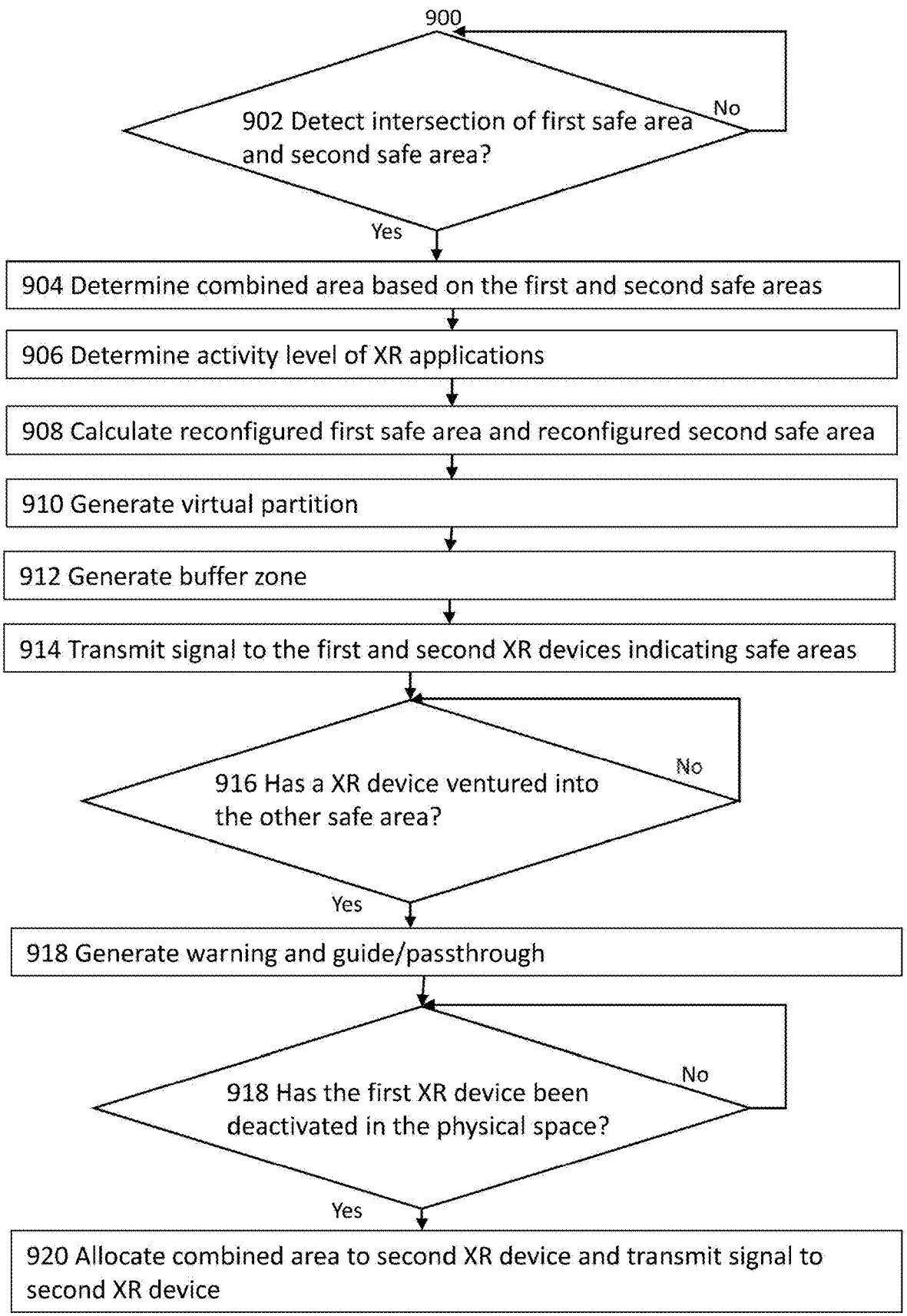
FIG. 9 illustrates an example of a process for managing safe areas for two VR devices sharing a physical space by generation of a respective safe area for each of them and for responding to a VR device straying into prohibited territory, according to an aspect of the disclosure.

FIG. 9 shows a flowchart for a process 900 according to an aspect of the disclosure. The method 900 may be implemented, in whole or in part, by the system 699 shown in FIG.

6, the system 751 shown in FIG. 7, or one or more of the XR systems 111a and 711a, 111b and 711b shown in FIG. 7. One or more actions of the method 900 may be incorporated into or combined with one or more actions of any other process or embodiments described herein. The method 900 may be saved to a memory or storage (e.g., the storage 769, 711a, 711b, of the systems shown in FIG. 7) as one or more instructions or routines, which may be executed by any suitable device or system having access to the memory or storage to implement the method 900.

As illustrated in FIG. 9, at 902 the system may detect an intersection of the first safe area with the second safe area. In particular, the system may detect that coordinates of the boundary of the first safe area cross coordinates of a boundary of the second safe area. An example of such an intersection is shown as safe area overlap 820 in FIG. 8.

If such an intersection is detected, processing continues at 904 and the combined area of the first and second safe areas may be determined. In an embodiment, the system combines the two safe areas to yield a combined area and calculates the size of the combined area. Then, according to an aspect of the disclosure, the system may divide the combined area to obtain two approximately equal safe areas separated by a virtual partition.

According to an embodiment, in calculating the reconfigured safe areas, the activity level of the XR applications is taken into account. In general, according to this approach, a XR application that tends to call for more robust activity, or for more violent movement of the arms and/or legs, or for movement in unexpected directions, or for movement over a greater range of the physical space, or that uses larger handheld equipment, or the like, or if two or more players using the same XR application are sharing a XR safe area as part of the same game, then the system may allocate to this XR device a greater share of the combined area and thus a larger safe area for that XR device may be allocated. Accordingly, at 906, the system may determine an activity level of the two or more XR applications and weight this as a factor in allocating safe areas.

In an embodiment, the size of the safe areas previously used by each XR device is taken into consideration in allocating the reconfigured safe areas. For example, the system may allocate a smaller reconfigured safe area to a XR device that had earlier used a smaller safe area. According to this approach, the portion of the combined area that the system allocates to a XR area is proportional to the size of the previous safe area for the XR device in compared to the combined area.

At 908, the system calculates the reconfigured first safe area and the reconfigured second safe area. For example, the safe areas may be reconfigured so as to maximize the usable area of the physical space available. For example, safe areas may be created such that a rounder and less elongated safe area is preferred. Such a safe area may optimize the available space for movement in various directions. According to this approach, a safe area with a larger ratio of area size ($m^2$) to perimeter (m) is preferable to a more elongated safe area.

At 910, the system may generate a virtual partition that separates the two or more safe areas. The virtual partition and the remaining boundaries of the safe area may be visible via both, or all, of the XR devices, for example, as a line that is different from or the same as the remaining boundary of the safe area. According to another embodiment, the boundaries of the safe area are visible only via the XR device to which the safe area is assigned, except that the virtual partition is visible via all XR devices with safe areas that touch the virtual partition.

Figure 13:
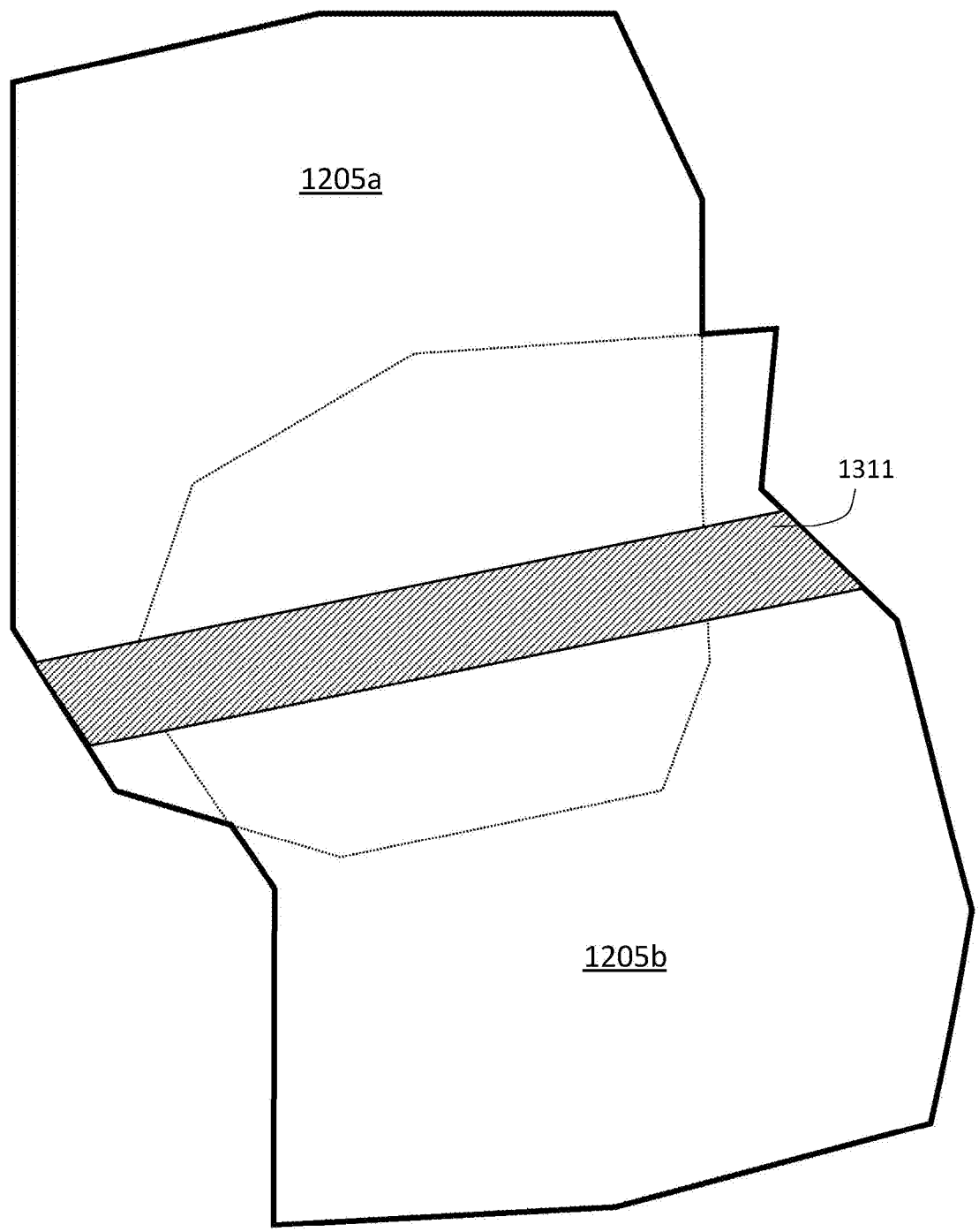
FIG. 13 illustrates an example of an outline of a combined area, showing the overlap area and a location for the virtual partition having a buffer zone separating the first and second safe areas, according to an aspect of the disclosure.

The virtual partition may also include a buffer zone between safe areas. As shown at 912 of FIG. 9, the system may generate a buffer zone 1311, for example, as illustrated in FIG. 13. The size of the buffer zone 1311 may be predetermined. In an embodiment, the buffer zone 1311 may be sized depending on the size of the safe areas.

According to an embodiment, the system sizes the buffer zone 1311 according to the activity level of one or more of the applications being used by the XR devices. For example, the system may allocate a larger buffer zone 1311 if one or more of the XR devices is using an application that tends to call for movement over a larger area in the physical space, for use of larger handheld equipment, for more frequent movement, or for more violent movements, or like.

At 914, the system transmits the coordinates of the boundaries of the safe areas and the virtual partition to the XR devices. For example, the XR devices may communicate via Wi-Fi, Bluetooth or other wireless or wired communication with a remote network edge device 751 that manages the safe areas and their boundaries.

The system may continue to monitor that each XR device operates solely within the boundaries of its allocated safe area. At 916, the system detects that a XR device has crossed over, or has entered onto the boundary of its safe area, or that it has crossed into the safe area of the other XR device. Similarly, if a new safe area has been remapped/reconfigured when the XR device is outside of the reconfigured safe area, the system may redirect the user via the headset to the newly reconfigured safe area. As discussed, the system may reconfigure one or more safe areas when a new XR joins the physical space, or when a XR leaves or is turned off and one or more existing XR users must still share the physical space but in a new way.

Figure 17:
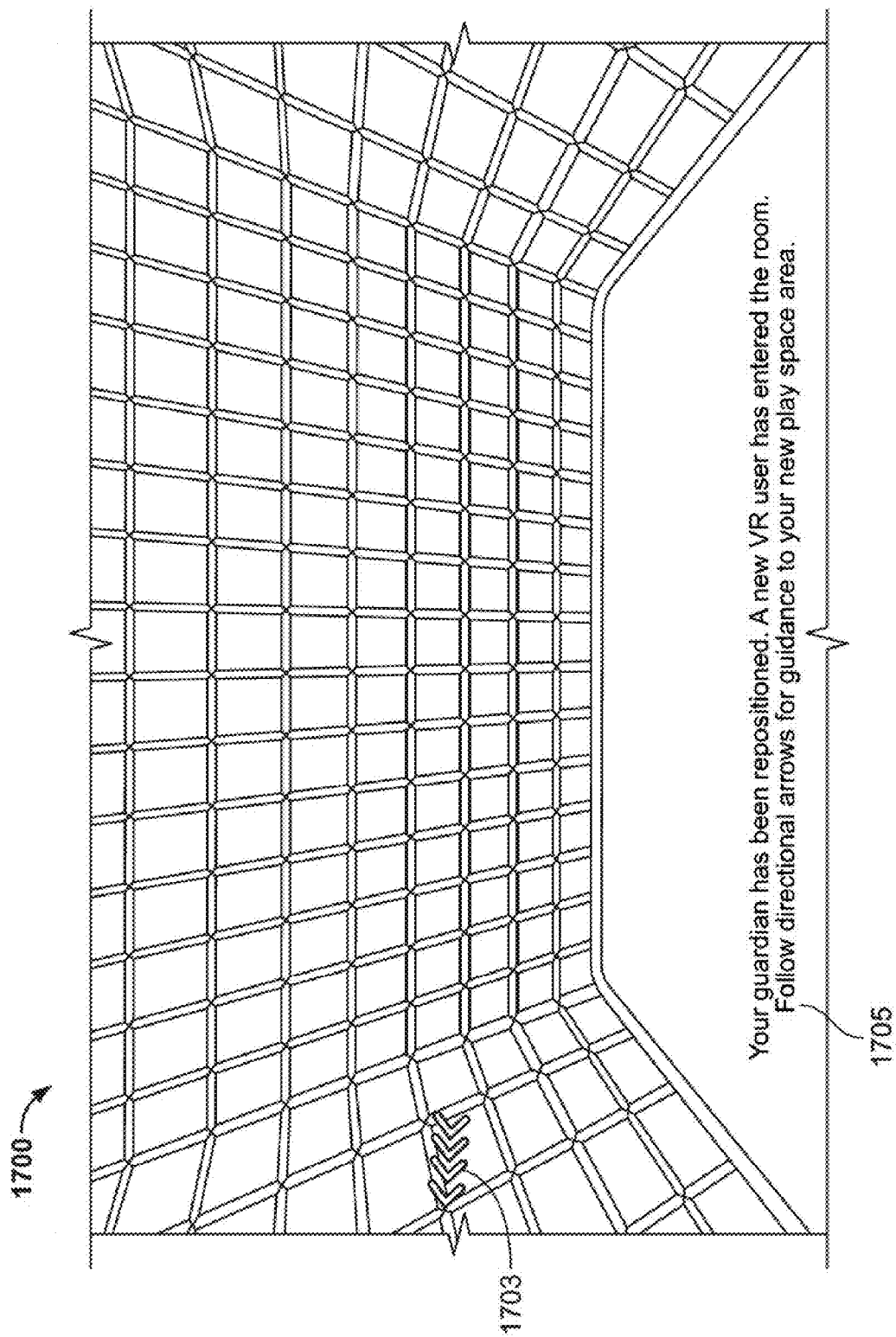
FIG. 17 illustrates an example of a process for providing guidance in a situation in which a second VR device is detected as being active in a physical space, according to an aspect of the disclosure.

At 918, the system may generate a warning visible and/or audible via the XR device alerting the user of the XR device that the XR device has ventured out of the safe area and/or that the XR device is in a safe area of another XR device. A visual or audible guide may also be provided via the XR device advising of this, as illustrated in FIG. 17. In addition, a pass through mode may be activated to allow visibility of the physical space around the XR device.

According to an aspect of the disclosure, the system generates a warning to the XR device whose safe area has been violated that another XR device has entered its safe area. Further, if there are three or more XR devices in a physical space, one or more remaining XR devices may also be issued a warning alerting the users that another XR device has entered restricted territory. In an embodiment, these other XR devices may automatically enter passthrough mode at this time.

The system may continue to monitor the movements of the XR devices within their respective safe areas. At 918 the system determines that a first XR device has been deactivated in the physical space. For example, the XR device may be turned off, the user may log off from the system, may close the XR application being used, or may exit the physical space.

In this case, the previously determined combined area may be allocated to the remaining second XR device, as shown at 920. This information, including the coordinates of the boundary of the new safe area, may be transmitted to the second XR device.

Figure 10:
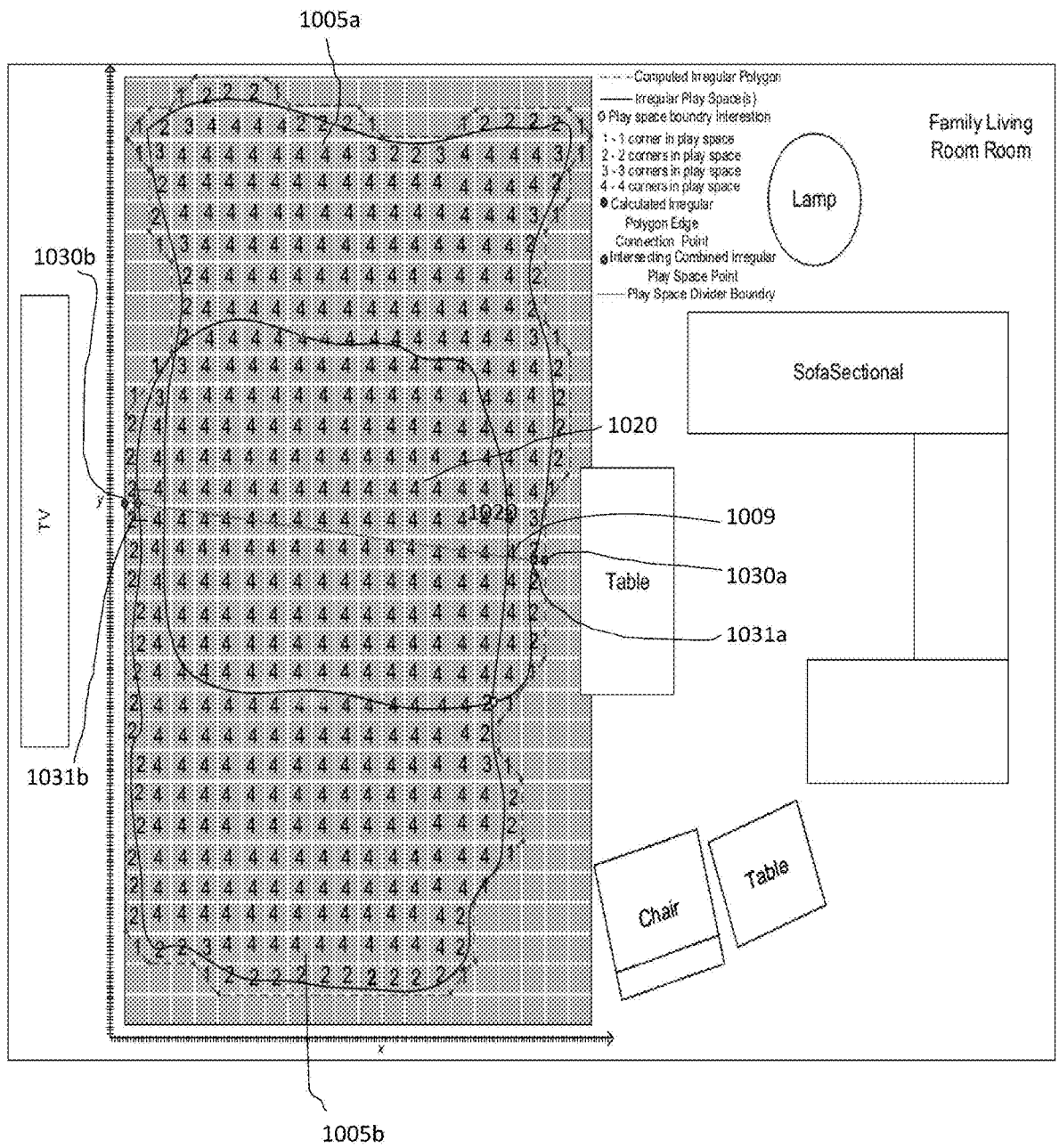
FIG. 10 illustrates an example of computation of first and second safe areas based on a grid determined for a combined area using a generated irregular polygon outlying the irregular shape of the combined safe areas, and determination of a location for a virtual partition, according to an aspect of the disclosure.

FIG. 10 illustrates an example of an approach to calculating the boundaries of the safe areas and the location of the virtual partition. According to this approach, the system generates a grid overlay for the combined area and calculates an irregular polygon straight edge for every part of the combined area boundary. The polygon generated contain the approximate area of the irregular combined shape and may be used to determine the location of the virtual partition 1009, as discussed below.

According to the approach illustrated in FIG. 10 the system assigns a number to each square of the grid: the system assigns a 4 to a square a square of the grid if the entire square is inside the combined area, a 3 is assigned the square if three corners are inside the boundary, a 2 if two of the square's corners are inside, and a 1 that if only one corner of the square is inside the boundary. Next, the system draws a polygon with straight lines connecting the corners according to the number assigned to each square of the grid. Thus, if a square of the grid was assigned a 4 then the boundary of the polygon is drawn to include the entire square. If a square of the grid was assigned a 3 then the boundary of the polygon is drawn to include all but one corner of the square. if a square of the grid was assigned a 2 then the boundary of the polygon is drawn to include two corners of the square. If a square of the grid was assigned a 1 then the boundary of the polygon is drawn to include only 1 corner of the square.

Figure 11:
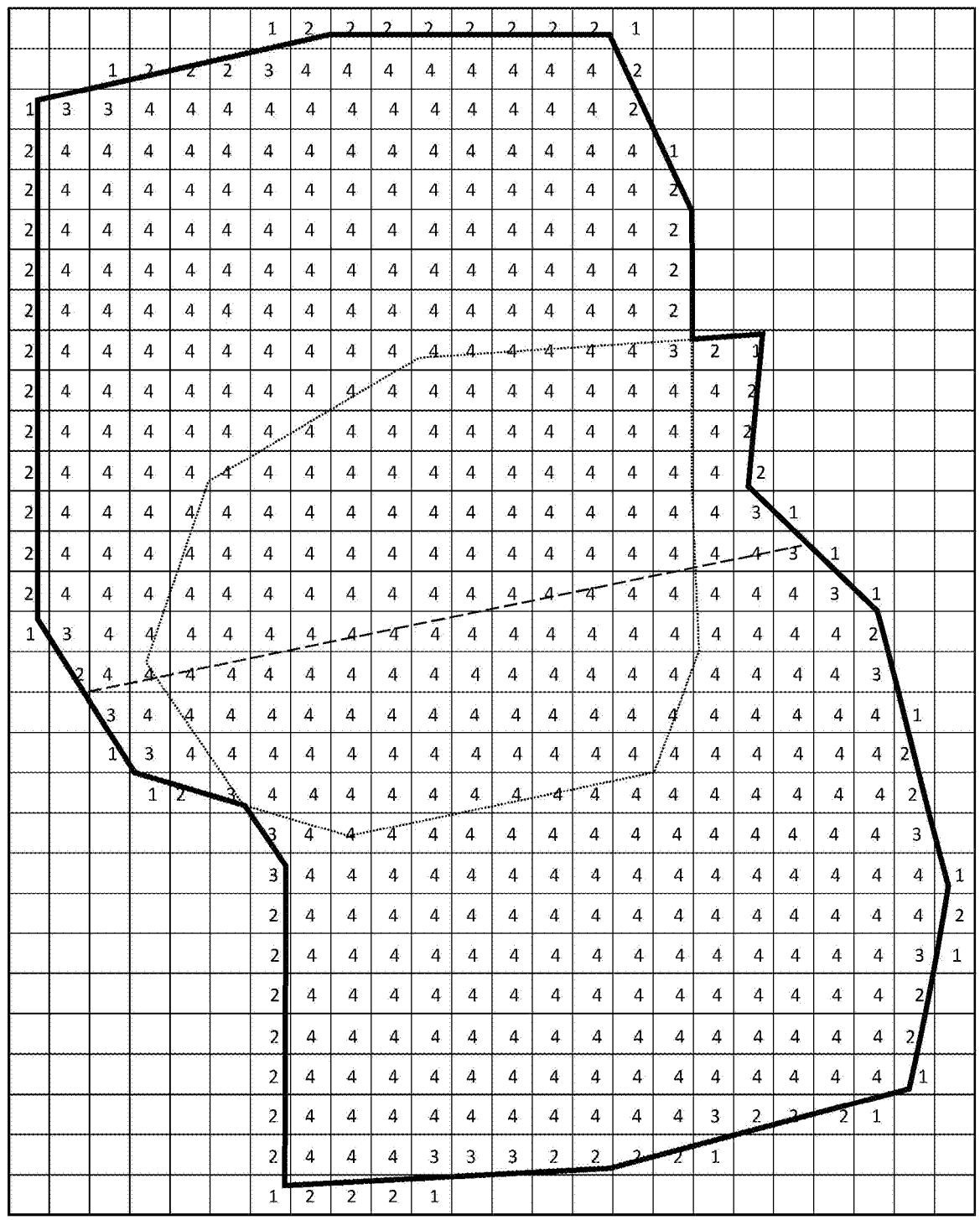
FIG. 11 illustrates an example of computation of first and second safe areas based on a grid determined for a combined area, and determination of a location for a virtual partition, according to an aspect of an embodiment.

FIG. 11 illustrates the combined area redrawn with the irregular polygon. The system may allocate the two safe areas such that each safe area has the same number of 4s, 3s, 2s and 1s. Or, the system may allocate the two safe areas such that the number of squares assigned a 1, assigned a 2 and assigned a 3 are each counted, and these sums are each discounted when calculating the total number of squares allocated to the safe area. For example, if there are 80 squares assigned 1s, then the 80 may be multiplied by 0.25, so that allotting 80 such squares with 1s is to a safe areas is equivalent to allotting 20 squares with 4s. Similarly, squares assigned a 2 may be weighted by a coefficient of 0.5, and squares assigned a 3 may be weighted by a coefficient of 0.75, while squares assigned a 4 may have a coefficient of 1.0. In this way, a fairer allotment of reconfigured safe areas may be attained.

Figure 12:
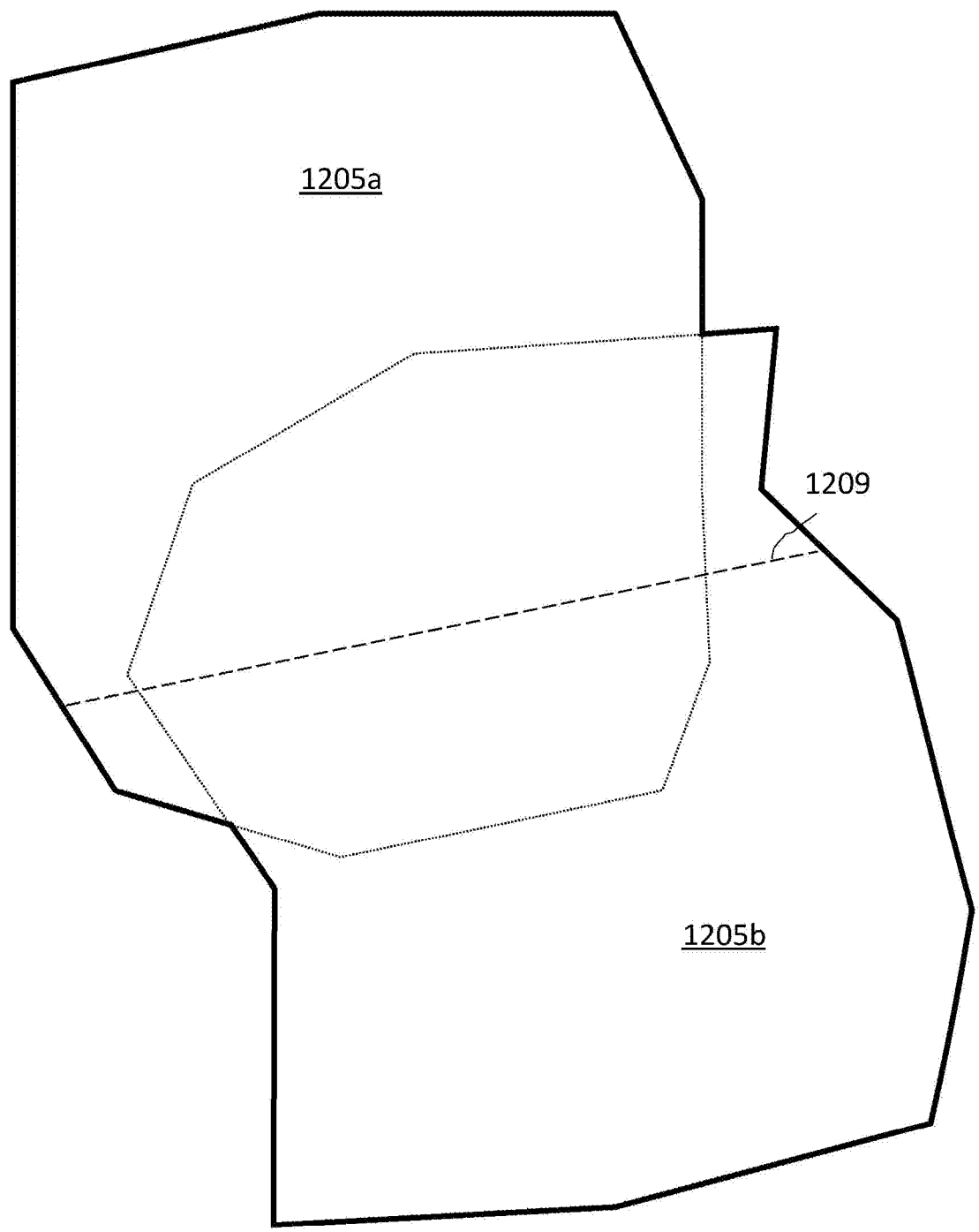
FIG. 12 illustrates an example of an outline of a combined area, showing the overlap area and a location for the virtual partition, according to an aspect of the disclosure.

FIGS. 12 and 13 show the outline of the safe areas 1205a, 1205b, the area of overlap and also shows the location of the virtual partition 1209 that will divide the reconfigured safe areas. The system calculates a combined area and allocates two reconfigured safe areas separated by a virtual partition 1209. Using the polygon with straight sides shown in FIG. 10, the system allocates safe areas 1205a and 1205b with virtual partition 1209 as shown in FIG. 12. The numbers assigned to squares as discussed above, may be taken into consideration in finding the location of the virtual partition 1209 so as to obtain a substantially even distribution of areas to safe areas 1205a, 1205b. FIG. 13 illustrates a buffer zone 1311 separating the safe areas. The boundaries of the buffer zone 1311 may be located by drawing parallel lines on either side of the virtual partition 1209 such that each of the parallel lines is equidistant from the virtual partition 1209. The virtual partition 1209 may then be replaced by the buffer zone 1311. For example, the buffer zone may be drawn so that it is 1.5-3 meters in width, or 2 meters in width, and may extend to completely separate the safe areas 1205a, 1205b.

Figure 14:
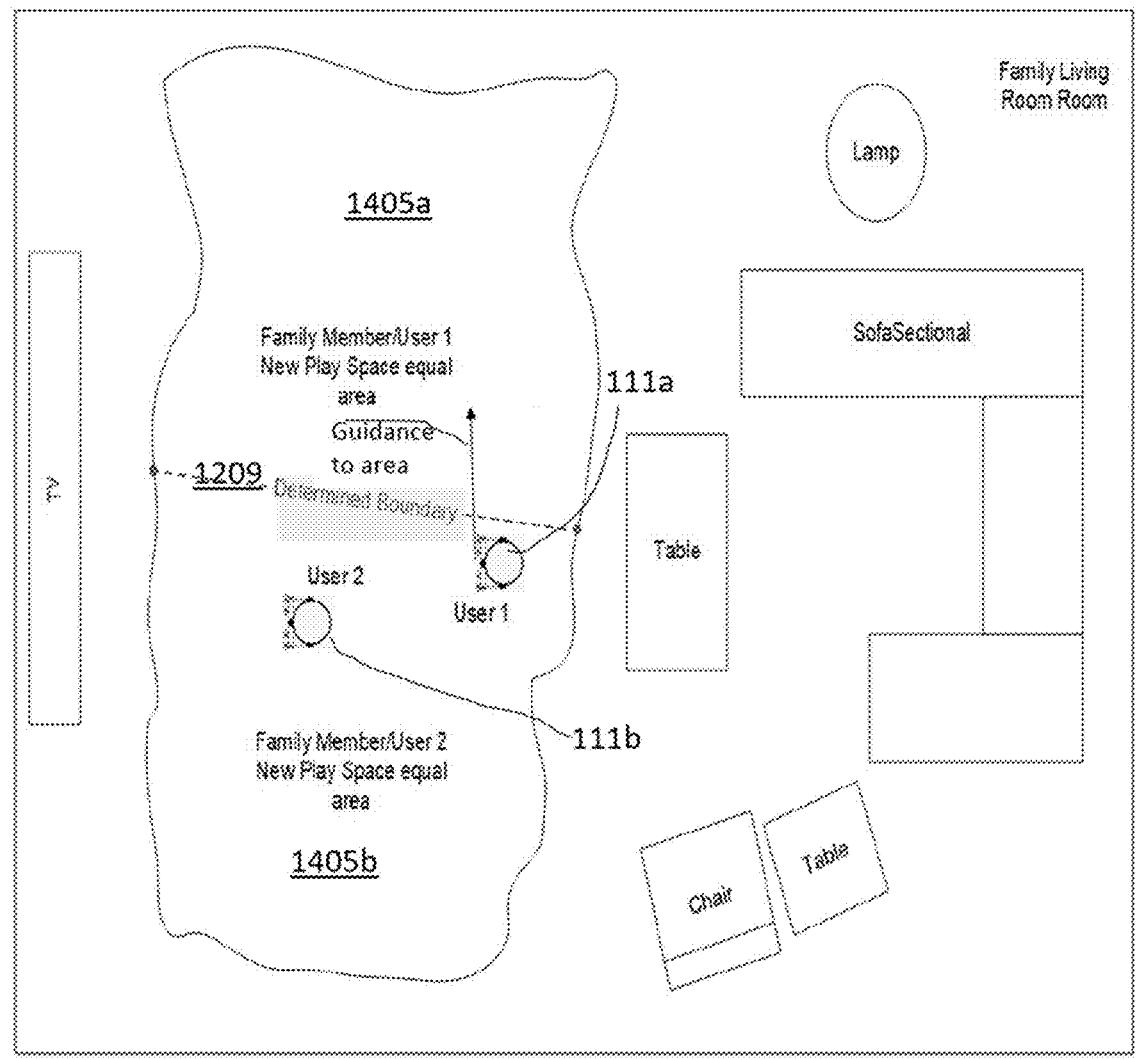
FIG. 14 illustrates an example of an outline of the first and second safe areas, and shows guidance provided via the first VR device after it had strayed into the second area reserved for use of the second VR device, according to an aspect of the disclosure.

FIG. 14 shows that the first XR device 111XR device 111a worn by User 1 has trespassed onto the safe area 1405b of the second XR device 111XR device 111b. Similarly, the system may deem a first XR user to be in a wrong space after a second XR device is powered on the device in the physical space. As a result of the newly reconfigured safe areas being allocated to the XR devices, the first XR user is outside of the new allocated safe area for the first XR user, and thus the first XR user needs guidance to move to the newly calculated safe area for the first XR user. In this case, the XR application on the first device may be suspended until the first XR user enters into the newly generated safe area. The system may enable passthrough of the first XR device 111XR device 111a to allow user 1 to see his or her surroundings. In addition, or instead, the system may generate an alert and/or a guide via the XR device 111XR device 111a to usher User 1 back to the first safe area 111a. As shown in FIG. 17 visual guidance that may be provided via a XR device to usher a XR device user to the appropriate safe area. The system may automatically generate a display providing such user guidance when a new XR device is detected as being active in the physical space. In an embodiment, the system may automatically generate a display providing such guidance when a second XR device is detected in the same safe area as the safe area of the first XR device. According to an embodiment, the system may enable passthrough modes and/or alerts for remaining XR device 111b in further response to the trespass of the first XR device 111a.

FIGS. 15A-D illustrate examples of three or more safe areas (for respectively three or more XR devices in the same physical space). The system generates a combined area in each case, as shown in FIGS. 15E-H by way of example. It will be understood that combinations of such initial safe areas and ways in which they are combined to yield combined areas are also contemplated. As shown in FIG. 15A, the initial safe areas may be drawn such that initial safe area 3 surrounds and encompasses the remaining two initial safe areas. A corresponding combined area as shown in FIG. 15B, may be based entirely on initial safe area 3 and the reconfigured safe areas 1, 2 and 3 may be allotted such that they are substantially equal in size, or as elsewhere described herein. FIG. 15B shows each of the initial safe areas 1, 2 and 3 overlapping with every other initial safe area, such that (i) each area has an area that overlaps with both of the other safe areas, (ii) each safe area has an area that overlaps with just one of other remaining safe areas, and (iii) each safe area has an area that overlaps with no other safe area. The corresponding combined safe area 15F is drawn with boundaries by tracing the outer boundary of the initial safe areas 1, 2 and 3 irrespective of areas of overlap. FIG. 15C illustrates initial safe area 1 entirely inside of each initial safe 1 and initial safe area 2. As shown in FIG. 15G, the corresponding combined area is obtained by tracing the outer boundaries of the safe areas regardless of overlapping regions. FIG. 15D illustrates overlapping initial safe areas 1 and 2 and an initial safe area 3 that does not intersect or touch initial safe areas 1 and 2. As shown in FIG. 15H, the corresponding combined area is obtained by tracing the outer boundaries of the safe areas regardless of overlapping regions. In an embodiment, the system may have a rule disallowing allotting non-contiguous fragments of an area as a reconfigured safe space. Also, the system may determine whether the size of initial area 3 is at least a threshold size. For example, the system may use a threshold of 4 $m^2$ as a minimum area that may be safely allocated as a reconfigured safe space. Following this approach, if the initial area 3 is less than the threshold of 4 $m^2$ then the initial area 3 would not be allocated as part of any reconfigured safe space. On the other hand, if the initial area 3 is at least the threshold area, then the initial area 3 may be allocated as a reconfigured safe space.

FIG. 16 shows a flowchart for a process 1600 according to an aspect of the disclosure. The method 1600 may be implemented, in whole or in part, by the system 699 shown in FIG. 6, the system 751 shown in FIG. 7, or one or more of the XR systems 111a and 711a, 111b and 711b shown in FIG. 7. One or more actions of the method 1600 may be incorporated into or combined with one or more actions of any other process or embodiments described herein. The method 1600 may be saved to a memory or storage (e.g., the storage 769, 711a, 711b, of the systems shown in FIG. 7) as one or more instructions or routines, which may be executed by any suitable device or system having access to the memory or storage to implement the method 1600.

As illustrated in FIG. 16, at 1602 the system may store a first area for a first XR device. For example, a XR session with the first XR device may be started by a first user and the system may save the first safe area associated with the session of the first XR device. Or the first XR device may be active and the first safe area may be retrieved for use with the current XR session of the first XR device.

As illustrated at 1604 of FIG. 16, the system may then detect that a second XR device is active in the physical space. For example, the second XR device may be turned on or may be brought over from a different physical space. While sometimes referred to as the second XR device, the XR device may be a XR device that is detected as active in the physical space in addition to the first two or more XR devices already sharing the physical space with a separate safe area allocated to each of the first two or more XR devices.

At 1606, the system may generate a reconfigured first safe area for the first device and may allocate a second safe area for the second XR device that has been detected in the physical space. For example, the second safe area may be a portion of the formerly first safe area that is reassigned for use of the second XR device. In an embodiment, the system determines the location of the first safe area according to the current location of the first XR device. Thus, the system may draw the boundaries of the first area and the virtual partition such that the first XR device remains located inside the first safe area. Instead, or in addition, the system may draw the boundaries of the first area and the second area according to the current location of the second XR device. According to and embodiments, the system allocates the first and second areas so as to optimize the usability of their usability without regard to the current location of the first and second XR devices. According to this approach, one or more of the first and second XR devices may be then guided to their respective safe areas using visual guidance displayed by the XR device, as shown for example by FIG. 17.

In an embodiment, the size of the reconfigured first area need not be the same need as the safe area allocated to the second XR device. As discussed, the size of the first and second areas with respect to each other may be weighted based on a number of factors.

At 1608, the system generates a display and/or audible warning via the XR devices advising of the reconfigured first safe area and the newly allocated second safe area. The second XR device thus displays the boundaries of the second safe area. According to an embodiment, the system does not generate for display at visible warning via the first XR device so as to avoid disturbing the ongoing XR session. Thus, the location of the boundaries of the first XR device may be shown as well as the virtual partition but no explicit warning need be shown by the first XR device, according to this approach. In a second embodiment, a warning is generated for display by the first XR device that the safe area of the first XR device has been changed or reduced in size.

At 1610, the system may detect that the first XR device or the second XR device is inactivated or has left the physical space.

In case the system detects that the second XR device is being turned off or that the second XR application is being exited, the system may generate a warning at 1612 via the second XR device advising the user to leave the area because the second safe area is being reallocated to the first XR device.

At 1614, the system may combine two or more areas into a combined area for use of the remaining XR device(s). In an embodiment, this may be performed by reinstating the former safe area of the first XR device as it existed prior to detection of the second XR device. Or, this may be accomplished by reinstating the former safe areas of the two or more XR devices as they existed prior to detection of the third or fourth etc. XR device that is now detected as being gone or deactivated.

At 1616, the system transmits the coordinates of the newly reconfigured first area of to the remaining XR device(s). It will be understood that coordinates of the boundaries of the safe areas and the location of the virtual partition, including the location of the buffer zone, may instead of transmitting each relevant XR device, or a location of the XR devices may be communicated to a central hub, such as the remote network edge 751 shown in FIG. 7, and the central hub may determine the location of the XR devices relative to the safe area boundaries/virtual partition/buffer zone, and then generate the appropriate displays and warnings.

FIG. 17 illustrates an example of visual guidance that may be provided via a XR device to usher a XR device user to the appropriate safe area. The system may automatically generate a scene 1700 providing such user guidance when a new XR device is detected as being active in the physical space. In an embodiment, the system may automatically generate the scene providing such guidance when a second XR device is detected in the same safe area as the safe area of the first XR device. In addition, or instead, the system may automatically generate a display providing such guidance when a previously detected second XR device assigned its own safe area is detected operating in the safe area of the first XR device. In such a case, the system may cause such a guiding display by the errant XR device. According to an embodiment, the system may cause such a guiding display 1703, including visual guides to indicate that some areas are off limits and to indicate a recommended direction of movement by the errant XR device, or by the newly active XR device, as well by one or more of the other XR devices active in the physical space, and/or may cause a passthrough and game halt mode also in one or more of the other XR devices. Such a user guiding display may also be accompanied by visual display of a textual notification 1705, and my include one or more audible signals or verbal audio warnings and/or by audible instructions and directions to cue XR users onside (back to the currently allocated safe area of the XR device). As shown, a passthrough mode may be provided simultaneously with a virtual display to guide the user of the XR device.

Figure 18A:
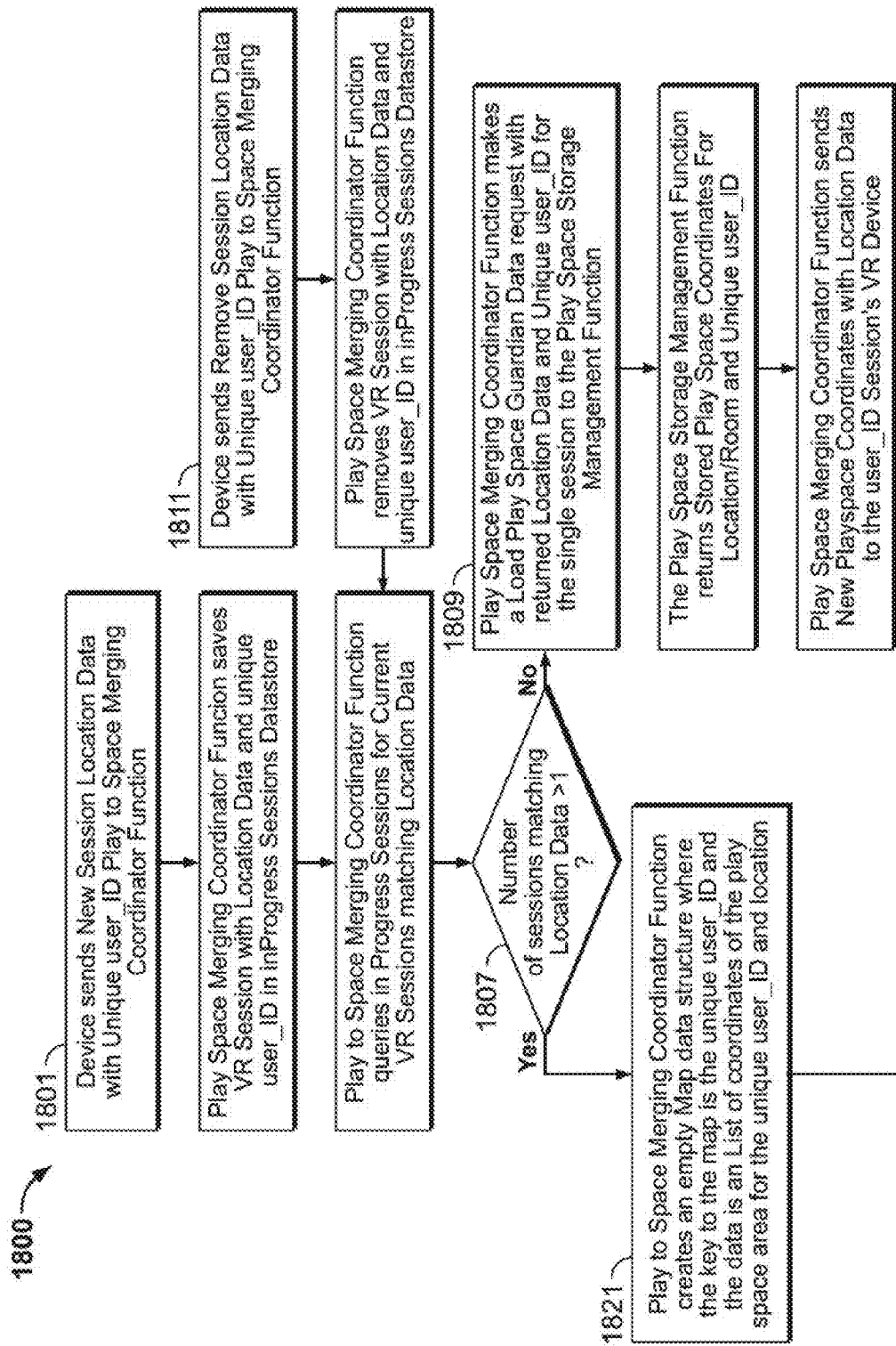
FIGS. 18A-B illustrate an example of the system receiving a new VR session request, or receiving a remove VR session request, with regard to a VR device in a physical space, and this request results in a change of the boundaries of the safe area.
Figure 18B:
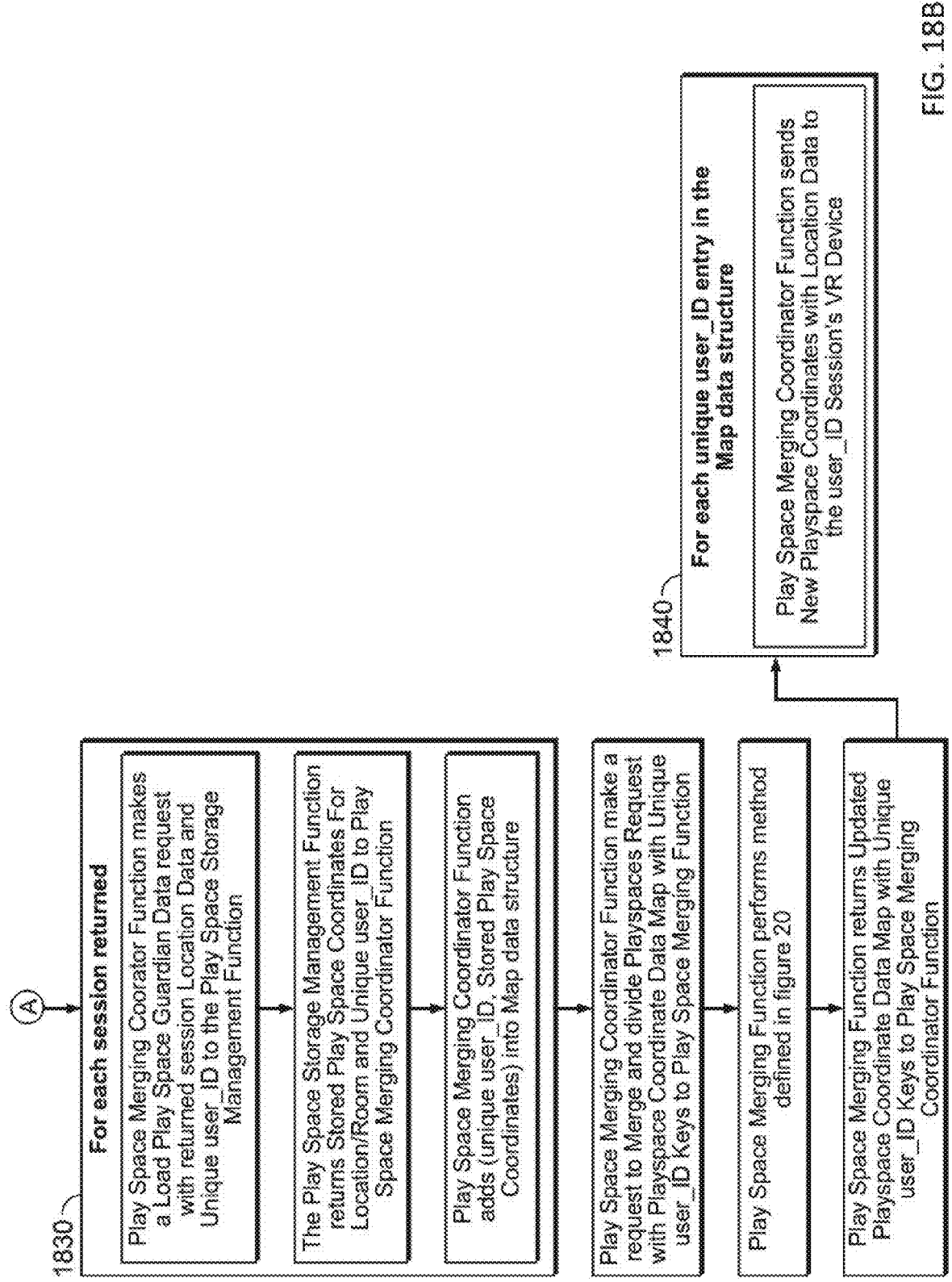

FIGS. 18A-B illustrate an example of the system receiving a new XR session request, or receiving a remove XR session request, with regard to a XR device in a physical space. This request results in a change of the boundaries of the safe area.

Starting at 1801 the system receives a new session request. For example, a XR device is turned on and is connected to a network.

Starting at 1811 the system receives a remove XR session request. This may be received by the safe area merging coordinator function, which removes the safe area that belongs to the corresponding XR device. The XR session is then ended.

At 1807 of FIG. 18, the system determines whether more than one XR devices are active in the physical space. If one or more additional devices are present, then initial safe areas need to be combined, as discussed herein. The determination as to whether more than one XR device is active in the physical space may be made each time a new, or newly, active XR device is detected in the physical space. The location of the physical space, for example, in a living room, may be previously defined and stored by the system to determine the presence of more than one active XR device. Or, a newly activated XR device may be deemed to be in the physical space if it is determined to be connected as part of the same Wi-Fi network as another XR device and to be no more than a threshold distance away, for example, 15 meters, or 10-35 meters away, from the other XR device. In an embodiment, this distance for the system determining whether active XR devices are sharing a physical space may be set according to the layout and size of the room in which the XR devices are used. A larger room may mean that a user may wish to set the definition of the physical space for XR use to be larger and thus the system would determine that any newly joining XR device is in that larger physical space and would combine the safe area of the newly joining XR device with that of any other XR device in the physical space and reallocate/reconfigure safe areas for each XR device. Accordingly, a user interface may be provided to enable convenient setting by a user of the size of the physical space and/or a location of the physical space within a given Wi-Fi range or within a given room layout. Such a user interface may be provided via an HMD or via a smartphone/tablet/laptop/desktop/game console/set top/TV remote control interface, or the like.

If no other XR device is detected in the physical space, then starting at 1809 the system updates the safe area of the remaining XR device(s) to allocate all of safe area to it/them. There is thus no need to combine and reallocate safe areas at this time. The system may continue to monitor for the activation of a new or newly activated XR device.

On the other hand, if at 1807 the system determines that more than one XR device is (or are) active in the physical space, then starting at 1821 reconfigured safe areas are calculated and stored for each XR device that is active in the physical space, and the location of the boundaries of the reconfigured safe areas are transmitted to the XR devices. A new or newly active XR device may be notified in this way as well as XR device that have been active until now of their respective safe areas.

At 1830, for each XR session identified, the coordinates of the stored safe areas are retrieved, and the Merging Coordinator Function requests a merge and divide operation to Space Merging Function. This may entail the steps detailed below with regard to further figures.

At 1840, the reconfigured safe area coordinates to the corresponding XR device. In addition, or instead, a central node in the cloud, such as XR service provider, may retain the reconfigured safe area coordinates.

FIG. 19 illustrates a safe area merging process according to an aspect of the disclosure. At 1901, a request is received to merge two more place safe areas and to divide them into reconfigured safe areas. The request may be triggered by detection of a newly detected XR device in the physical space.

At 1903, the safe areas are merged into a combined area. As shown in FIGS. 15A-15H, the combined area may be obtained by identifying the outer boundary of each initial safe area. Each initial safe area may have been created by a user marking out the boundary of the safe area, for example, using a laser pointer connected to the XR device and/or the XR system, and these initial safe area boundaries are stored in association with each XR session of each XR device. Or, the initial safe area may be stored from a previous XR session.

At 1905, a grid of squares is overlaid to determine the number of corners for each square of the grid that is inside the irregular shape. As discussed, the system assigns a number to each square of the grid: the system assigns a 4 to a square a square of the grid if the entire square is inside the combined area, a 3 is assigned the square of the grid if three of its corners are inside the boundary, a 2 is assigned to a square if two of the square's corners are inside, and a 1 is assigned if only one corner of the square is inside the boundary.

At 1907, an irregular polygon is generated to approximate the irregular shape of the combined area. The system draws a polygon with straight sides according to the number that was assigned to each square of the grid based on the irregularly shaped combined area. Thus, if a square of the grid was assigned a 4, then the boundary of the polygon is drawn to include the entire square. If a square of the grid was assigned a 3 then the boundary of the polygon is drawn to include all but one corner. If a square of the grid was assigned a 2, then the boundary of the polygon is drawn to include two corners. If a square of the grid was assigned a 1 then the boundary of the polygon is drawn to include just one corner.

At 1909, the polygon is divided into the number of equal areas corresponding to the number of active XR devices. The polygon may be used to facilitate dividing the combined area into equal size reconfigured areas, or to facilitate location of the virtual partition between the reconfigured safe areas.

At 1911, the intersection coordinates are determined where the polygon points are to be joined with the points of the irregular shape where the virtual partition is to be drawn. The polygon is generated to aid in determining the location of the virtual partition and at this juncture in the process, the start and end points of the virtual partition to be drawn have to be mapped onto the irregular shape of the combined area.

At 1913, a list of the coordinates of the boundaries of the reconfigured play spaces is generated. In an embodiment, the coordinates of the boundaries of each reconfigured safe area are generated based on the reconfigured safe areas. Once the coordinates of the virtual partition are known, these coordinates may be added to the list of boundary coordinates of each safe area. A virtual partition, or portions thereof, may comprise part of the boundary of two, three or more safe areas.

As shown at 1915, the updated safe area coordinates are then transmitted to the play space merging coordinator function. A unique ID may be assigned to each safe area, which is assigned to a respective XR device for a XR session. A single transmission to all devices in the physical space, for example, using Wi-Fi, may contain coordinates for each device's safe area. In an embodiment, the system may delay transmitting the safe area coordinates to the newly active device to give users of XR devices that have been active an opportunity to relocate to their respective reconfigured safe areas. For example, this delay may be 10 seconds or 5-15 seconds.

Figure 20A:
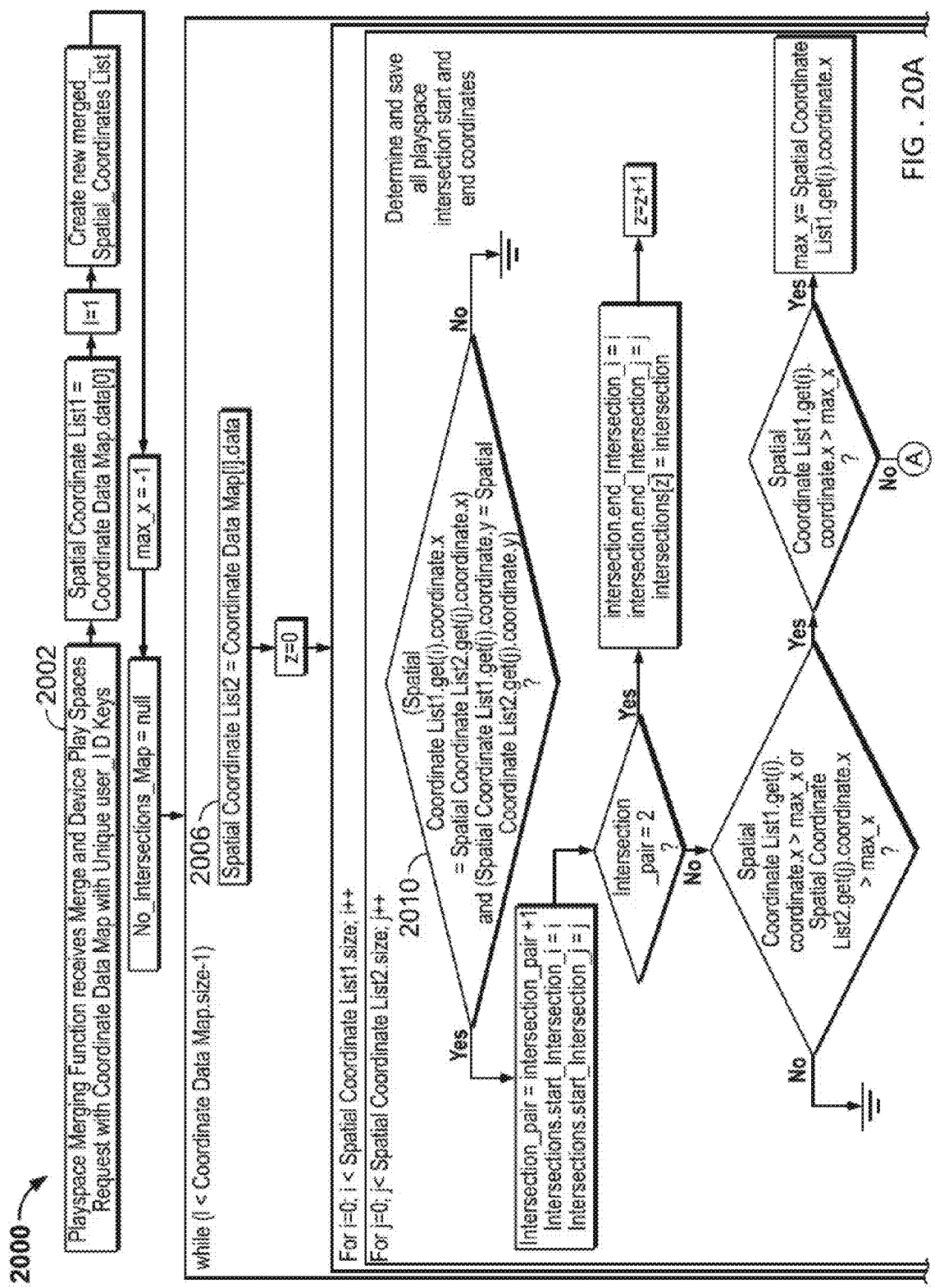
FIGS. 20A-C are a flowchart showing an example of a process for merging safe areas of irregular shapes into a combined area of irregular shape.
Figure 20B:
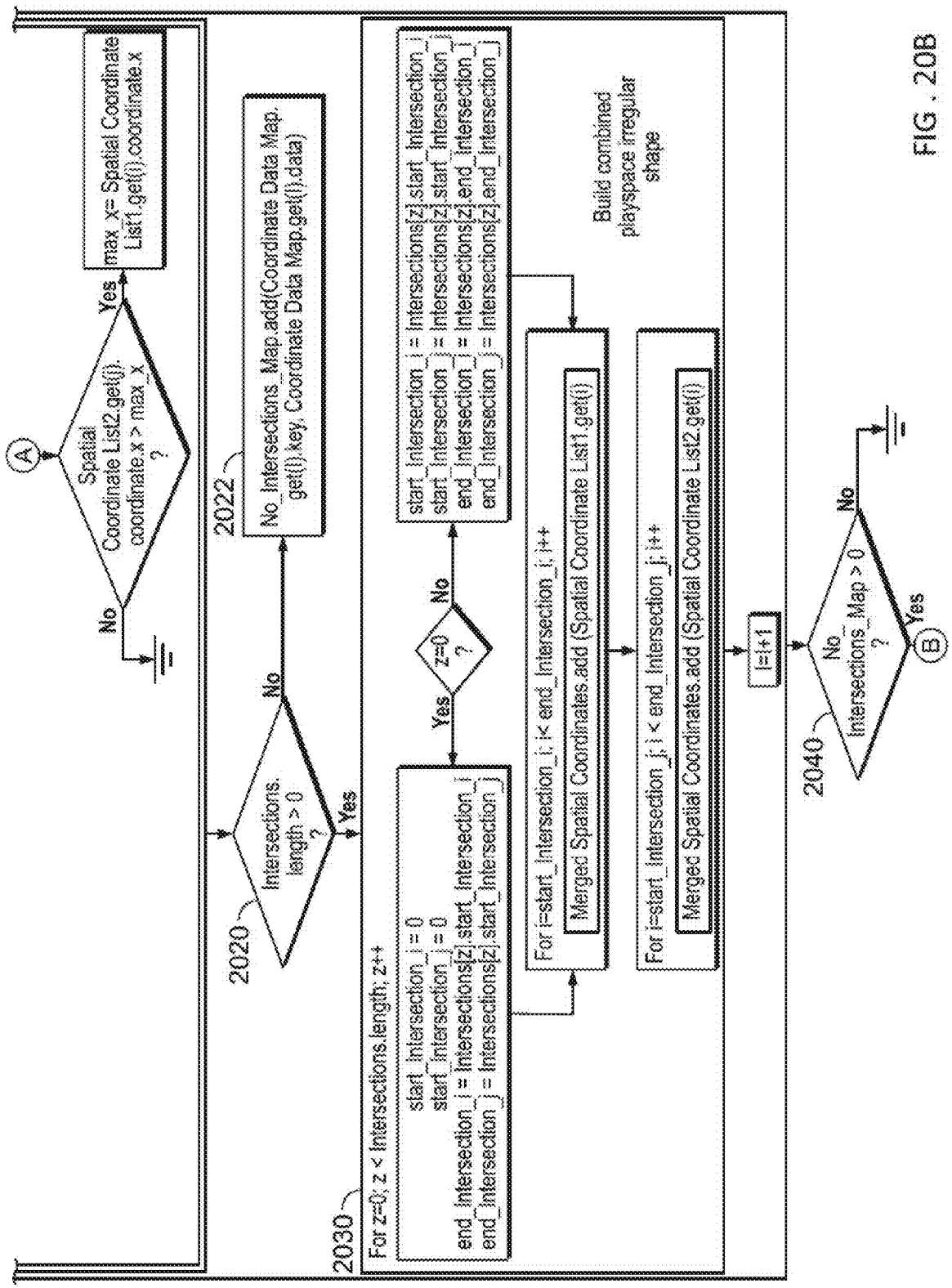
Figure 20C:
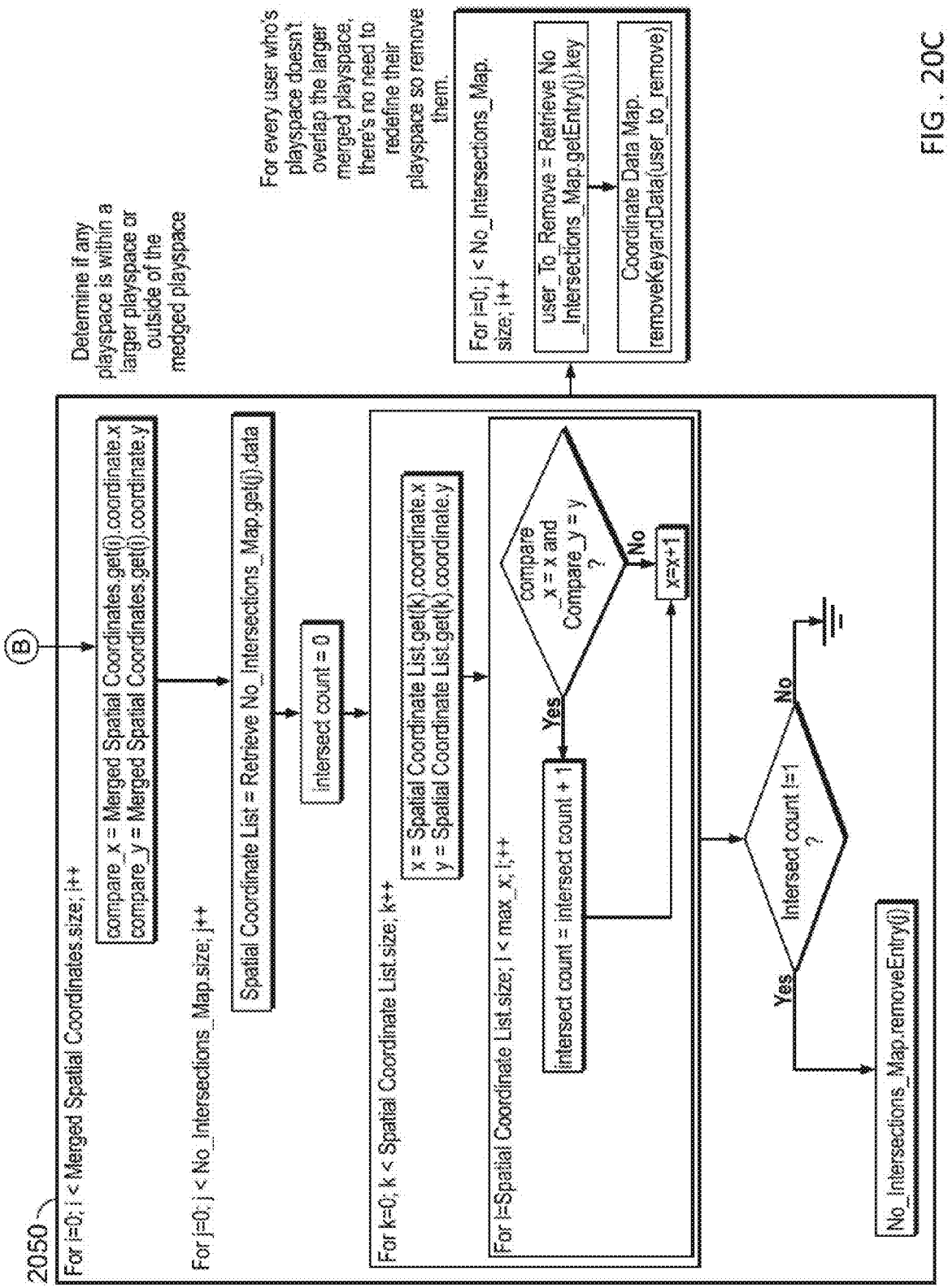

FIGS. 20A-C area flowchart showing an example of a process for merging safe areas with irregular shape into a combined area of irregular shape. Also, the flowchart illustrates a process for determining that one or more safe areas is entirely inside of another safe area, and for determining that safe areas do not intersect each other.

At 2002, play space merging function receives a merge request. The request may include, or may be followed by, receipt of coordinates of the current safe areas or the coordinates of their boundaries. A combined list of all safe area boundary coordinates may be generated.

At 2006, a coordinate list of just the outer boundary of the combined area is created. This may be an irregular shape with curvilinear boundaries. If the object is to generate reconfigured safe areas of approximately equal size, then the coordinates of the original safe areas inside the outer contour of the combined area are irrelevant.

At 2010, the system determines whether there is an intersection between the current safe areas. This may be done by iterating through the coordinate list of their boundaries, for example, stored as x, y coordinates mapped onto the physical space, and identifying any intersection. In an embodiment, an overlap of the safe areas may be understood as a type of intersection. An intersection may also include a situation in which safe area boundaries touch one another or are close to contacting, for example, less than 2 meters, or less than 1-4 meters apart. In an embodiment, an intersection of safe areas is determined only if the safe area boundaries intersect at at least two points—that is, if a pair of coordinates is found at which the safe area boundaries are collocated.

At 2020, it is determined whether an intersection has been found to exist between boundaries of any of the current safe areas. If not, then at 2022 processing continues 2040. In an embodiment, the XR devices need not be notified if there are no update to their safe areas. On the other hand, if there an intersection, processing continues to 2030.

At 2030, using an iterative process, a new list of outer boundary coordinates defining the irregular shape combined area is built. Each coordinate may be defined by an x and y value, for example, with positive x and y values for all coordinates of the irregular combined shape.

At 2040, it is determined whether the number of intersections between current safe spaces is zero. If there are no intersections, then processing continues to 2050 to check for any safe areas located inside of another. That is, boundaries of safe areas may not intersect but there may be a situation in which one safe area is located entirely inside of another.

At 2050, through an iterative process whether there is a safe area inside of another a second safe are without intersecting borders. If a safe area is found to be located entirely inside another then the combined area is determined by removing the boundaries of the inner safe area and the system allocated separate non-intersecting safe areas. The system may iterate through each coordinate of the boundary of a first safe space to determine whether it is inside of another. This process may be repeated if more than one safe area is found inside of another. In an embodiment, the system may have a threshold minimum area that may be allocated to a safe space. Thus, if a combined area does not afford two or more safe areas of a predetermined threshold size then it may transmit an alert to one or more of the XR devices informing that it is unsafe to proceed with the XR session. For example, the threshold size may be a contiguous area 2 m wide and 2 m long, or 1.5-5 m wide and 1.5-5 m long. In an embodiment, the XR device whose session was earlier commenced may be allowed to continue in the originally created safe area for the XR device, or in the combined safe area, and the system may generate notification to remaining XR devices to leave due to insufficient safe area space.

At 2060 non-intersecting coordinates of the borders of safe areas inside the second safe area are removed. These internal borders may be obsolete because the system will allot reconfigured safe areas to each XR device such that the safe areas do not overlap.

Figure 21A:
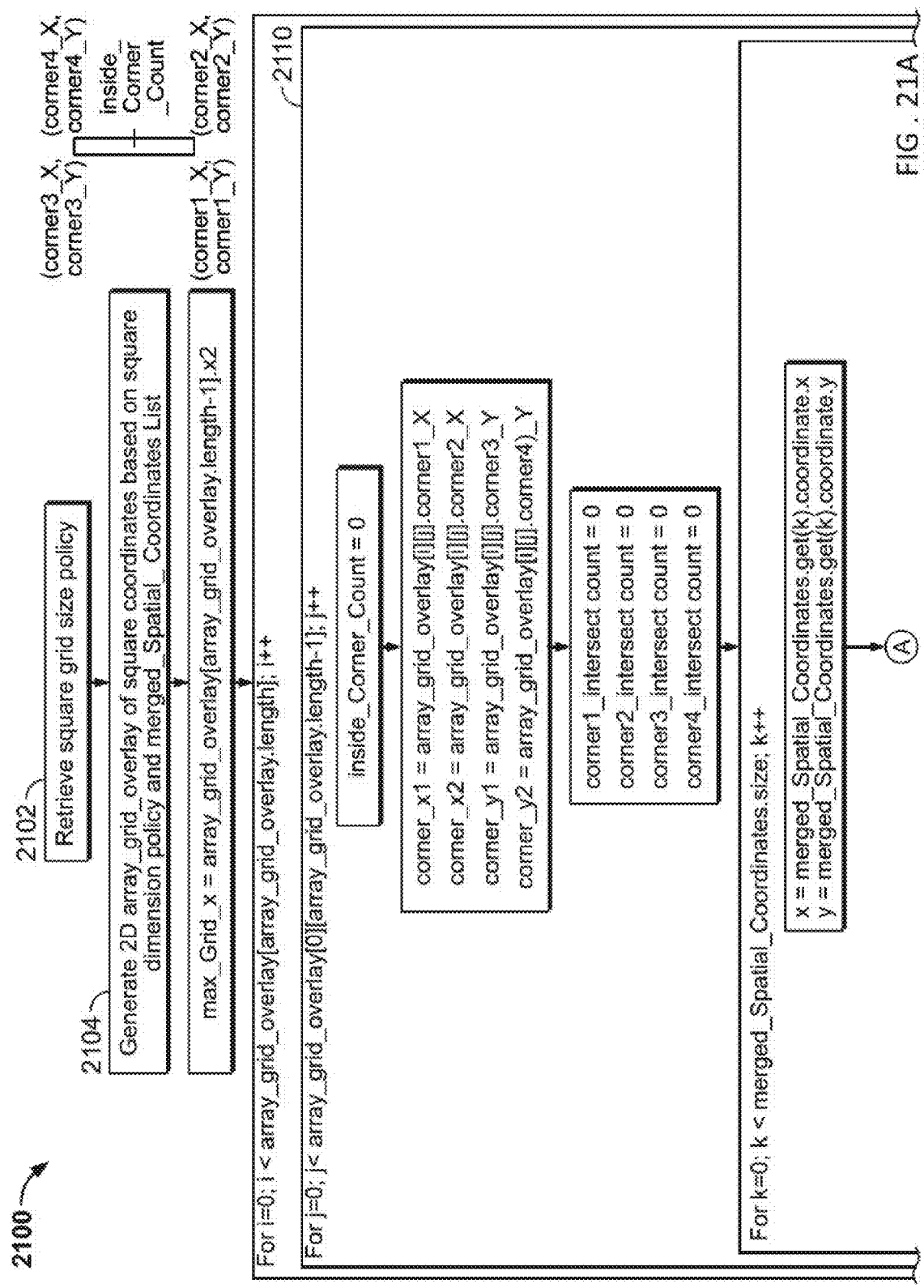
FIGS. 21A-C show an example of a process that determines the number of corners of each square of a grid that is overlaid by the irregular shaped combined safe area.
Figure 21B:
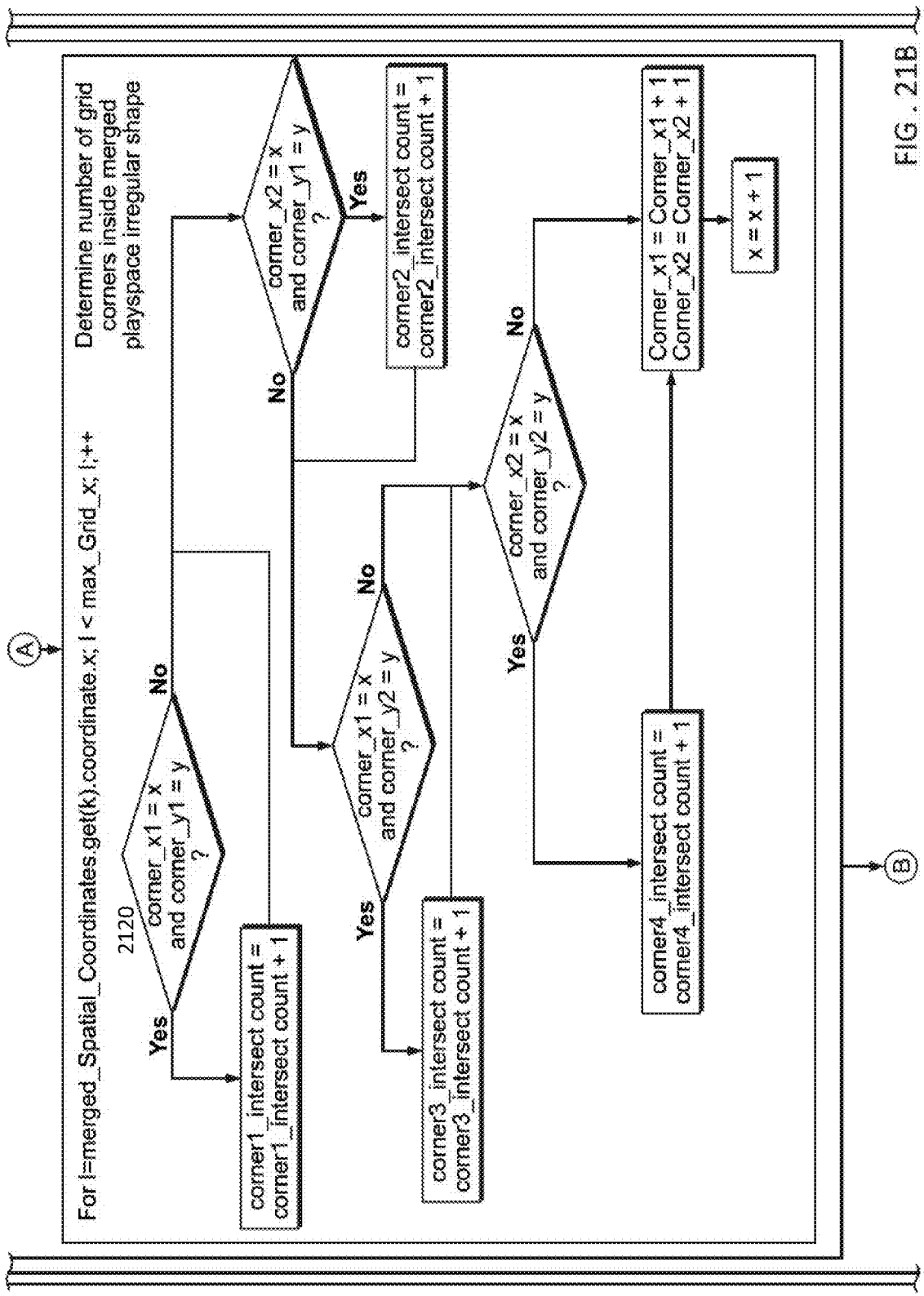
Figure 21C:
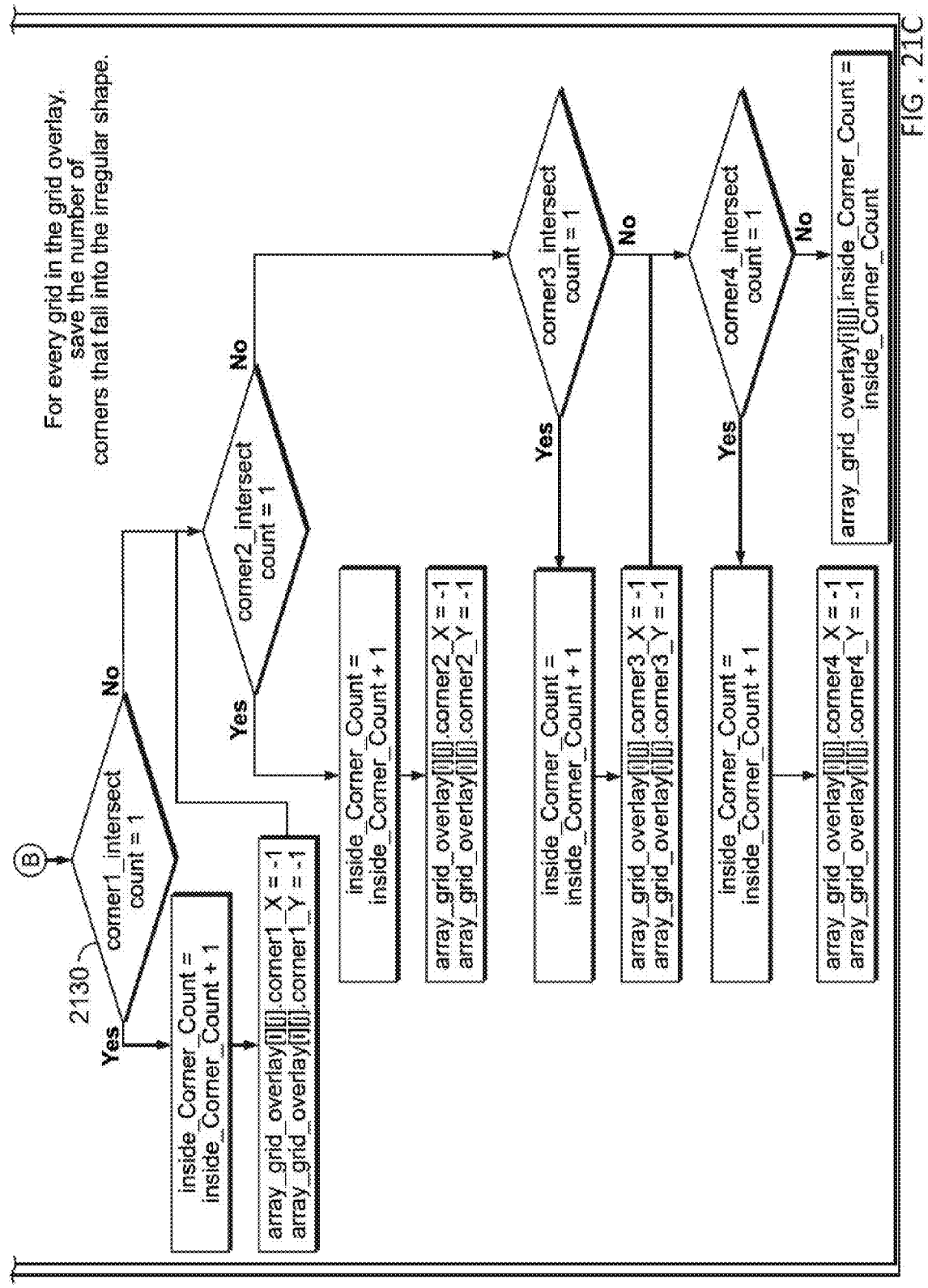

FIGS. 21A-C contain a flowchart showing an example of a process for determining the number of corners of each square of a grid that is overlaid over the irregular shaped combined safe area. According to an embodiment, the location of the virtual partition may be determined by first generating an irregular polygon using such a grid. It will be understood that other methods for generating reconfigured safe areas with a virtual partition dividing them are also contemplated.

At 2102, a square grid size policy is retrieved. In general, the smaller the squares of the grid, the more accurate will be the generation of safe areas of equal size with virtual partition.

At 2104, the two dimensional array is overlaid over the irregular shape combined area. The overlay may be generated such that each square is defined by four pairs (x and y values for each pair) of coordinates.

Starting at 2110, each square of the grid, the system may determine a number according to the number of its corners inside the boundary of the irregular shape that defines the combined area. Thus, if the irregularly shaped curvilinear combined area intersects a square of the grid such that three of the square's corners are inside the irregular area, then the square is assigned a 3. A square of the grid is assigned a 2 if two of its corners are inside, and is assigned a 1 if just one of its corners is inside the irregular curvilinear shape. A square is assigned a 4 if the entire square is inside. The system may also keep track of the number of each type of square, the number of squares assigned 4, the number of squares assigned 3, the number of squares assigned 2, and the number of squares assigned 1.

At 2120, the numbers determined in this way for each square are saved in an array data structure. These assigned numbers will be used to determine the irregular shaped polygon. It will be understood that other ways may be used to approximate a polygon based on an irregular shaped curvilinear figure.

FIG. 22 is a flowchart showing an example of a process for generating the polygon with straight sides over the combined area with irregular shape. The polygon is determined by drawing straight lines according to the number of corners of each square of the grid that is overlayed over the combined area of irregular shape.

At 2210, the known coordinates of the polygon are retrieved. All squares of the grid assigned a 4 will be entirely within the generated polygon. The edges of the polygon shown are connected based on the numbers assigned to the squares of the grid to produce the polygon illustrated by way of example in FIG. 12.

At 2220, for each square of the grid, the system determines whether its y coordinate is divisible by 2 (is even), in which the system will iterate through the row of grids by counting up, or is not (odd), in which case it will count down. In either case, the system connects the lines to generate the polygon, according to the process shown in FIG. 23.

Figure 23A:
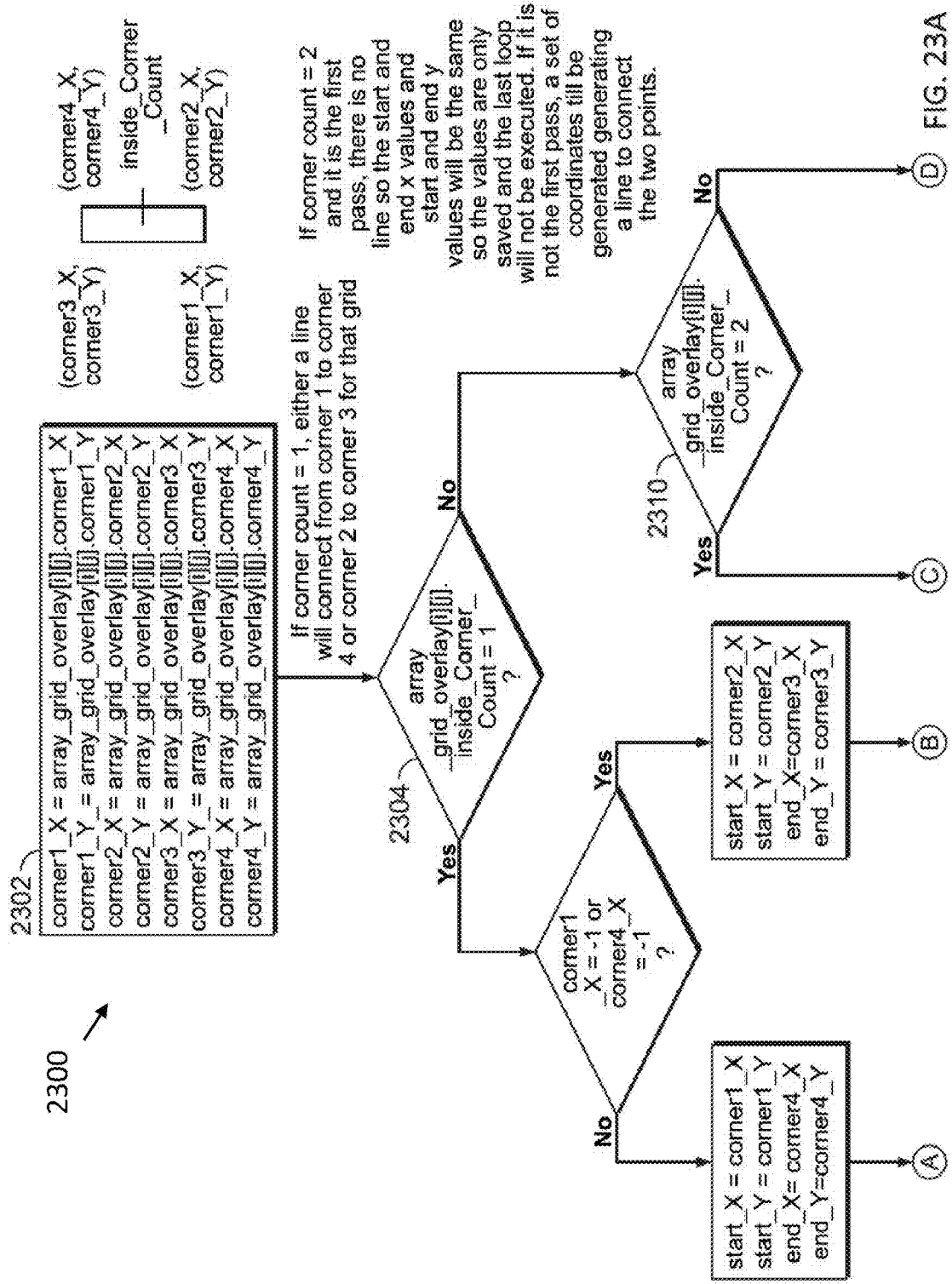

FIGS. 23A-C are a flowchart providing an example of a process for connecting points to generate a straight side of the polygon.

At 2302, a data structure that contains the coordinates of the corners of each square of the grid is retrieved. Each square of the grid may be defined by its four corners, each corner being defined by a pair of coordinates (x, y). The data structure may also contain an integer 1-4 denoting the number assigned previously to the square, as described above.

At 2304, the system determines whether the square was assigned a 1. If yes, then a diagonal line will be drawn from one of its corners to connect to the next square.

At 2310, the system determines whether the square was assigned a 2. If yes, then a line will be drawn along an edge of the square to connect to the next square.

At 2320, the coordinates of the slope of the line connecting to the next square are calculated for the diagonal lines to be drawn. The slope may be positive or negative in the case of squares assigned a 1. This slope is used to drawn the line connecting points of the squares to create the polygon.

Figure 24:
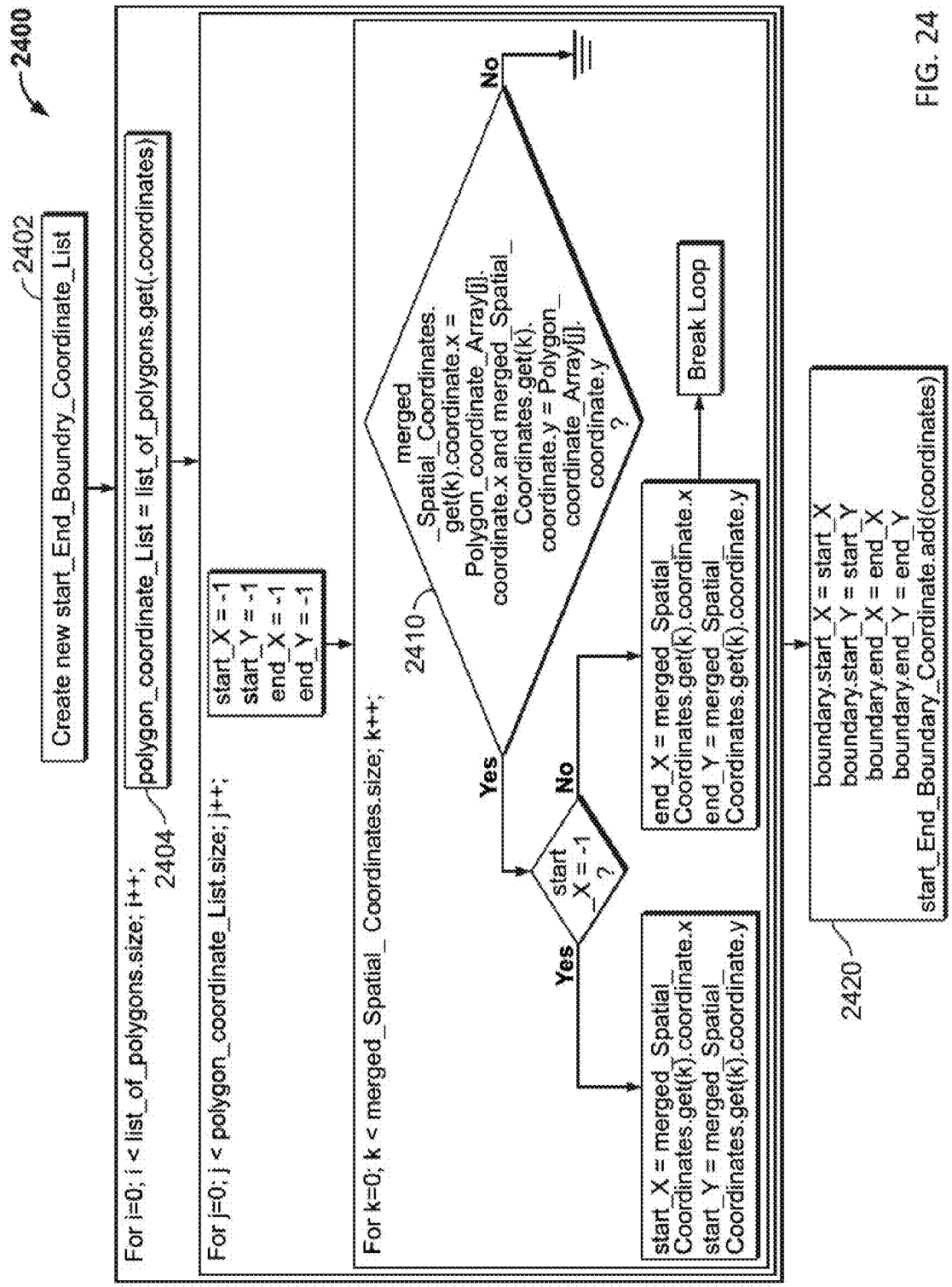
FIG. 24 is a flowchart showing an example of a process for determining the intersection of boundary lines.
Figure 25A:
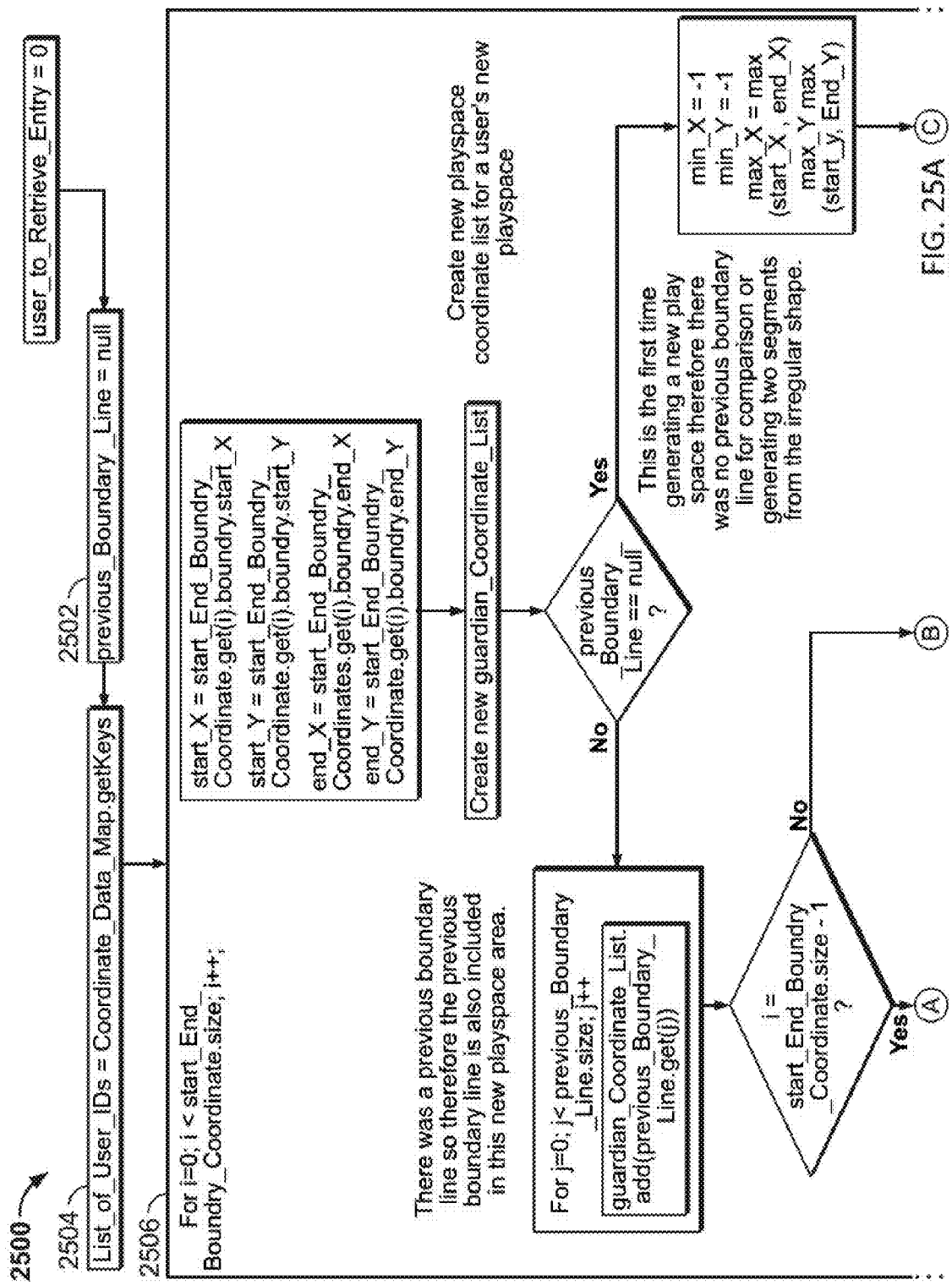
FIGS. 25A-E contain a flowchart illustrating an example of a process for generating coordinates for each of the reconfigured safe areas.
Figure 25B:
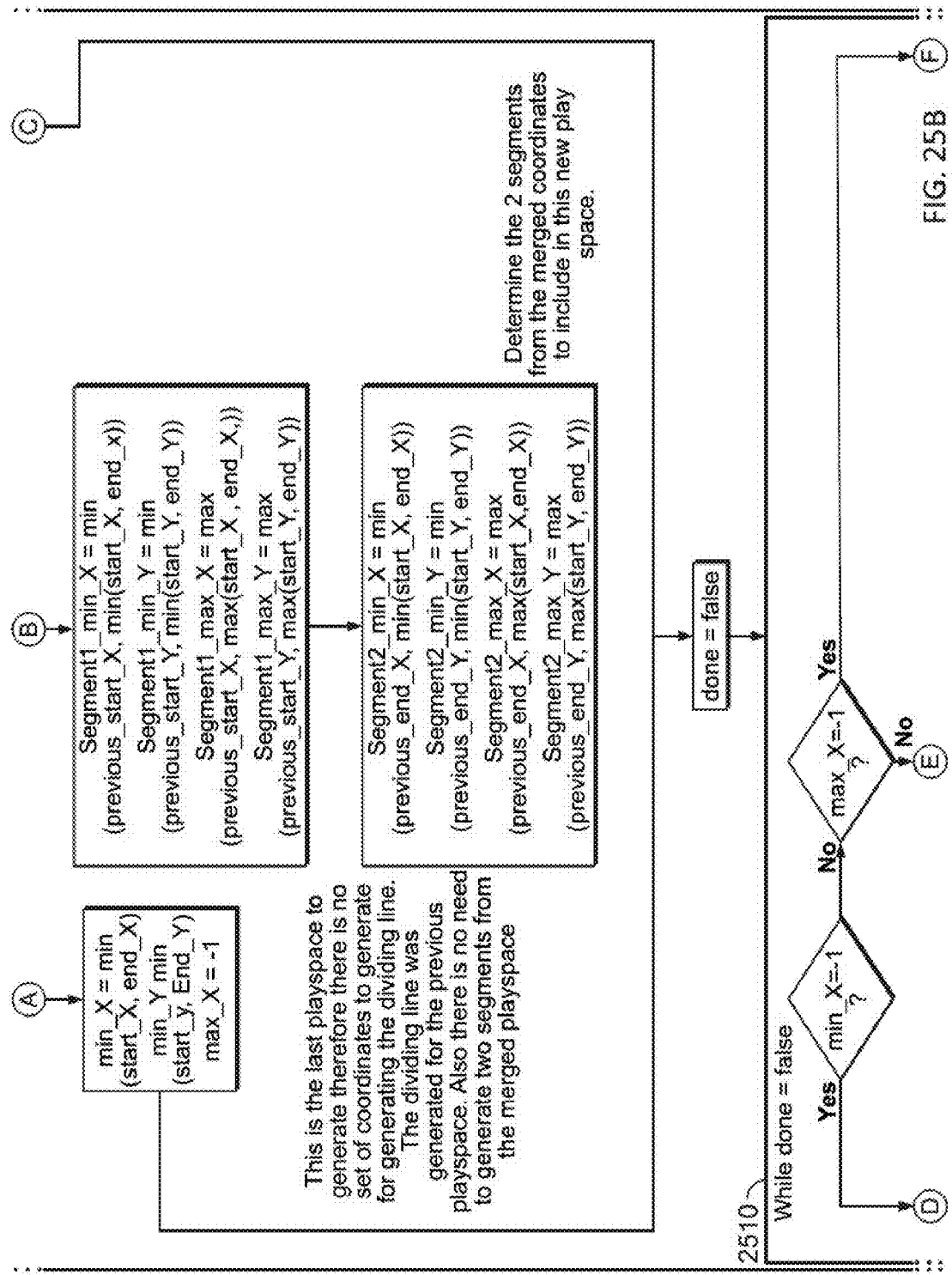
Figure 25C:
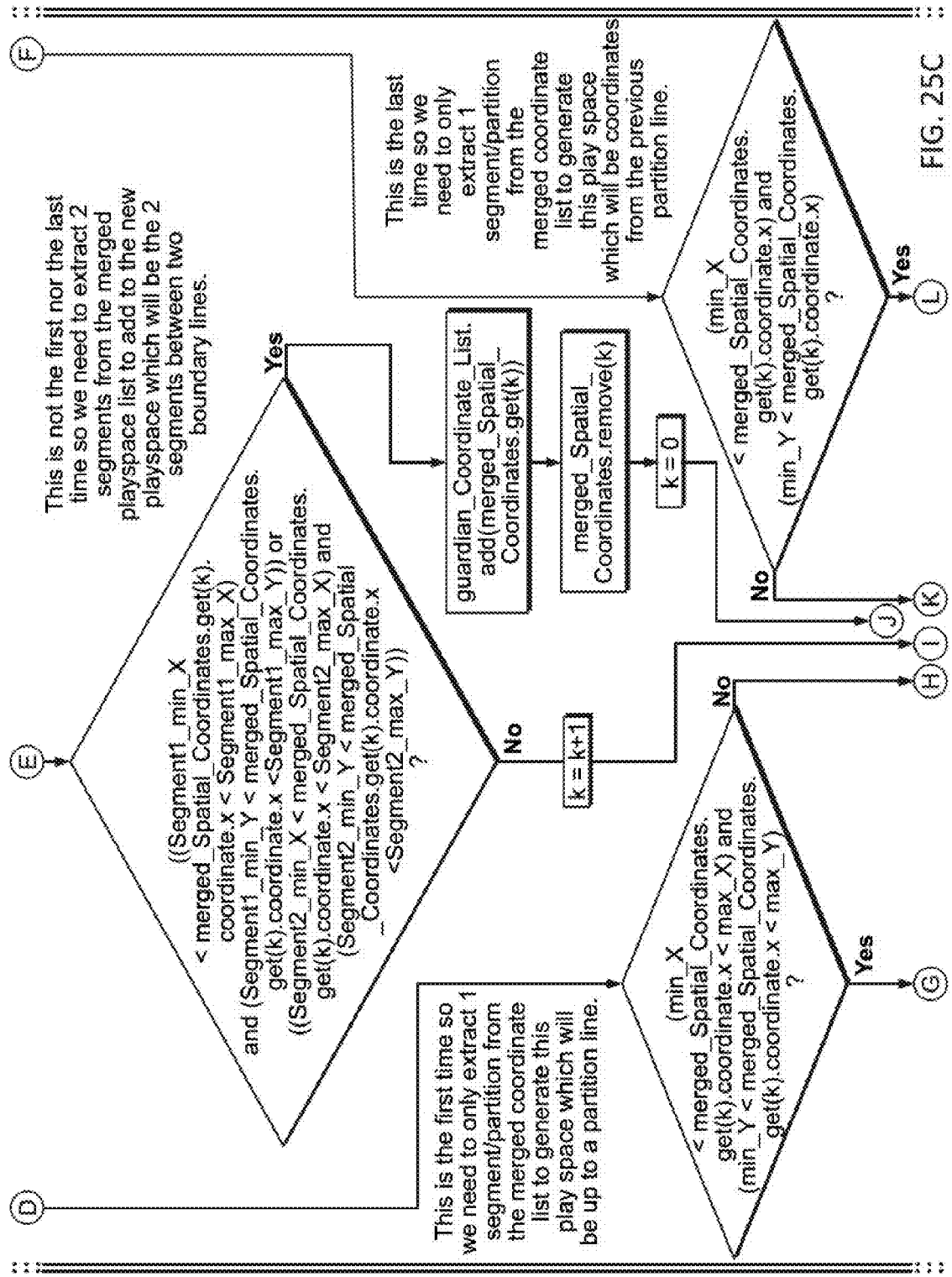
Figure 25D:
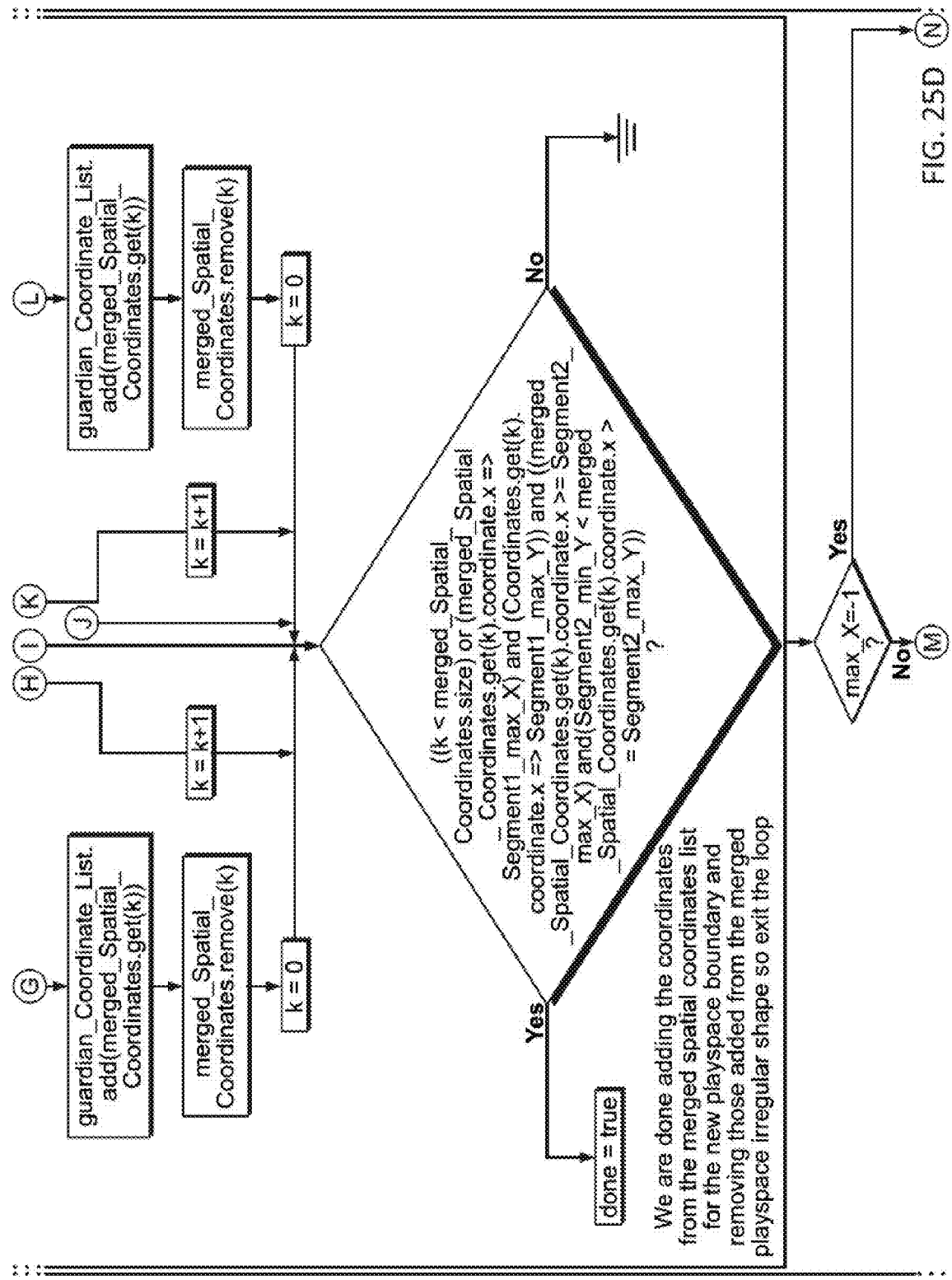
Figure 25E:
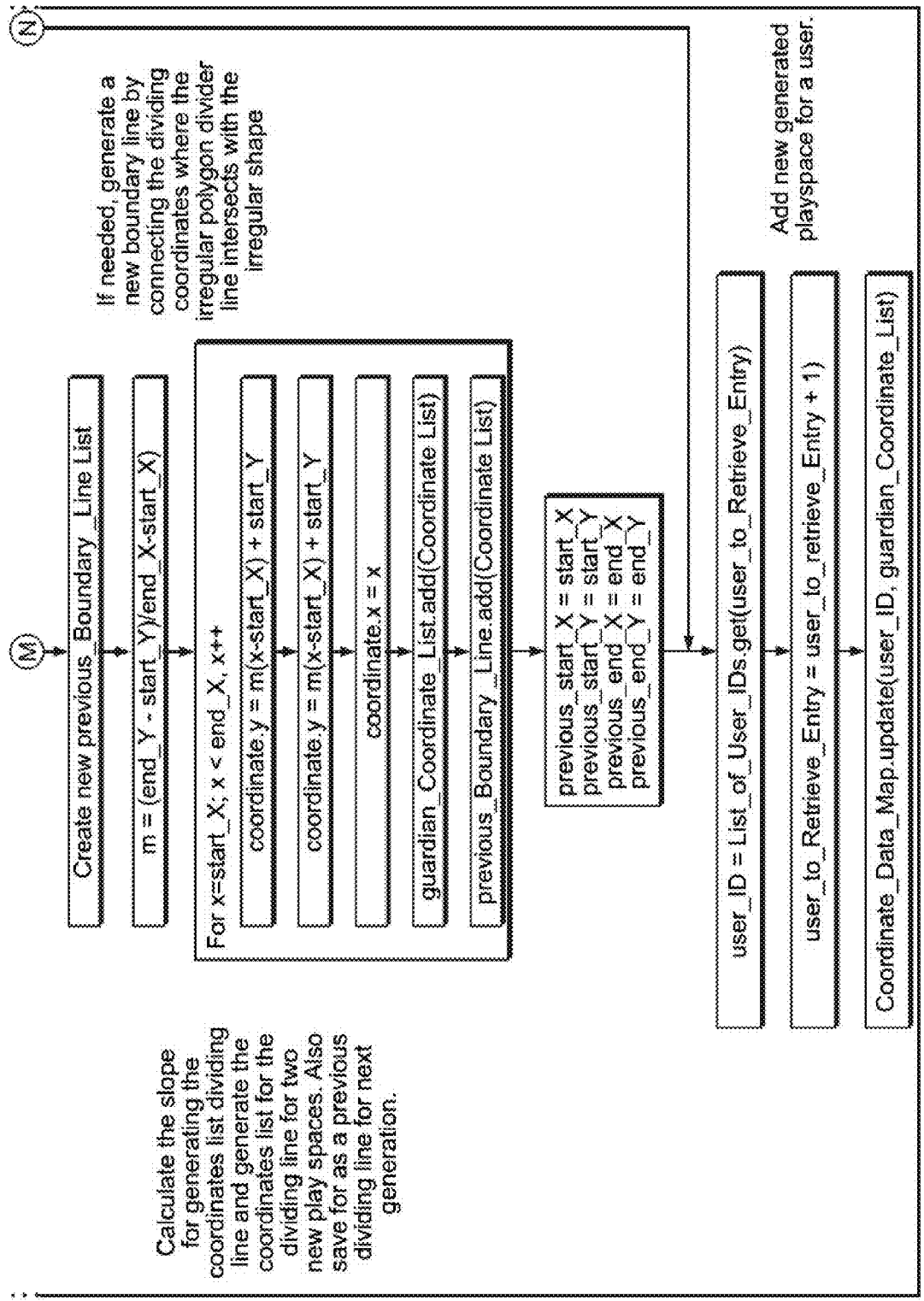

FIG. 24 illustrates a method for determining the location of start and end points of a virtual partition. One reason for generating the polygon that approximates the irregular shaped combined area is to determine the location of the virtual partition that is to divide the reconfigured safe areas into approximately the same size as each other.

At 2402, the new boundary coordinate list is obtained. These coordinates may be the outer boundary of the polygon that approximates the combined area.

At 2404, first points 1030*a*, 1030*b*, shown in FIG. 10, are determined on the polygon that will be used to determine the start and end points 1031*a*, 2031*b* of the virtual partition. However, these first points 1030*a*, 1030*b* may not lie on the actual irregular shaped combined area.

At 2410, the actual start and end points 1031*a*, 1031*b*, shown in FIG. 10, that lie on the irregular shaped combined area are determined. A hypothetical line drawn between the first points 1030*a*, 1030*b* on the polygon intersects the irregular shaped combined area. These points of intersection by the hypothetical line may be used as the start and end points 1031*a*, 1031*b* of the virtual partition 1009 shown in FIG. 10.

At 2420, the system outputs a data structure that indicates the coordinates of the virtual partition. These coordinates may be defined according to the start and end points obtained earlier in the method shown in FIG. 24.

FIGS. 25A-E show a flowchart illustrating an example of a process for generating coordinates for each of the reconfigured safe areas. The process may refer to an example with two safe areas generated with one virtual partition therebetween.

The virtual partition coordinates generated according to a method illustrated by way of example in FIG. 25 are retrieved at 2502. The virtual boundary coordinates may form part of the boundary for each safe area.

At 2504, user IDs may be retrieved that will be associated with each safe area. Instead, or in addition, the system may associate the safe areas to be defined with session IDs for the XR session of each device.

At 2506, the coordinates of a new safe area are obtained based on the irregular shaped combined area. The system determined whether the coordinates of the virtual partition are suitable to be incorporated as part of the boundary of the safe area being determined.

At 2510, the coordinates of the virtual partition may be added as part of the boundary of the safe area. As shown, if there are three or more safe areas to be carved out of a combined area, then the boundaries of a safe area may include two or more partition lines. Once a safe area is created, the system may remove from the list those coordinates of the boundary that had demarcated the combined area because these coordinates are not needed for remaining safe areas.

Figure 26A:
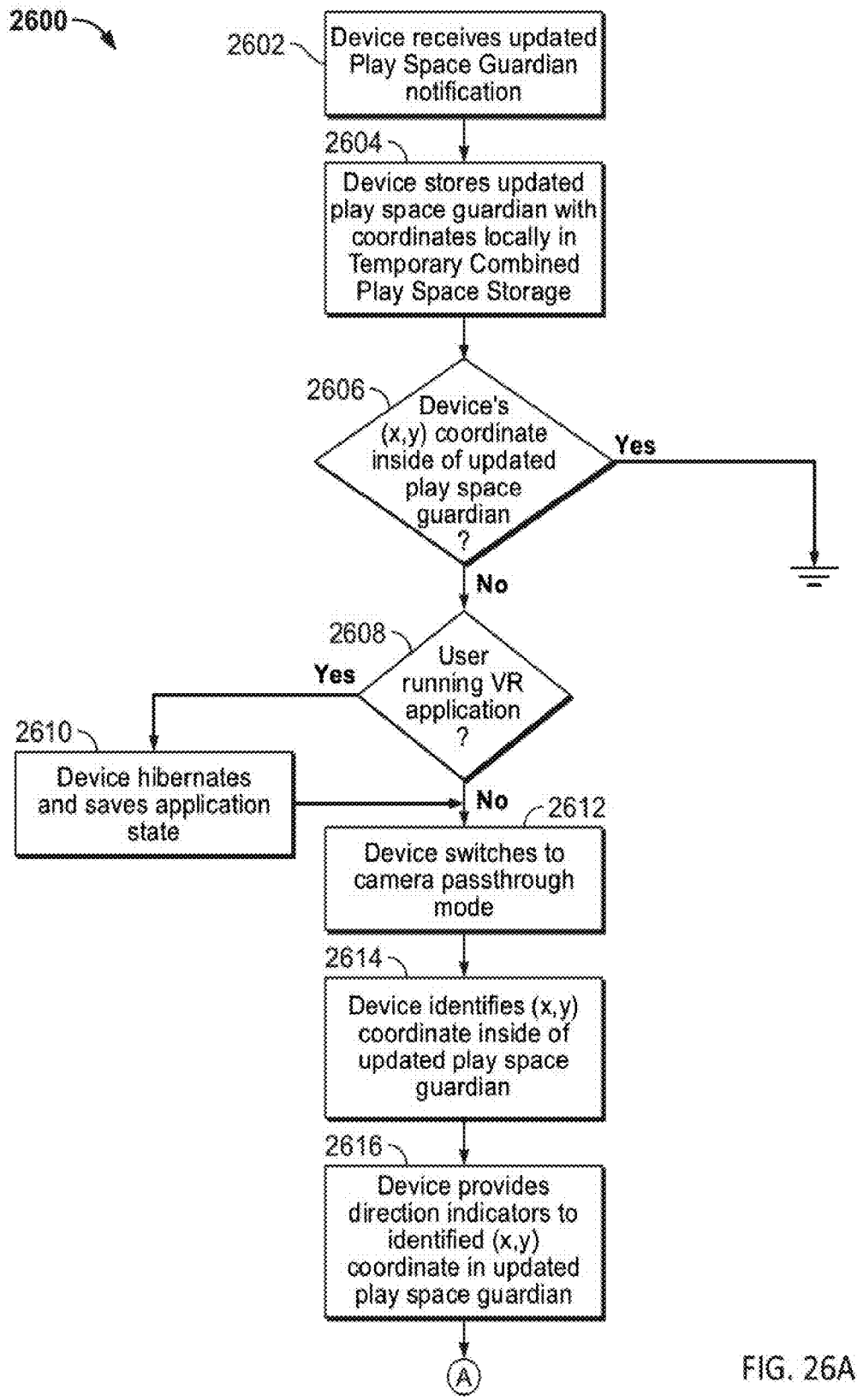
FIGS. 26A-B are a flowchart giving an example of a process for updating a VR device regarding safe area boundaries and for guiding an errant VR device to the safe area that has been assigned to the VR.
Figure 26B:
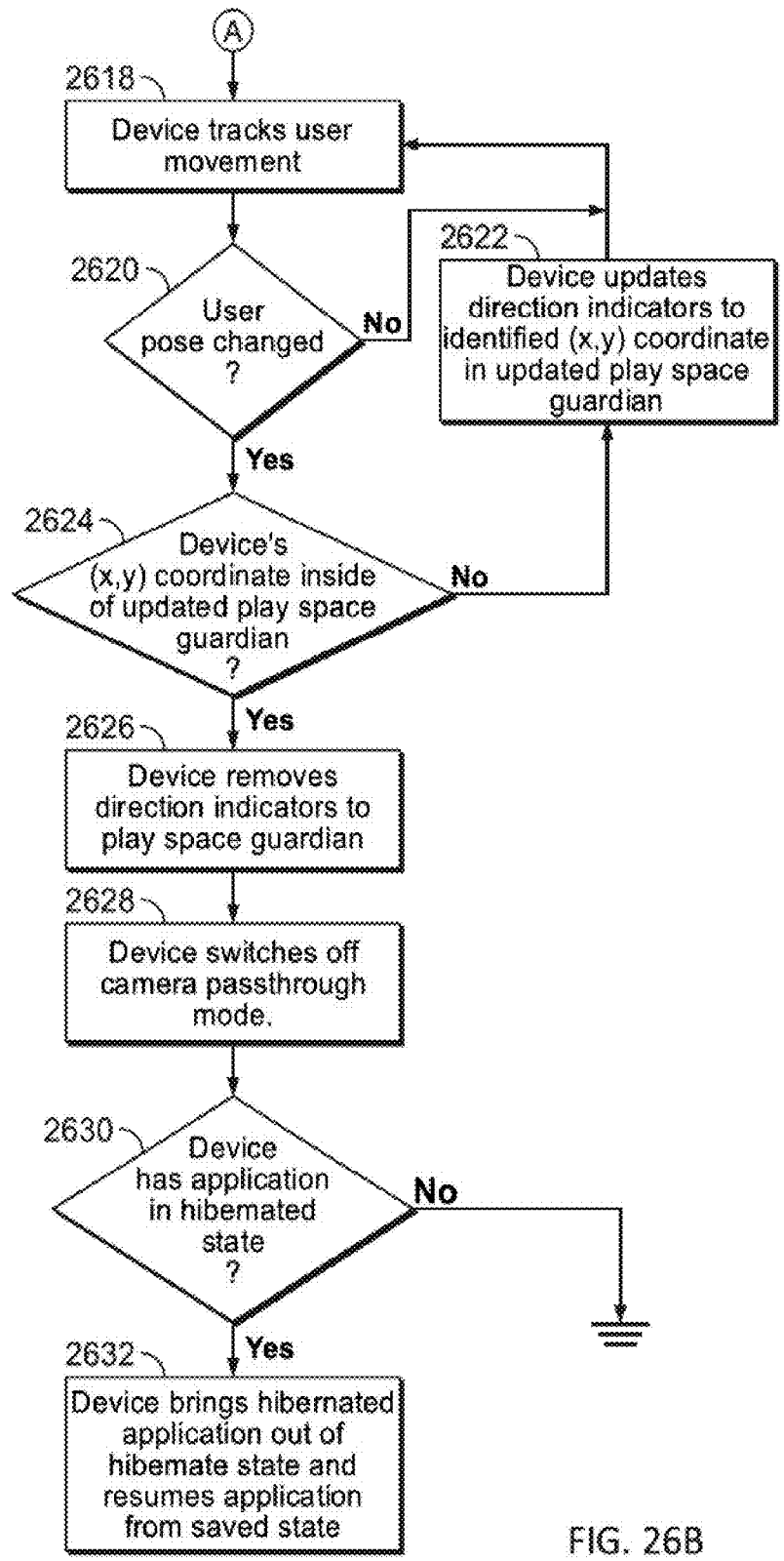

FIGS. 26A-B are a flowchart giving an example of a process for updating a XR device regarding safe area boundaries and for guiding an errant XR device to the safe area that has been assigned to the XR.

At 2602 the location of boundaries of the safe area that is assigned to the XR device are transmitted to the XR device. This may be determined according to the previously described processes or in other ways.

At 2604 the coordinates of the boundary of the safe area are stored locally. A safe area may be roughly equal in size to its original configuration, or one safe area may be substantially larger than the other. In an embodiment, the system generates a combined area and allocates the reconfigured safe areas to the XR devices to reflect the size of the original safe areas such that a XR device with a larger initial safe area than that of another XR device is allotted a larger reconfigured safe area. According to another embodiment, the size of the original safe areas is irrelevant to the size of the reconfigured safe areas.

At 2606 it is determined whether the XR device remains inside of its allocated area. If not, then at 2608 is determined whether the XR application is still running and whether the XR devices are still on. A XR application may be determined not to be running even if the XR device is on. In an embodiment, when no XR application is running on the XR device, the system may ignore it.

If at 2608 the XR device is determined to be on and running, then at 2610 the system may save the XR application state and start a hibernation mode for the XR application. This may be useful for re-starting the XR application from its current state without ruining continuity of the flow of the XR application by the passthrough mode of 2612.

At 2612 the system may initiate a passthrough mode for the XR device. Passthrough mode may be a safe mode to allow the XR user/wearer to see through the eyepiece of an HMD, for example, using cameras at the front of the HMD or by allowing transparency for the eyepiece.

At 2614, the coordinates of the location of the XR device in the reconfigured safe area may be identified. The XR device may also have wandered out of the combined area entirely, and if so, those coordinates of the XR device may be identified. In an embodiment, if a XR device is out of the combined area, then the system may resume normal operation for remaining XR devices. In an embodiment, if a XR device is out of the combined area but within a threshold distance therefrom, for example, 2 meters, or 1-4 meters, from the combined area, then the system may initiate safety mode for XR devices with safe areas that are within the threshold distance.

The system may, at 2616, determine and provide direction indicators to guide the XR device to a safe location. The system may determine the shortest route back to the safe area allotted to the XR device, or may determine a route that leaves a significant margin of safety between the XR device and other XR devices using the physical space. For example, the system may determine the coordinates of the XR device assigned to the safe area and guide the errant XR device in a way that steers well clear of that XR device.

The movement of the XR device may be tracked, as shown at 2618. The errant device may wander after being warned that it is in a forbidden area. The system may guide the errant XR device so as to leave a margin of safety, for example, a 2 m distance on all sides of the XR device away from any other XR device throughout the route back. According to an embodiment, if a substantial margin of safety, for example, 3 meters or 2-8 meters, is determined between the first XR device to which the safe area is allotted and the errant XR device that has wandered into that safe area, then the system may allow the first XR device to continue its XR session uninterrupted while guiding the errant XR device back to its allotted safe area.

At 2620 it is determined whether the position of the XR device has changed. While a device is in a forbidden zone, remaining XR devices may be requested to remain in a standby mode with passthrough.

If the position of the XR device has not changed, then the position of the XR device may continue to be tracked until movement or a changed position is detected, as shown at 2622.

If the position of the XR is detected at 2620 to have changed, then at 2624 it is determined at 2622 whether the XR device is now inside of its assigned safe area.

If at 2624 the XR device is still detected to be outside of its assigned safe area, then at 2622 updated guidance is generate based on the updated coordinates of the XR device to usher the XR device back to its assigned safe area.

If at 2622 the XR device is detected to be located inside of its assigned safe area, then at 2626, the system generates cessation of the guidance display. If the errant XR device is detected to be outside the combined area, then normal operation for the remaining XR devices may be resumed. In an embodiment, the system may help direct the errant XR device detected to be outside the combined area, or outside any known safe area of the physical space, back to its allotted safe area. According to an embodiment, the system may terminate the XR session for a XR device that is detected to be more than a threshold distance, for example, more than 3 m, or more than 2-6 m, from the combined area.

At 2628, the system may turn off passthrough mode for this and for remaining XR devices. In an embodiment, the errant XR device may be given a further warning and/or a timeout from engaging with the XR application with which it was previously engaged if the XR device wanders out of its safe area more than once per XR session, or more than once in any threshold time interval, for example, 3 minutes, or 2-5 minutes.

If at 2630 the device is determined to be in the hibernation mode, then at 2632, hibernation mode is terminated and normal operation of the XR application is resumed from the saved state. If not, then hibernation mode had already been stopped or was never entered. For example, the system may never have forced remaining XR devices into hibernation mode when detecting an errant XR device.

The methods or processes 300, 900, 1600, and 1800-2600 be implemented, in whole or in part, by the system(s) described herein and shown in the FIGs (e.g., via the XR devices 111). One or more actions of the depicted processes may be incorporated into or combined with one or more actions of any other process or embodiments described herein. The processes may be saved to a memory or storage (such as any one or more of those shown in FIG. 1, 2, or 6) as one or more instructions or routines that may be executed by a corresponding device or system to implement the process 300. Depending on the embodiment, one or more steps of the described process may be implemented or facilitated by a server (e.g., a server in communication with one of the XR devices 111). While some of the description corresponding to the processes 300, 900, 1600, or 1800-2600 references a XR device or devices, appreciate that the described steps may be implemented with respect to any suitable XR device in some embodiments.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method for a first extended reality (XR) device or a second XR device, the method comprising:
   retrieving first information defining a first safe area in a physical space and second information defining a second safe area in the physical space,
   wherein the first safe area and the second safe area are defined by at least one XR device;
   determining that an overlap exists in the physical space of the first safe area and the second safe area;
   reconfiguring, by control circuitry, at least one of the first safe area in the physical space for the first XR device or the second safe area in the physical space for the second XR device, wherein, after the reconfiguring, the first safe area and the second safe area include no overlap with each other in the physical space; and
   generating a signal to at least one of the first XR device or the second XR device notifying of the reconfiguring of the at least one of the first safe area or the second safe area.

2. The method of claim 1, further comprising:
   after the reconfiguring, generating a virtual partition comprising a buffer zone in the physical space, wherein the buffer zone separates the first safe area from the second safe area.

3. The method of claim 1, wherein the at least one of the first safe area or the second safe area is reconfigured such that the first safe area and the second safe area are approximately equal in size.

4. The method of claim 1, wherein the reconfiguring of the at least one of the first safe area and the second safe area is such that the first safe area is located as close as possible to the second safe area with a buffer zone separating the first safe area from the second safe area.

5. The method of claim 1, further comprising:
 determining an activity level associated with the first XR device; and
 determining an activity level associated with the second XR device, wherein the first safe area is reconfigured to be larger than the second safe area based on the activity level associated with the first XR device and the activity level associated with the second XR device.

6. The method of claim 1, wherein, after the reconfiguring, a size of the first safe area relative to a size of the second safe area is based on:
 an average activity level generated by a first application active for the first XR device and
 the average activity level generated by a second application active for the second XR device.

7. The method of claim 1, further comprising:
 determining that the first XR device is deactivated in the physical space and that the second XR device is active in the physical space;
 after the reconfiguring, dynamically updating the second safe area for exclusive permitted use of second XR device by combining the first safe area with the second safe area.

8. The method of claim 7, further comprising:
 providing a notification via a user interface of the second XR device that the second safe area is enlarged.

9. The method of claim 8, further comprising:
 after the dynamically updating the second safe area, detecting that both the first XR device and the second XR device are active in the physical space;
 based on the detecting that both the first XR device and the second XR device are active in the physical space, transmitting a first signal to the first XR device indicating the first safe area for exclusive permitted use of the first XR device and transmitting a second signal to the second XR device indicating the second safe area for exclusive permitted use of the second XR device.

10. The method of claim 1, wherein the overlap is determined to exist in the physical space when a first boundary of the first safe area is detected to lie less than a threshold distance away from a second boundary of the second safe area.

11. A system for a first extended reality (XR) device or a second XR device, the system comprising:
 a memory; and
 control circuitry configured:
  to retrieve first information defining a first safe area in a physical space and second information defining a second safe area in the physical space, wherein the first safe area and the second safe area are defined by at least one XR device;
  to determine that an overlap exists in the physical space of the first safe area and the second safe area;
  to reconfigure, by control circuitry, at least one of the first safe area in the physical space for the first XR device or the second safe area in the physical space for the second XR device, wherein, after the reconfiguring, the first safe area and the second safe area include no overlap with each other in the physical space; and
  to generate a signal to at least one of the first XR device or the second XR device notifying of the reconfiguring of the at least one of the first safe area or the second safe area.

12. The system of claim 11, wherein the system is configured:
 after the reconfiguring, to generate a virtual partition comprising a buffer zone in the physical space, wherein the buffer zone separates the first safe area from the second safe area.

13. The system of claim 11, wherein the at least one of the first safe area or the second safe area is reconfigured such that the first safe area and the second safe area are approximately equal in size.

14. The system of claim 11, wherein the reconfiguring of the at least one of the first safe area and the second safe area is such that the first safe area is located as close as possible to the second safe area with a buffer zone separating the first safe area from the second safe area.

15. The system of claim 11, wherein the system is configured:
 to determine an activity level associated with the first XR device; and
 to determine an activity level associated with the second XR device, wherein the first safe area is reconfigured to be larger than the second safe area based on the activity level associated with the first XR device and the activity level associated with the second XR device.

16. The system of claim 11, wherein, after the reconfiguring, a size of the first safe area relative to a size of the second safe area is based on:
 an average activity level generated by a first application active for the first XR device and the average activity level generated by a second application active for the second XR device.

17. The system of claim 11 wherein the system is configured:
 to determine that the first XR device is deactivated in the physical space and that the second XR device is active in the physical space;
 after the reconfiguring, to dynamically update the second safe area for exclusive permitted use of second XR device by combining the first safe area with the second safe area.

18. The system of claim 17, wherein the system is configured:
 to provide a notification via a user interface of the second XR device that the second safe area is enlarged.

19. The system of claim 18, wherein the system is configured:
 after the dynamically updating the second safe area, to detect that both the first XR device and the second XR device are active in the physical space;
 based on the detecting that both the first XR device and the second XR device are active in the physical space, to transmit a first signal to the first XR device indicating the first safe area for exclusive permitted use of the first XR device and to transmit a second signal to the second XR device indicating the second safe area for exclusive permitted use of the second XR device.

20. The system of claim 11 wherein the overlap is determined to exist in the physical space when a first boundary of the first safe area is detected to lie less than a threshold distance away from a second boundary of the second safe area.

* * * * *